(12) United States Patent
Zhang et al.

(10) Patent No.: US 12,316,456 B2
(45) Date of Patent: May 27, 2025

(54) INFORMATION PROCESSING METHOD, TERMINAL DEVICE, AND NETWORK DEVICE

(71) Applicant: Huawei Technologies Co., Ltd., Shenzhen (CN)

(72) Inventors: Ming Zhang, Beijing (CN); Zheng Yu, Beijing (CN); Wenping Bi, Shenzhen (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 17/659,271

(22) Filed: Apr. 14, 2022

(65) Prior Publication Data

US 2022/0255670 A1 Aug. 11, 2022

Related U.S. Application Data

(63) Continuation of application No. PCT/CN2019/120062, filed on Nov. 21, 2019.

(30) Foreign Application Priority Data

Oct. 16, 2019 (WO) ................ PCT/CN2019/111544

(51) Int. Cl.
*H04L 1/1607* (2023.01)
*H04L 1/00* (2006.01)
(Continued)

(52) U.S. Cl.
CPC .......... *H04L 1/1678* (2013.01); *H04L 1/0004* (2013.01); *H04L 1/001* (2013.01); *H04L 1/1812* (2013.01); *H04W 72/23* (2023.01)

(58) Field of Classification Search
CPC ..................................................... H04W 72/23
See application file for complete search history.

(56) References Cited

U.S. PATENT DOCUMENTS

2010/0238823 A1* 9/2010 Chen ..................... H04W 72/23
370/252
2012/0269140 A1 10/2012 Nam et al.
(Continued)

FOREIGN PATENT DOCUMENTS

CN 104065453 A 9/2014
CN 107078863 A 8/2017

OTHER PUBLICATIONS

Samsung, "Scheduling of multiple transport blocks for NB-IoT", 3GPP TSG RAN WGI Meeting #96bis, R1-1904383, Apr. 12, 2019, 7 pages.
(Continued)

*Primary Examiner* — Ayman A Abaza
*Assistant Examiner* — Camquyen Thai
(74) *Attorney, Agent, or Firm* — Slater Matsil, LLP

(57) ABSTRACT

An information processing method, a terminal device, and a network device are provided. In one method, a first bit in downlink control information includes two bits, a bit status of the first bit may belong to a first state set or may be a second state, and a terminal device may perform multi-TB scheduling or single-TB scheduling based on the first bit. When the bit status of the first bit belongs to the first state set, the first state set is {01, 10, 11}, N=4, and the downlink control information includes a first field, the bit status of the first bit can be used to determine a quantity L of TBs scheduled by the downlink control information, and a bit status of five bits of the first field can be used to determine HARQ process numbers of the L TBs and NDI information of the L TBs.

20 Claims, 12 Drawing Sheets

(51) Int. Cl.
*H04L 1/1812* (2023.01)
*H04W 72/23* (2023.01)

(56) References Cited

U.S. PATENT DOCUMENTS

| | | | |
|---|---|---|---|
| 2016/0029395 A1* | 1/2016 | Kim | H04W 72/23 370/329 |
| 2016/0157213 A1* | 6/2016 | Takeda | H04L 1/1893 370/329 |
| 2018/0092071 A1 | 3/2018 | Dinan et al. | |
| 2022/0140937 A1* | 5/2022 | Mu | H04L 1/0023 370/329 |
| 2022/0201732 A1* | 6/2022 | Takeda | H04W 72/23 |

OTHER PUBLICATIONS

ZTE, "Consideration on scheduling enhancement for MTC", 3GPP TSG RAN WG1 Meeting #98b, R1-1910264, Chongqing, China, Oct. 14-18, 2019, 20 pages.

3GPP TS 36.212 V15.7.0 (Sep. 2019), 3rd Generation Partnership Project;Technical Specification Group Radio Access Network;Evolved Universal Terrestrial Radio Access (E-UTRA);Multiplexing and channel coding(Release 15), total 246 pages.

Huawei et al., "Scheduling multiple DL/UL transport blocks", 3GPP TSG RAN WG1 Meeting #96bis, R1-1903911, Xi'an, China, Apr. 8-2, 2019, 14 pages.

Ericsson, "Scheduling of multiple DL/UL transport blocks in NB-IoT", 3GPP TSG-RAN WG1 Meeting #97, R1-1905967, Reno, NV, US, May 13-17, 2019, 7 pages.

3GPP TS 36.213 V15.7.0 (Sep. 2019), 3rd Generation Partnership Project;Technical Specification Group Radio Access Network;Evolved Universal Terrestrial Radio Access (E-UTRA);Physical layer procedures(Release 15), total 551 pages.

Sequans Communications, "Consideration for scheduling multiple UL/DL TBs", 3GPP TSG RAN WG1 Meeting #96, R1-1904749, Xi'An, China, Apr. 8-12, 2019, 6 pages.

Sequans Communications, "Consideration for scheduling multiple UL/DL TBs", 3GPP TSG RAN WG1 Meeting #98bis, R1-190875, Chongqing, China, Oct. 14-18, 2019, 11 pages.

3GPP TS 36.331 V15.7.0 (Sep. 2019), 3rd Generation Partnership Project;Technical Specification Group Radio Access Network;Evolved Universal Terrestrial Radio Access (E-UTRA);Radio Resource Control (RRC);Protocol specification (Release 15), total 962 pages.

Huawei et al, "Scheduling of multiple transport blocks," 3GPP TSG RAN WG1 Meeting #98bis, Discussion and Decision, R1-1910082, Oct. 14-20, 2019, 12 pages.

Qualcomm Incorporated, "Scheduling of multiple DL/UL transport blocks," 3GPP TSG RAN WG1 Meeting #98b, Discussion/Decision, R1-1910718, Oct. 14-20, 2019, 17 pages.

* cited by examiner

CONT.
FROM
FIG. 2A

CONT.
FROM
FIG. 2A

213. When a bit status of the first bit is a second state, the second state is 00, and N=1, the terminal device determines a HARQ process number of the one TB based on a HARQ process index indication field included in the downlink control information, and determines NDI information of the one TB based on an NDI field included in the downlink control information 205. The network device sends the L TBs based on the determined HARQ process numbers of the L TBs and the determined NDI information of the L TBs 214. The terminal device receives the L TBs based on a determined HARQ process number of each TB in the L TBs and determined NDI information of each TB in the L TBs 215. The terminal device sends the L TBs based on a determined HARQ process number of each TB in the L TBs and determined NDI information of each TB in the L TBs 206. The network device receives the L TBs based on the determined HARQ process numbers of the L TBs and the determined NDI information of the L TBs

FIG. 2B

CONT.
FROM
FIG. 4A

CONT.
FROM
FIG. 4A

413. When a bit status of the first bit is a fourth state, the downlink control information further includes a second bit, the second bit includes one bit, a bit status of the second bit is a fifth state, N is greater than 1, and the downlink control information includes a third field, the terminal device determines, in a second value set based on the third field, the quantity L of TBs scheduled by the downlink control information, the HARQ process numbers of the L TBs, and the NDI information of the L TBs, where the second value set and the first value set are different sets, and a quantity of bits included in the third field is one less than a quantity of bits included in the second field 414. When a bit status of the first bit is a fourth state, the downlink control information further includes a second bit, the second bit includes one bit, a bit status of the second bit is a sixth state, and N=1, the terminal device determines a HARQ process number of the one TB based on a HARQ process index indication field included in the downlink control information, and determines NDI information of the one TB based on an NDI field included in the downlink control information 405. The network device sends the L TBs based on the determined HARQ process numbers of the L TBs and the determined NDI information of the L TBs 415. The terminal device receives the L TBs based on a determined HARQ process number of each TB in the L TBs and determined NDI information of each TB in the L TBs 416. The terminal device sends the L TBs based on a determined HARQ process number of each TB in the L TBs and determined NDI information of each TB in the L TBs 406. The network device receives the L TBs based on the determined HARQ process numbers of the L TBs and the determined NDI information of the L TBs

FIG. 4B

INFORMATION PROCESSING METHOD, TERMINAL DEVICE, AND NETWORK DEVICE

CROSS-REFERENCE TO RELATED APPLICATIONS

This application is a continuation of International Application No. PCT/CN2019/120062, filed on Nov. 21, 2019, which claims priority to International Application No. PCT/CN2019/111544, filed on Oct. 16, 2019. The disclosures of the aforementioned applications are hereby incorporated by reference in their entireties.

TECHNICAL FIELD

Embodiments of this application relate to the communication field, and in particular, to an information processing method, a terminal device, and a network device.

BACKGROUND

In a communication system, one piece of downlink control information (DCI) schedules one transport block (TB) or a plurality of transport blocks.

When the DCI schedules one TB, the DCI further indicates a hybrid automatic repeat request (HARQ) process number. For example, if user equipment (UE) supports eight HARQ processes, three bits in the DCI are used to indicate, in 0 to 7, the HARQ process number used for the TB scheduled by the DCI. When the DCI schedules one TB, the DCI further indicates whether data carried in the transport block scheduled by the DCI is newly transmitted data or retransmitted data.

To reduce overheads of DCI transmission and save transmission resources, a plurality of TBs may be scheduled by using one piece of DCI. When one piece of DCI schedules a plurality of transport blocks, the DCI may indicate a plurality of HARQ process numbers, and each HARQ process number is corresponding to or associated with transmission of one transport block. To further reduce overheads when one piece of DCI schedules a plurality of transport blocks, it needs to be constrained that HARQ process numbers used for the plurality of transport blocks are consecutive, and the first HARQ process number in the plurality of HARQ process numbers further needs to be fixed. For example, one piece of DCI schedules N transport blocks, and a HARQ process number of the first transport block in the N transport blocks is fixed, for example, fixed to 0. In this case, HARQ process numbers of the remaining N−1 transport blocks in the N transport blocks are 1, 2, . . . , and N−1.

In a case in which DCI can schedule a maximum of N transport blocks, N bits are required to indicate new data indicator (NDI) information of all the transport blocks in a bitmap manner, and N bits are further required to indicate, in a bitmap manner, whether HARQ process numbers of all the transport blocks are used. In addition, one bit in the DCI further needs to be used to distinguish between multi-TB scheduling and single-TB scheduling.

Therefore, in the foregoing solution, DCI scheduling is not flexible enough.

SUMMARY

Embodiments of this application provide an information processing method, a terminal device, and a network device, to improve flexibility of downlink control information scheduling.

To resolve the foregoing technical problem, the embodiments of this application provide the following technical solutions.

According to a first aspect, an embodiment of this application provides an information processing method, including: A terminal device receives downlink control information from a network device, where the downlink control information can schedule a maximum of N transport blocks TBs, N is a positive integer, and the downlink control information includes a first bit. When the first bit includes two bits, a bit status of the first bit belongs to a first state set, the first state set is {01, 10, 11}, N=4, the downlink control information includes a first field, and the first field includes five bits, the terminal device determines, based on the bit status of the first bit, a quantity L of TBs scheduled by the downlink control information, and the terminal device determines hybrid automatic repeat request HARQ process numbers of the L TBs and new data indicator NDI information of the L TBs based on a bit status of the five bits of the first field; or when the first bit includes two bits, a bit status of the first bit is a second state, the second state is 00, and N=1, the terminal device determines a HARQ process number of the one TB based on a HARQ process index indication field included in the downlink control information, and determines NDI information of the one TB based on an NDI field included in the downlink control information; or when the first bit includes one bit, a bit status of the first bit is a third state, N is greater than 1, and the downlink control information includes a second field, the terminal device determines, in a first value set based on the second field, a quantity L of TBs scheduled by the downlink control information, HARQ process numbers of the L TBs, and NDI information of the L TBs; or when the first bit includes one bit, a bit status of the first bit is a fourth state, the downlink control information further includes a second bit, the second bit includes one bit, a bit status of the second bit is a fifth state, N is greater than 1, and the downlink control information includes a third field, the terminal device determines, in a second value set based on the third field, a quantity L of TBs scheduled by the downlink control information, HARQ process numbers of the L TBs, and NDI information of the L TBs, where the second value set and the first value set are different sets, and a quantity of bits included in the third field is one less than a quantity of bits included in the second field; or when the first bit includes one bit, a bit status of the first bit is a fourth state, the downlink control information further includes a second bit, the second bit includes one bit, a bit status of the second bit is a sixth state, and N=1, the terminal device determines a HARQ process number of the one TB based on a HARQ process index indication field included in the downlink control information, and determines NDI information of the one TB based on an NDI field included in the downlink control information. The terminal device sends the L TBs based on a determined HARQ process number of each TB in the L TBs and determined NDI information of each TB in the L TBs; or the terminal device receives the L TBs based on a determined HARQ process number of each TB in the L TBs and determined NDI information of each TB in the L TBs.

In the foregoing embodiment of this application, the first bit includes two bits, the bit status of the first bit may belong to the first state set or may be the second state, and the terminal device may perform multi-TB scheduling or single-TB scheduling based on the first bit. When the bit status of the first bit belongs to the first state set, the first state set is {01, 10, 11}, N=4, the downlink control information includes the first field, and the first field includes five bits, the bit status of the first bit can be used to determine the quantity L of TBs scheduled by the downlink control information, and the bit status of the five bits of the first field can be used to determine the HARQ process numbers of the L TBs and the NDI information of the L TBs, so that the downlink control information supports scheduling for any quantity of TBs in the N TBs, and may indicate any HARQ process number and any NDI information used for each scheduled TB. This improves scheduling flexibility.

According to a second aspect, an embodiment of this application provides an information processing method, including: A network device determines a quantity L of transport blocks TBs scheduled by downlink control information, where the downlink control information can schedule a maximum of N TBs, N and L are positive integers, and 1≤L≤N. The network device determines hybrid automatic repeat request HARQ process numbers of the L TBs. The network device determines new data indicator NDI information of the L TBs. The network device sends the downlink control information to a terminal device, where the downlink control information includes a first bit. The first bit includes two bits, a bit status of the first bit belongs to a first state set, the first state set is {01, 10, 11}, N=4, the downlink control information includes a first field, the bit status of the first bit is used to indicate the quantity L of TBs scheduled by the downlink control information, and a bit status of five bits of the first field is used to indicate the HARQ process numbers of the L TBs and the NDI information of the L TBs; or the first bit includes two bits, a bit status of the first bit is a second state, the second state is 00, N=1, a HARQ process index indication field included in the downlink control information is used to indicate a HARQ process number of the one TB, and an NDI field included in the downlink control information is used to indicate NDI information of the one TB; or the first bit includes one bit, a bit status of the first bit is a third state, N is greater than 1, the downlink control information includes a second field, and the second field indicates, in a first value set, the quantity L of TBs scheduled by the downlink control information, the HARQ process numbers of the L TBs, and the NDI information of the L TBs; or the first bit includes one bit, a bit status of the first bit is a fourth state, the downlink control information further includes a second bit, the second bit includes one bit, a bit status of the second bit is a fifth state, N is greater than 1, the downlink control information includes a third field, and the third field indicates, in a second value set, the quantity L of TBs scheduled by the downlink control information, the HARQ process numbers of the L TBs, and the NDI information of the L TBs, where the second value set and the first value set are different sets, and a quantity of bits included in the third field is one less than a quantity of bits included in the second field; or the first bit includes one bit, a bit status of the first bit is a fourth state, the downlink control information further includes a second bit, the second bit includes one bit, a bit status of the second bit is a sixth state, N=1, a HARQ process index indication field included in the downlink control information is used to indicate a HARQ process number of the one TB, and an NDI field included in the downlink control information is used to indicate NDI information of the one TB. The network device sends the L TBs based on the determined HARQ process numbers of the L TBs and the determined NDI information of the L TBs; or the network device receives the L TBs based on the determined HARQ process numbers of the L TBs and the determined NDI information of the L TBs.

In the foregoing embodiment of this application, when the first bit includes one bit, the bit status of the first bit may be the third state, or the first bit uses the fourth state and the second bit uses the fifth state, and the terminal device may perform multi-TB scheduling; or the first bit uses the fourth state and the second bit uses the sixth state, and the terminal device may perform single-TB scheduling, so that the downlink control information supports scheduling for any quantity of TBs in the N TBs, and may indicate any HARQ process number and any NDI information used for each scheduled TB. This improves scheduling flexibility.

In a possible implementation, the first bit includes one bit, N=4, the bit status of the first bit is 1, the second field includes six bits, and the six bits of the second field indicate, in the first value set, the quantity L of TBs scheduled by the downlink control information, the HARQ process numbers of the L TBs, and the NDI information of the L TBs; or the first bit includes one bit, N=4, the bit status of the first bit is 0, the bit status of the second bit is 1, the third field includes five bits, and the five bits of the third field indicate, in the second value set, the quantity L of TBs scheduled by the downlink control information, the HARQ process numbers of the L TBs, and the NDI information of the L TBs; or the first bit includes one bit, the bit status of the first bit is 0, the bit status of the second bit is 0, the HARQ process index indication field is used to indicate the HARQ process number of the one TB, and the NDI field is used to indicate the NDI information of the one TB. In this embodiment of this application, scheduling by one piece of downlink control information for any quantity of TBs in the N TBs can be supported, and any HARQ process number used for each scheduled TB can be indicated, without separately using one bit in the downlink control information to indicate single-TB scheduling or multi-TB scheduling. This improves scheduling flexibility and reduces bit overheads of the downlink control information.

In a possible implementation, the first bit includes one bit, and a value set of N is {1, 2, 4, 8}; or a value set of N is {2, 4}; or a value set of N is {1, 4}; or a value set of N is {1, 4, 8}. The network device may determine that the DCI can schedule a maximum of N TBs. N may be a fixed value specified in a standard, or the network device configures N for the terminal device. Non-restrictively, in an actual application scenario, a value of N may be flexibly configured according to a specific scenario.

According to a third aspect, an embodiment of this application provides an information processing method, including: A terminal device receives downlink control information from a network device, where the downlink control information can schedule a maximum of four transport blocks TBs, the downlink control information includes a first bit and a second bit, the first bit includes seven bits, and the second bit includes three bits. The terminal device determines, based on the first bit, a quantity L of transport blocks TBs scheduled by the downlink control information, and determines an index of a modulation and coding scheme MCS based on the first bit. When L=1, the terminal device determines that one bit in the second bit is a new data indicator NDI bit, and the terminal device determines a hybrid automatic repeat request HARQ process number of the one TB based on a bit status of two bits other than the one NDI bit in the second bit; or when L=2, the terminal device determines that two bits in the second bit are NDI bits, and the terminal device determines HARQ process numbers of the two TBs based on a bit status of one bit other than the two NDI bits in the second bit and a bit status of the first bit; or when L=3, the terminal device determines that the three bits in the second bit are NDI bits, and the terminal device determines HARQ process numbers of the three TBs based on a bit status of the first bit; or when L=4, the terminal device determines that the three bits in the second bit are NDI bits corresponding to three TBs in the four TBs, and the terminal device determines, based on a bit status of the first bit, an NDI bit corresponding to one TB in the four TBs other than the three TBs corresponding to the NDI bits. The terminal device sends the L TBs based on a determined HARQ process number of each TB in the L TBs, determined NDI information of each TB in the L TBs, and the index of the MCS; or the terminal device receives the L TBs based on a determined HARQ process number of each TB in the L TBs, determined NDI information of each TB in the L TBs, and the index of the MCS.

In the foregoing embodiment of this application, 10 bits are used in the downlink control information to separately indicate multi-TB scheduling and the index of the MCS, any HARQ process number used for a plurality of scheduled TBs may be indicated, and a single-TB scheduling manner may be supported. This ensures downlink control information scheduling flexibility and reduces bit overheads.

According to a fourth aspect, an embodiment of this application provides an information processing method, including: A network device determines a quantity L of transport blocks TBs scheduled by downlink control information, where the downlink control information can schedule a maximum of N TBs, N and L are positive integers, and 1≤L≤N. The network device determines hybrid automatic repeat request HARQ process numbers of the L TBs. The network device determines new data indicator NDI information of the L TBs. The network device sends the downlink control information to a terminal device, where the downlink control information includes a first bit and a second bit, the first bit includes seven bits, and the second bit includes three bits. The first bit is used to indicate the quantity L of transport blocks TBs scheduled by the downlink control information, and is further used to indicate an index of a modulation and coding scheme MCS. When L=1, one bit in the second bit is a new data indicator NDI bit, and a bit status of two bits other than the one NDI bit in the second bit is used to indicate a hybrid automatic repeat request HARQ process number of the one TB; or when L=2, two bits in the second bit are NDI bits, and a bit status of one bit other than the two NDI bits in the second bit and a bit status of the first bit are used to indicate HARQ process numbers of the two TBs; or when L=3, the three bits in the second bit are NDI bits, and a bit status of the first bit is used to indicate HARQ process numbers of the three TBs; or when L=4, the three bits in the second bit are NDI bits corresponding to three TBs in the four TBs, and a bit status of the first bit is used to indicate an NDI bit corresponding to one TB in the four TBs other than the three TBs corresponding to the NDI bits. The network device sends the L TBs based on a determined HARQ process number of each TB in the L TBs, determined NDI information of each TB in the L TBs, and the index of the MCS; or the network device receives the L TBs based on a determined HARQ process number of each TB in the L TBs, determined NDI information of each TB in the L TBs, and the index of the MCS.

In the foregoing embodiment of this application, 10 bits are used in the downlink control information to separately indicate multi-TB scheduling and the index of the MCS, any HARQ process number used for a plurality of scheduled TBs may be indicated, and a single-TB scheduling manner may be supported. This ensures downlink control information scheduling flexibility and reduces bit overheads.

In a possible implementation, a value obtained by performing an REM operation on a first value M by using an index indicated by the first bit is 0, L=1, and M is a positive integer; or a value obtained by performing an REM operation on a first value M by using an index indicated by the first bit is 1, L=2, the HARQ process numbers of the two TBs are $\{H_0=b_2, H_1=1+b_2\}$, $H_0$ and $H_1$ represent the HARQ process numbers of the two TBs, and $b_2$ represents the bit status of the one bit other than the two NDI bits in the second bit; or a value obtained by performing an REM operation on a first value M by using an index indicated by the first bit is 2, L=2, the HARQ process numbers of the two TBs are $\{H_0=0, H_1=2+b_2\}$, $H_0$ and $H_1$ represent the HARQ process numbers of the two TBs, and $b_2$ represents the bit status of the one bit other than the two NDI bits in the second bit; or a value obtained by performing an REM operation on a first value M by using an index indicated by the first bit is 3, L=2, the HARQ process numbers of the two TBs are $\{H_0=b_2, H_1=3\}$, $H_0$ and $H_1$ represent the HARQ process numbers of the two TBs, and $b_2$ represents the bit status of the one bit other than the two NDI bits in the second bit; or a value obtained by performing an REM operation on a first value M by using an index indicated by the first bit is 4, L=3, the HARQ process numbers of the three TBs are $\{H_0=0, H_1=1, H_2=2\}$, and $H_0$, $H_1$, and $H_2$ represent the HARQ process numbers of the three TBs; or a value obtained by performing an REM operation on a first value M by using an index indicated by the first bit is 5, L=3, the HARQ process numbers of the three TBs are $\{H_0=0, H_1=1, H_2=3\}$, and $H_0$, $H_1$, and $H_2$ represent the HARQ process numbers of the three TBs; or a value obtained by performing an REM operation on a first value M by using an index indicated by the first bit is 6, L=3, the HARQ process numbers of the three TBs are $\{H_0=0, H_1=2, H_2=3\}$, and $H_0$, $H_1$, and $H_2$ represent the HARQ process numbers of the three TBs; or a value obtained by performing an REM operation on a first value M by using an index indicated by the first bit is 7, L=3, the HARQ process numbers of the three TBs are $\{H_0=1, H_1=2, H_2=3\}$, and $H_0$, $H_1$, and $H_2$ represent the HARQ process numbers of the three TBs; or a value obtained by performing an REM operation on a first value M by using an index indicated by the first bit is 8, L=4, and NDI information corresponding to the one TB in the four TBs other than the three TBs corresponding to the NDI bits is 0; or a value obtained by performing an REM operation on a first value M by using an index indicated by the first bit is 9, L=4, and NDI information corresponding to the one TB in the four TBs other than the three TBs corresponding to the NDI bits is 1.

In the foregoing embodiment of this application, the network device may determine that L=1, the second bit includes three bits in total, and one bit in the second bit is a new data indicator NDI bit. Therefore, NDI information of one TB may be determined based on the NDI bit. A bit status of two bits other than the one NDI bit in the second bit is used to indicate a hybrid automatic repeat request HARQ process number of the one TB. Therefore, any HARQ process number may be indicated as the HARQ process number of the one TB. This implements flexible downlink control information scheduling.

In the foregoing embodiment of this application, the network device may determine that L=2, the second bit includes three bits in total, and two bits in the second bit are NDI bits. Therefore, NDI information of two TBs may be determined based on the two NDI bits. A bit status of one bit other than the two NDI bits in the second bit and the bit status of the first bit are used to indicate HARQ process numbers of the two TBs. Therefore, any HARQ process numbers may be indicated as the HARQ process numbers of the two TBs. This implements flexible downlink control information scheduling.

In the foregoing embodiment of this application, the network device may determine that L=3, the second bit includes three bits in total, and the three bits in the second bit are NDI bits. Therefore, NDI information of three TBs may be determined based on the three NDI bits. The bit status of the first bit is used to indicate HARQ process numbers of the three TBs. Therefore, any HARQ process numbers may be indicated as the HARQ process numbers of the three TBs. This implements flexible downlink control information scheduling.

In the foregoing embodiment of this application, the network device may determine that L=4, the downlink control information schedules four TBs, and the four TBs may use four HARQ process numbers, that is, all HARQ process numbers need to be used. In this case, the downlink control information does not need to indicate HARQ process numbers of the four TBs. The second bit includes three bits in total, and the three bits in the second bit are NDI bits corresponding to three TBs in the four TBs. Therefore, NDI information of the three TBs may be determined based on the three NDI bits. The bit status of the first bit is used to indicate an NDI bit corresponding to one TB in the four TBs other than the three TBs corresponding to the NDI bits. The bit status of the first bit may further indicate NDI information of the fourth TB in the four TBs. Therefore, NDI information of the four TBs may be indicated. This implements flexible downlink control information scheduling.

In a possible implementation, the index of the MCS is floor(index indicated by the first bit/M), where floor represents a floor function, and / represents a division operation. In this solution, in the foregoing process of calculating the index of the MCS, the floor function may be used, or another calculation function may be used, provided that a value can be calculated based on M and the index indicated by the first bit and the value can be mapped to the index of the MCS.

In a possible implementation, M=10. In this solution, the REM operation is performed on the first value M by using the index indicated by the first bit, and the first value M is not limited to the foregoing example 10. For example, the value of M is 16.

According to a fifth aspect, an embodiment of this application provides a terminal device. The terminal device includes a processing module and a transceiver module. The transceiver module is configured to receive downlink control information from a network device, where the downlink control information can schedule a maximum of N transport blocks TBs, N is a positive integer, and the downlink control information includes a first bit. The processing module is configured to: when the first bit includes two bits, a bit status of the first bit belongs to a first state set, the first state set is {01, 10, 11}, N=4, the downlink control information includes a first field, and the first field includes five bits, determine, based on the bit status of the first bit, a quantity L of TBs scheduled by the downlink control information, and determine hybrid automatic repeat request HARQ process numbers of the L TBs and new data indicator NDI information of the L TBs based on a bit status of the five bits of the first field; or when the first bit includes two bits, a bit status of the first bit is a second state, the second state is 00, and N=1, determine a HARQ process number of the one TB based on a HARQ process index indication field included in the downlink control information, and determine NDI information of the one TB based on an NDI field included in the downlink control information. Alternatively, the processing module is configured to: when the first bit includes one bit, a bit status of the first bit is a third state, N is greater than 1, and the downlink control information includes a second field, determine, in a first value set based on the second field, a quantity L of TBs scheduled by the downlink control information, HARQ process numbers of the L TBs, and NDI information of the L TBs; or when the first bit includes one bit, a bit status of the first bit is a fourth state, the downlink control information further includes a second bit, the second bit includes one bit, a bit status of the second bit is a fifth state, N is greater than 1, and the downlink control information includes a third field, determine, in a second value set based on the third field, a quantity L of TBs scheduled by the downlink control information, HARQ process numbers of the L TBs, and NDI information of the L TBs, where the second value set and the first value set are different sets, and a quantity of bits included in the third field is one less than a quantity of bits included in the second field; or when the first bit includes one bit, a bit status of the first bit is a fourth state, the downlink control information further includes a second bit, the second bit includes one bit, a bit status of the second bit is a sixth state, and N=1, determine a HARQ process number of the one TB based on a HARQ process index indication field included in the downlink control information, and determine NDI information of the one TB based on an NDI field included in the downlink control information. The transceiver module is configured to: send the L TBs based on a determined HARQ process number of each TB in the L TBs and determined NDI information of each TB in the L TBs; or receive the L TBs based on a determined HARQ process number of each TB in the L TBs and determined NDI information of each TB in the L TBs.

In the fifth aspect of this application, composition modules of the terminal device may further perform the steps described in the first aspect and the possible implementations. For details, refer to the descriptions in the first aspect and the possible implementations.

According to a sixth aspect, an embodiment of this application provides a network device, including a processing module and a transceiver module. The processing module is configured to determine a quantity L of transport blocks TBs scheduled by downlink control information, where the downlink control information can schedule a maximum of N TBs, N and L are positive integers, and 1≤L≤N. The processing module is configured to determine hybrid automatic repeat request HARQ process numbers of the L TBs. The processing module is configured to determine new data indicator NDI information of the L TBs. The transceiver module is configured to send the downlink control information to a terminal device, where the downlink control information includes a first bit. The first bit includes two bits, a bit status of the first bit belongs to a first state set, the first state set is {01, 10, 11}, N=4, the downlink control information includes a first field, the bit status of the first bit is used to indicate the quantity L of TBs scheduled by the downlink control information, and a bit status of five bits of the first field is used to indicate the HARQ process numbers of the L TBs and the NDI information of the L TBs; or the first bit includes two bits, a bit status of the first bit is a second state, the second state is 00, N=1, a HARQ process index indication field included in the downlink control information is used to indicate a HARQ process number of the one TB, and an NDI field included in the downlink control information is used to indicate NDI information of the one TB. Alternatively, the first bit includes one bit, a bit status of the first bit is a third state, N is greater than 1, the downlink control information includes a second field, and the second field indicates, in a first value set, the quantity L of TBs scheduled by the downlink control information, the HARQ process numbers of the L TBs, and the NDI information of the L TBs; or the first bit includes one bit, a bit status of the first bit is a fourth state, the downlink control information further includes a second bit, the second bit includes one bit, a bit status of the second bit is a fifth state, N is greater than 1, the downlink control information includes a third field, and the third field indicates, in a second value set, the quantity L of TBs scheduled by the downlink control information, the HARQ process numbers of the L TBs, and the NDI information of the L TBs, where the second value set and the first value set are different sets, and a quantity of bits included in the third field is one less than a quantity of bits included in the second field; or the first bit includes one bit, a bit status of the first bit is a fourth state, the downlink control information further includes a second bit, the second bit includes one bit, a bit status of the second bit is a sixth state, N=1, a HARQ process index indication field included in the downlink control information is used to indicate a HARQ process number of the one TB, and an NDI field included in the downlink control information is used to indicate NDI information of the one TB. The transceiver module is configured to: send the L TBs based on the determined HARQ process numbers of the L TBs and the determined NDI information of the L TBs; or receive the L TBs based on the determined HARQ process numbers of the L TBs and the determined NDI information of the L TBs.

In the sixth aspect of this application, composition modules of the network device may further perform the steps described in the second aspect and the possible implementations. For details, refer to the descriptions in the second aspect and the possible implementations.

In a possible implementation, the first bit includes one bit, N=4, the bit status of the first bit is 1, the second field includes six bits, and the six bits of the second field indicate, in the first value set, the quantity L of TBs scheduled by the downlink control information, the HARQ process numbers of the L TBs, and the NDI information of the L TBs; or the first bit includes one bit, N=4, the bit status of the first bit is 0, the bit status of the second bit is 1, the third field includes five bits, and the five bits of the third field indicate, in the second value set, the quantity L of TBs scheduled by the downlink control information, the HARQ process numbers of the L TBs, and the NDI information of the L TBs; or the first bit includes one bit, the bit status of the first bit is 0, the bit status of the second bit is 0, the HARQ process index indication field is used to indicate the HARQ process number of the one TB, and the NDI field is used to indicate the NDI information of the one TB.

In a possible implementation, the first bit includes one bit, and a value set of N is {1, 2, 4, 8}; or a value set of N is {2, 4}; or a value set of N is {1, 4}; or a value set of N is {1, 4, 8}.

According to a seventh aspect, an embodiment of this application provides a terminal device. The terminal device includes a processing module and a transceiver module. The processing module is configured to receive downlink control information from a network device, where the downlink control information can schedule a maximum of four transport blocks TBs, the downlink control information includes a first bit and a second bit, the first bit includes seven bits, and the second bit includes three bits. The processing module is configured to: determine, based on the first bit, a quantity L of transport blocks TBs scheduled by the downlink control information, and determine an index of a modulation and coding scheme MCS based on the first bit.

The processing module is configured to: when L=1, determine that one bit in the second bit is a new data indicator NDI bit, and determine a hybrid automatic repeat request HARQ process number of the one TB based on a bit status of two bits other than the one NDI bit in the second bit; or when L=2, determine that two bits in the second bit are NDI bits, and determine HARQ process numbers of the two TBs based on a bit status of one bit other than the two NDI bits in the second bit and a bit status of the first bit; or when L=3, determine that the three bits in the second bit are NDI bits, and determine HARQ process numbers of the three TBs based on a bit status of the first bit; or when L=4, determine that the three bits in the second bit are NDI bits corresponding to three TBs in the four TBs, and determine, based on a bit status of the first bit, an NDI bit corresponding to one TB in the four TBs other than the three TBs corresponding to the NDI bits. The transceiver module is configured to: send the L TBs based on a determined HARQ process number of each TB in the L TBs, determined NDI information of each TB in the L TBs, and the index of the MCS; or receive the L TBs based on a determined HARQ process number of each TB in the L TBs, determined NDI information of each TB in the L TBs, and the index of the MCS.

In the seventh aspect of this application, composition modules of the terminal device may further perform the steps described in the third aspect and the possible implementations. For details, refer to the descriptions in the third aspect and the possible implementations.

According to an eighth aspect, an embodiment of this application provides a network device. The network device includes a processing module and a transceiver module. The processing module is configured to determine a quantity L of transport blocks TBs scheduled by downlink control information, where the downlink control information can schedule a maximum of N TBs, N and L are positive integers, and 1≤L≤N. The processing module is configured to determine hybrid automatic repeat request HARQ process numbers of the L TBs. The processing module is configured to determine new data indicator NDI information of the L TBs. The transceiver module is configured to send the downlink control information to a terminal device, where the downlink control information includes a first bit and a second bit, the first bit includes seven bits, and the second bit includes three bits. The first bit is used to indicate the quantity L of transport blocks TBs scheduled by the downlink control information, and is further used to indicate an index of a modulation and coding scheme MCS. When L=1, one bit in the second bit is a new data indicator NDI bit, and a bit status of two bits other than the one NDI bit in the second bit is used to indicate a hybrid automatic repeat request HARQ process number of the one TB; or when L=2, two bits in the second bit are NDI bits, and a bit status of one bit other than the two NDI bits in the second bit and a bit status of the first bit are used to indicate HARQ process numbers of the two TBs; or when L=3, the three bits in the second bit are NDI bits, and a bit status of the first bit is used to indicate HARQ process numbers of the three TBs; or when L=4, the three bits in the second bit are NDI bits corresponding to three TBs in the four TBs, and a bit status of the first bit is used to indicate an NDI bit corresponding to one TB in the four TBs other than the three TBs corresponding to the NDI bits. The transceiver module is configured to: send the L TBs based on a determined HARQ process number of each TB in the L TBs, determined NDI information of each TB in the L TBs, and the index of the MCS; or receive the L TBs based on a determined HARQ process number of each TB in the L TBs, determined NDI information of each TB in the L TBs, and the index of the MCS.

In the eighth aspect of this application, composition modules of the network device may further perform the steps described in the fourth aspect and the possible implementations. For details, refer to the descriptions in the fourth aspect and the possible implementations.

In a possible implementation, a value obtained by performing an REM operation on a first value M by using an index indicated by the first bit is 0, L=1, and M is a positive integer; or a value obtained by performing an REM operation on a first value M by using an index indicated by the first bit is 1, L=2, the HARQ process numbers of the two TBs are $\{H_0=b_2, H_1=1+b_2\}$, $H_0$ and $H_1$ represent the HARQ process numbers of the two TBs, and $b_2$ represents the bit status of the one bit other than the two NDI bits in the second bit; or a value obtained by performing an REM operation on a first value M by using an index indicated by the first bit is 2, L=2, the HARQ process numbers of the two TBs are $\{H_0=0, H_1=2+b_2\}$, $H_0$ and $H_1$ represent the HARQ process numbers of the two TBs, and $b_2$ represents the bit status of the one bit other than the two NDI bits in the second bit; or a value obtained by performing an REM operation on a first value M by using an index indicated by the first bit is 3, L=2, the HARQ process numbers of the two TBs are $\{H_0=b_2, H_1=3\}$, $H_0$ and $H_1$ represent the HARQ process numbers of the two TBs, and $b_2$ represents the bit status of the one bit other than the two NDI bits in the second bit; or a value obtained by performing an REM operation on a first value M by using an index indicated by the first bit is 4, L=3, the HARQ process numbers of the three TBs are $\{H_0=0, H_1=1, H_2=2\}$, and $H_0$, $H_1$, and $H_2$ represent the HARQ process numbers of the three TBs; or a value obtained by performing an REM operation on a first value M by using an index indicated by the first bit is 5, L=3, the HARQ process numbers of the three TBs are $\{H_0=0, H_1=1, H_2=3\}$, and $H_0$, $H_1$, and $H_2$ represent the HARQ process numbers of the three TBs; or a value obtained by performing an REM operation on a first value M by using an index indicated by the first bit is 6, L=3, the HARQ process numbers of the three TBs are $\{H_0=0, H_1=2, H_2=3\}$, and $H_0$, $H_1$, and $H_2$ represent the HARQ process numbers of the three TBs; or a value obtained by performing an REM operation on a first value M by using an index indicated by the first bit is 7, L=3, the HARQ process numbers of the three TBs are $\{H_0=1, H_1=2, H_2=3\}$, and $H_0$, $H_1$, and $H_2$ represent the HARQ process numbers of the three TBs; or a value obtained by performing an REM operation on a first value M by using an index indicated by the first bit is 8, L=4, and NDI information corresponding to the one TB in the four TBs other than the three TBs corresponding to the NDI bits is 0; or a value obtained by performing an REM operation on a first value M by using an index indicated by the first bit is 9, L=4, and NDI information corresponding to the one TB in the four TBs other than the three TBs corresponding to the NDI bits is 1.

In a possible implementation, the index of the MCS is floor(index indicated by the first bit/M), where floor represents a floor function, and / represents a division operation.

In a possible implementation, M=10.

According to a ninth aspect, an embodiment of this application provides a computer-readable storage medium. The computer-readable storage medium stores instructions. When the instructions are run on a computer, the computer is enabled to perform the methods according to the first to the fourth aspects.

According to a tenth aspect, an embodiment of this application provides a computer program product including instructions. When the instructions are run on a computer, the computer is enabled to perform the methods according to the first to the fourth aspects.

According to an eleventh aspect, an embodiment of this application provides a communication device. The communication device may include an entity, for example, a terminal device or a network device. The communication device includes a processor and a memory. The memory is configured to store instructions. The processor is configured to execute the instructions in the memory, to enable the communication device to perform the method according to the first aspect or the fourth aspect.

According to a twelfth aspect, an embodiment of this application provides a chip system. The chip system includes a processor, configured to support a communication device in implementing the function in the foregoing aspects, for example, sending or processing data and/or information in the foregoing methods. In a possible design, the chip system further includes a memory. The memory is configured to store program instructions and data that are necessary for the communication device. The chip system may include a chip, or may include a chip and another discrete component.

According to a thirteenth aspect, an embodiment of this application provides a communication device, including a processor and a communication interface. The communication interface is configured to: receive a signal from another communication device other than the communication device and transmit the signal to the processor, or send a signal from the processor to another communication device other than the communication device. The processor is configured to implement the method in any one of the first aspect to the fourth aspect by using a logical circuit or an executable code instruction.

BRIEF DESCRIPTION OF THE DRAWINGS

FIG. 2A and FIG. 2B are a schematic diagram of an interaction procedure of an information processing method according to an embodiment of this application;

FIG. 4A and FIG. 4B are a schematic diagram of an interaction procedure of an information processing method according to an embodiment of this application;

DETAILED DESCRIPTION OF ILLUSTRATIVE EMBODIMENTS

Figure 1:
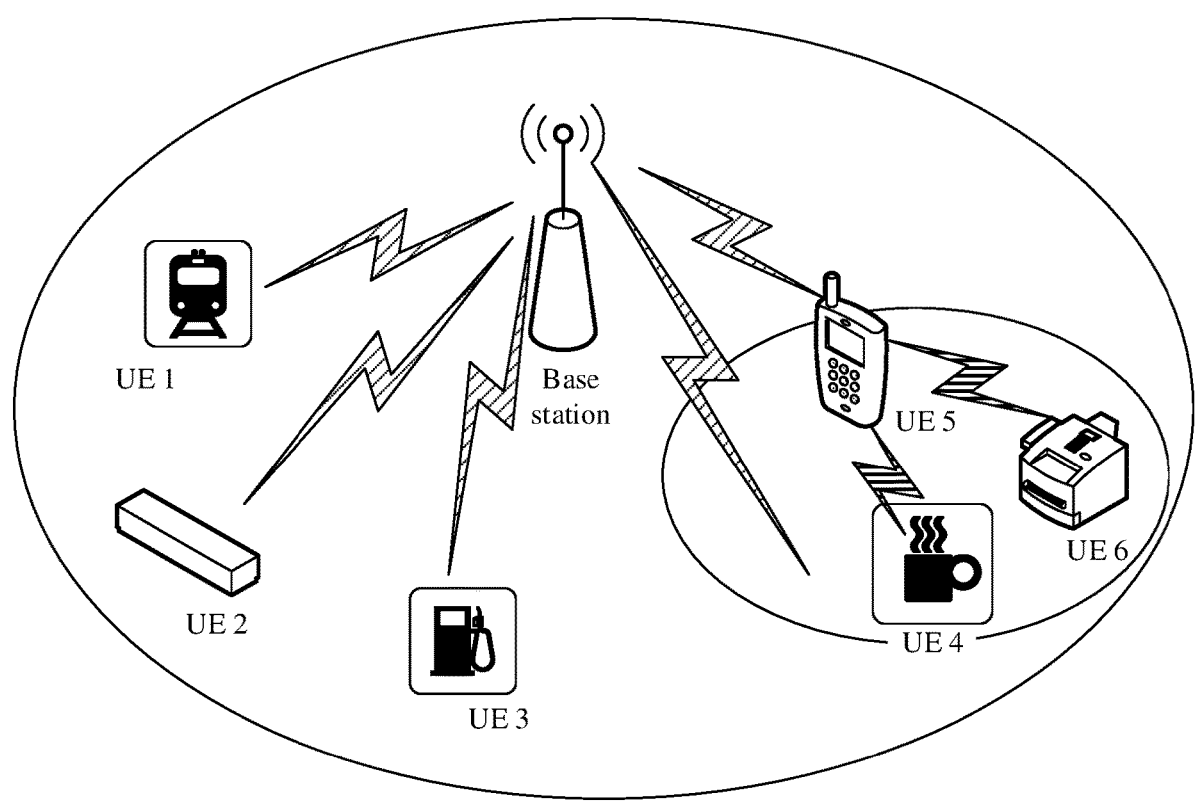
FIG. 1 is a schematic diagram of a system architecture of an information processing method according to an embodiment of this application.

Embodiments of this application provide an information processing method, a terminal device, and a network device, to improve flexibility of downlink control information scheduling.

The following describes the embodiments of this application with reference to the accompanying drawings.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "have", and any other variations thereof are intended to cover a non-exclusive inclusion, so that a process, method, system, product, or device that includes a series of units is not limited to those units, but may include other units not expressly listed or inherent to such a process, method, product, or device.

The technical solutions in the embodiments of this application may be applied to various communication systems for data processing, for example, a code division multiple access (CDMA) system, a time division multiple access (TDMA) system, a frequency division multiple access (FDMA) system, an orthogonal frequency division multiple access (OFDMA) system, a single-carrier frequency division multiple access (single carrier FDMA, SC-FDMA) system, and other systems. Terms "system" and "network" may be interchanged with each other. The CDMA system may implement wireless technologies such as universal terrestrial radio access (UTRA) and CDMA2000. The UTRA may include a wideband CDMA (WCDMA) technology and another variant technology of CDMA. CDMA2000 may cover the interim standard (IS) 2000 (IS-2000), the IS-95 standard, and the IS-856 standard. The TDMA system may implement wireless technologies such as a global system for mobile communication (GSM). The OFDMA system may implement wireless technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. The UTRA corresponds to a UMTS, and the E-UTRA corresponds to an evolved version of the UMTS. A new version of the UMTS that uses the E-UTRA is used in long term evolution (LTE) and various versions evolved based on LTE in 3GPP. A 5th generation (5G) communication system, a new radio (NR) communication system, and a future 6th generation (6G) mobile communication system are next-generation communication systems being studied. The technical solutions in the embodiments of this application may be applied to various communication systems such as V2X, LTE-V, V2V, the Internet of Vehicles, MTC, the IoT, LTE-M, M2M, and the Internet of Things. In addition, the communication system is further applicable to a future-oriented communication technology, and is applicable to the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

The communication system provided in the embodiments of this application may include a first communication device and a second communication device, and data transmission may be performed between the first communication device and the second communication device. For example, the first communication device may include a terminal device, and the second communication device may include a network device. Alternatively, the first communication device may include one terminal device, and the second communication device may include another terminal device. Alternatively, the first communication device may include one network device, and the second communication device may include another network device.

FIG. 1 is a schematic diagram of a structure of a possible radio access network (radio access network, RAN) according to an embodiment of this application. The RAN may be a base station access system in a 2G network (to be specific, the RAN includes a base station and a base station controller), a base station access system in a 3G network (to be specific, the RAN includes a base station and an RNC), a base station access system in a 4G network (to be specific, the RAN includes an eNB and an RNC), or a base station access system in a 5G network.

The RAN includes one or more network devices. The network device may be any device having a wireless transceiver function, or a chip disposed in a device having a wireless transceiver function. The network device includes but is not limited to a base station (for example, a base station BS, a NodeB NodeB, an evolved NodeB eNodeB or eNB, a gNodeB gNodeB or a gNB in a 5th generation 5G communication system, a base station in a future communication system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. A core network may support a network using the foregoing one or more technologies, or a future evolved network. The base station may include one or more co-site or non-co-site transmission reception points (TRP). The network device may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting the 5G network, or may support a dual connection to a base station in an LTE network and a base station in the 5G network. For example, the terminals are connected to a RAN node of a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home NodeB (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The terminal devices 1 to 6 each are also referred to as user equipment (UE), a mobile station (MS), a mobile terminal (MT), a terminal, or the like, and is a device that provides voice and/or data connectivity for a user, or is a chip disposed in the device, for example, a handheld device or a vehicle-mounted device having a wireless connection function. Currently, for example, the terminal device is a mobile phone, a tablet computer, a notebook computer, a palmtop computer, a mobile internet device (MID), a wearable device, a virtual reality (virtual reality, VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, or a wireless terminal in a smart home. The terminal device provided in the embodiments of this application may be a low-complexity terminal device and/or a terminal device in a coverage enhancement mode A.

In the embodiments of this application, the base station and UE 1 to UE 6 form a communication system, and in the communication system, the base station sends one or more of system information, a RAR message, and a paging message to one or more of the UE 1 to the UE 6. In addition, the UE 4 to the UE 6 also form a communication system, and in the communication system, the UE 5 may function as a base station, and the UE 5 may send one or more of system information, control information, and a paging message to one or more of the UE 4 and the UE 6.

In this application, transmission may be sending or receiving. When one side of communication performs sending, a peer device of the communication performs receiving. A TB may be a TB for uplink transmission, or may be a TB for downlink transmission.

The following defines the $i^{th}$ TB in the present invention. DCI indicates or schedules N HARQ processes, and N HARQ process numbers are arranged in ascending order. It is assumed that HARQ process numbers obtained after the N HARQ process numbers are arranged in ascending (or decreasing) order are M(0), M(1), . . . , and M(N−1). A HARQ process number of the $i^{th}$ TB is M(i−1), where i=1, . . . , or N.

Figure 2A:
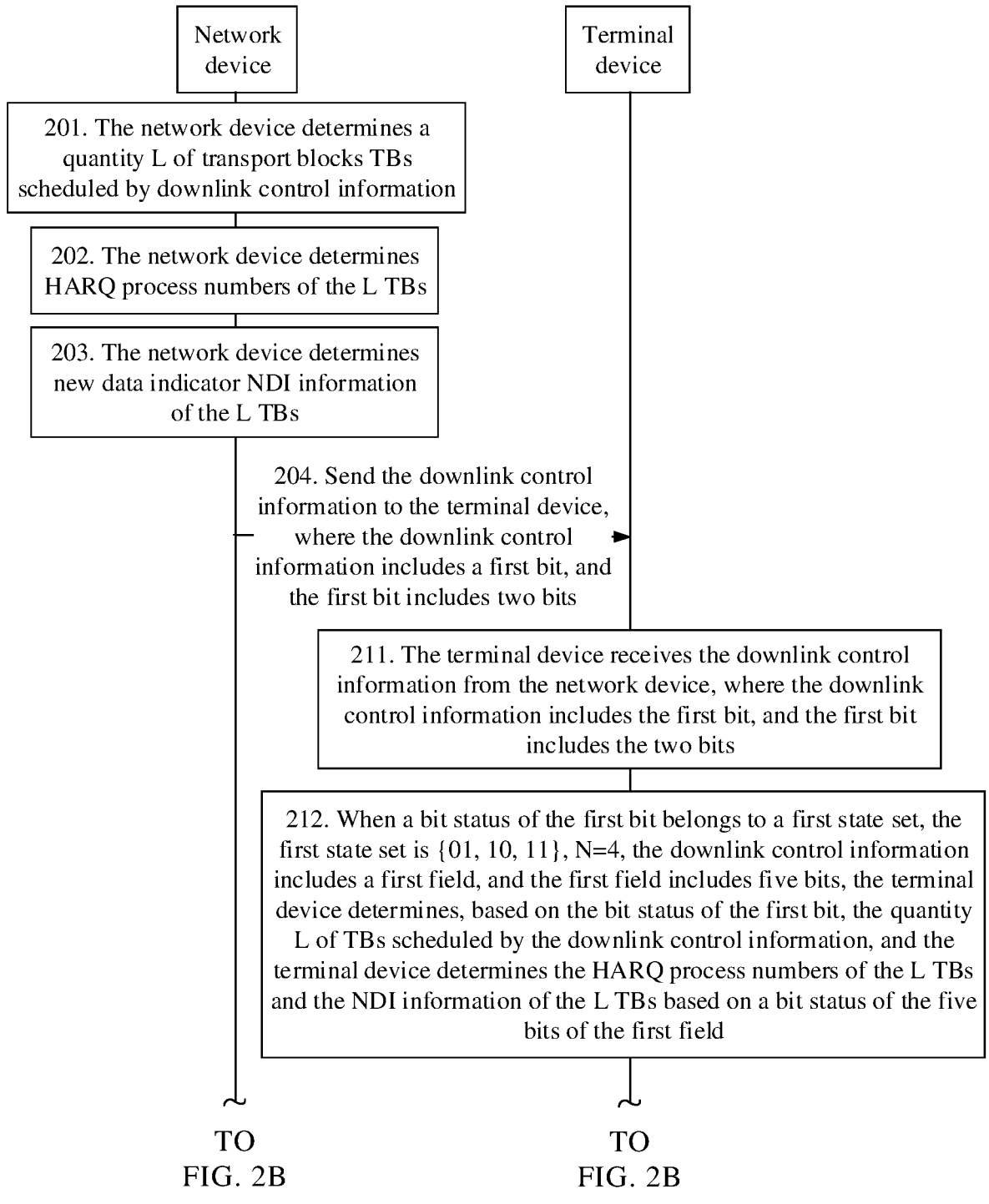

FIG. 2A and FIG. 2B are a schematic diagram of an interaction procedure of an information processing method according to an embodiment of this application. The following step 201 to step 206 are described from a network device side, and the following step 211 to step 215 are described from a terminal device side. The method mainly includes the following steps.

201. A network device determines a quantity L of transport blocks TBs scheduled by downlink control information, where the downlink control information can schedule a maximum of N TBs, N and L are positive integers, and is 1≤L≤N.

The downlink control information may schedule one or more TBs. For example, a quantity of TBs scheduled by the downlink control information is represented by the letter L. The downlink control information can schedule a maximum of N TBs, N is a positive integer, L is a positive integer, and is 1≤L≤N. A specific value of L is not limited herein.

The quantity L of transport blocks TBs scheduled by the downlink control information may also be a quantity L of hybrid automatic repeat request HARQ processes indicated by the downlink control information, that is, the quantity of TBs corresponds to the quantity of HARQ processes.

202. The network device determines HARQ process numbers of the L TBs.

In this embodiment of this application, when the network device determines that the quantity of TBs scheduled by the downlink control information is L, the network device further needs to determine the HARQ process numbers of the L TBs, for example, determine a HARQ process number of each TB in the L TBs. The HARQ process number may also be referred to as a HARQ process index. For example, when N is equal to 4, a maximum of four process numbers: $H_0$, $H_1$, $H_2$, and $H_3$ may be used for the TBs scheduled by the downlink control information.

203. The network device determines new data indicator NDI information of the L TBs.

In this embodiment of this application, when the network device determines that the quantity of TBs scheduled by the downlink control information is L, the network device further needs to determine the NDI information of the L TBs. For example, the network device needs to determine NDI information of each TB in the L TBs. For example, the NDI information is carried in the downlink control information.

It should be noted that the NDI information indicates whether the TB scheduled by the downlink control information is a newly transmitted TB or a retransmitted TB. For example, the NDI information may include feedback information of each TB in the L TBs, and the feedback information of the TB may also be referred to as answer information of the TB.

Step 202 and step 203 are not limited to a specific time sequence. For example, the network device may first perform either of step 202 and step 203, or the network device simultaneously performs step 202 and step 203. This is not limited herein.

204. The network device sends the downlink control information to a terminal device, where the downlink control information includes a first bit, and the first bit includes two bits.

A bit status of the first bit belongs to a first state set, the first state set is {01, 10, 11}, N=4, the downlink control information includes a first field, the bit status of the first bit is used to indicate the quantity L of TBs scheduled by the downlink control information, and a bit status of five bits of the first field is used to indicate the HARQ process numbers of the L TBs and the NDI information of the L TBs; or a bit status of the first bit is a second state, the second state is 00, N=1, a HARQ process index indication field included in the downlink control information is used to indicate a HARQ process number of the one TB, and an NDI field included in the downlink control information is used to indicate NDI information of the one TB.

The first bit includes the two bits, and the bit status of the first bit has four types: 01, 10, 11, and 00, where 01, 10, and 11 belong to the first state set, and 00 is the second state. Based on whether the bit status of the first bit belongs to the first state set or is the second state, the downlink control information includes different fields, to indicate a HARQ process number and NDI information of each TB for different values of L.

Figure 3A:
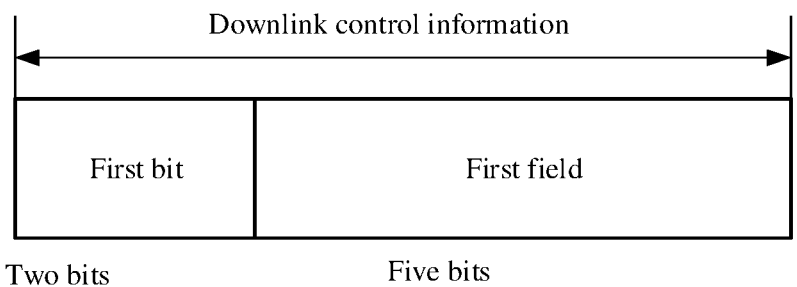
FIG. 3a is a schematic diagram of a composition structure of downlink control information according to an embodiment of this application.

As shown in FIG. 3a, the first bit includes two bits. If the bit status of the first bit is 01, 10, or 11, the bit status of the first bit belongs to the first state set. Each type of bit state of the first bit may correspond to one value of L. For example, the bit status 01 of the first bit corresponds to L=2, the bit status 10 of the first bit corresponds to L=3, and the bit status 11 of the first bit corresponds to L=4. In this case, the downlink control information includes the first field, and a field name of the first field is not limited. The first field includes five bits, that is, a size of the first field may be five bits. The bit status of the five bits of the first field is used to indicate the HARQ process numbers of the L TBs and the NDI information of the L TBs. For example, the five bits can represent $2^5$ types of bit states, that is, 32 types of states may be used to indicate a HARQ process number corresponding to each TB and whether each TB is a newly transmitted TB or a retransmitted TB.

Figure 3B:
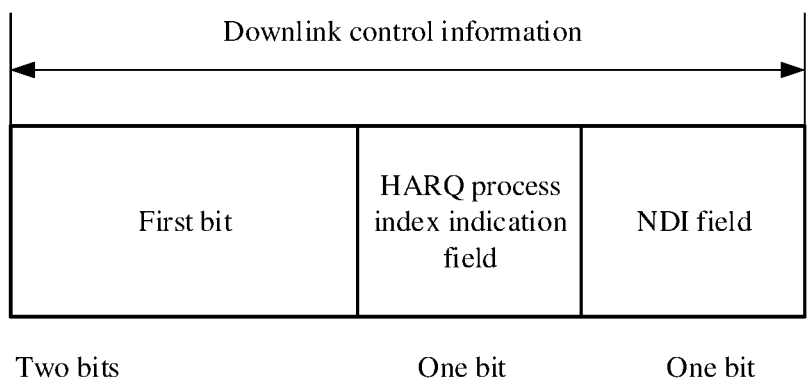
FIG. 3b is a schematic diagram of a composition structure of downlink control information according to an embodiment of this application.

As shown in FIG. 3b, the first bit includes two bits. If the bit status of the first bit is 00, the bit status of the first bit is the second state. In this case, N=1, the downlink control information schedules a single TB, and the downlink control information may include the HARQ process index indication field and the NDI field. The HARQ process index indication field occupies one bit, the NDI field occupies one bit, the HARQ process index indication field is used to indicate the HARQ process number of the one TB, and the NDI field is used to indicate the NDI information of the one TB. In this embodiment of this application, there is no need to separately use one bit in the downlink control information to indicate single-TB scheduling or multi-TB scheduling. Therefore, when N=4, a maximum of only seven bits need to be used to support scheduling by one piece of downlink control information for any quantity of TBs in the N TBs, and any HARQ process number used for each scheduled TB can be indicated. This improves scheduling flexibility and reduces bit overheads of the downlink control information.

In this embodiment of this application, the downlink control information can simultaneously schedule a newly transmitted TB and a retransmitted TB, where "can" refers to a capability of scheduling different types of TBs (for example, the newly transmitted TB and the retransmitted TB) by the network device by using the downlink control information. The downlink control information can simultaneously schedule the newly transmitted TB and the retransmitted TB. However, the network device may determine, based on a TB type that needs to be fed back, a type of a TB actually scheduled in the downlink control information.

211. The terminal device receives the downlink control information from the network device, where the downlink control information can schedule a maximum of N transport blocks TBs, N is a positive integer, the downlink control information includes the first bit, and the first bit includes the two bits.

The network device sends the downlink control information to the terminal device. The downlink control information includes the first bit, and the first bit includes the two bits. Based on different values of the bit status of the first bit, the terminal device parses the downlink control information in different manners. For example, if the bit status of the first bit belongs to the first state set, the terminal device performs step 212. For another example, if the bit status of the first bit is the second state, the terminal device performs step 213.

212. When the bit status of the first bit belongs to the first state set, the first state set is {01, 10, 11}, N=4, the downlink control information includes the first field, and the first field includes the five bits, the terminal device determines, based on the bit status of the first bit, the quantity L of TBs scheduled by the downlink control information, and the terminal device determines the hybrid automatic repeat request HARQ process numbers of the L TBs and the new data indicator NDI information of the L TBs based on the bit status of the five bits of the first field.

213. When the bit status of the first bit is the second state, the second state is 00, and N=1, the terminal device determines the HARQ process number of the one TB based on the HARQ process index indication field included in the downlink control information, and determines the NDI information of the one TB based on the NDI field included in the downlink control information.

In this embodiment of this application, when the bit status of the first bit belongs to the first state set, step 212 may be performed. When the bit status of the first bit is the second state, step 213 may be performed. Specifically, which step is to be performed needs to be determined based on the bit status that is of the first bit and that is determined by the network device. This is not limited herein.

As shown in FIG. 3a, the first bit includes two bits. If the bit status of the first bit is 01, 10, or 11, the bit status of the first bit belongs to the first state set. Each type of bit state of the first bit may correspond to one value of L. For example, the bit status 01 of the first bit corresponds to L=2, the bit status 10 of the first bit corresponds to L=3, and the bit status 11 of the first bit corresponds to L=4. In this case, the downlink control information includes the first field, and a field name of the first field is not limited. The first field includes five bits, that is, a size of the first field may be five bits. The bit status of the five bits of the first field is used to indicate the HARQ process numbers of the L TBs and the NDI information of the L TBs. For example, the five bits can represent $2^5$ types of bit states, that is, 32 types of states may be used to indicate a HARQ process number corresponding to each TB and whether each TB is a newly transmitted TB or a retransmitted TB.

As shown in FIG. 3b, the first bit includes two bits. If the bit status of the first bit is 00, the bit status of the first bit is the second state. In this case, N=1, the downlink control information schedules a single TB, and the downlink control information may include the HARQ process index indication field and the NDI field. The HARQ process index indication field occupies one bit, the NDI field occupies one bit, the HARQ process index indication field is used to indicate the HARQ process number of the one TB, and the NDI field is used to indicate the NDI information of the one TB. In this embodiment of this application, there is no need to separately use one bit in the downlink control information to indicate single-TB scheduling or multi-TB scheduling. Therefore, when N=4, a maximum of only seven bits need to be used to support scheduling by one piece of downlink control information for any quantity of TBs in the N TBs, and any HARQ process number used for each scheduled TB can be indicated. This improves scheduling flexibility and reduces bit overheads of the downlink control information.

This embodiment of this application is applicable to an uplink transmission scenario, or is applicable to a downlink transmission scenario. For example, during downlink transmission, the network device sends the L TBs, and the terminal device receives the L TBs. During uplink transmission, the terminal device sends the L TBs, and the network device receives the L TBs. In a scenario in which the L TBs are downlink-transmitted, the following step 205 and step 214 are performed.

205. The network device sends the L TBs based on the determined HARQ process numbers of the L TBs and the determined NDI information of the L TBs.

214. The terminal device receives the L TBs based on a determined HARQ process number of each TB in the L TBs and determined NDI information of each TB in the L TBs.

This embodiment of this application is applicable to an uplink transmission scenario, or is applicable to a downlink transmission scenario. For example, during downlink transmission, the network device sends the L TBs, and the terminal device receives the L TBs. During uplink transmission, the terminal device sends the L TBs, and the network device receives the L TBs. In a scenario in which the L TBs are uplink-transmitted, the following step 215 and step 206 are performed.

215. The terminal device sends the L TBs based on a determined HARQ process number of each TB in the L TBs and determined NDI information of each TB in the L TBs.

206. The network device receives the L TBs based on the determined HARQ process numbers of the L TBs and the determined NDI information of the L TBs.

It can be learned from the example in the foregoing embodiment that the network device sends the downlink control information to the terminal device, the downlink control information can schedule a maximum of N TBs, and the downlink control information includes the first bit. When the first bit includes the two bits, the bit status of the first bit belongs to the first state set, the first state set is {01, 10, 11}, N=4, the downlink control information includes the first field, and the first field includes the five bits, the terminal device determines, based on the bit status of the first bit, the quantity L of TBs scheduled by the downlink control information, and the terminal device determines the HARQ process numbers of the L TBs and the NDI information of the L TBs based on the bit status of the five bits of the first field; or when the first bit includes the two bits, the bit status of the first bit is the second state, the second state is 00, and N=1, the terminal device determines the HARQ process number of the one TB based on the HARQ process index indication field included in the downlink control information, and determines the NDI information of the one TB based on the NDI field included in the downlink control information. In this embodiment of this application, the first bit includes two bits, the bit status of the first bit may belong to the first state set or may be the second state, and the terminal device may perform multi-TB scheduling or single-TB scheduling based on the first bit. When the bit status of the first bit belongs to the first state set, the first state set is {01, 10, 11}, N=4, the downlink control information includes the first field, and the first field includes five bits, the bit status of the first bit can be used to determine the quantity L of TBs scheduled by the downlink control information, and the bit status of the five bits of the first field can be used to determine the HARQ process numbers of the L TBs and the NDI information of the L TBs, so that the downlink control information supports scheduling for any quantity of TBs in the N TBs, and may indicate any HARQ process number and any NDI information used for each scheduled TB. This improves scheduling flexibility.

Figure 4A:
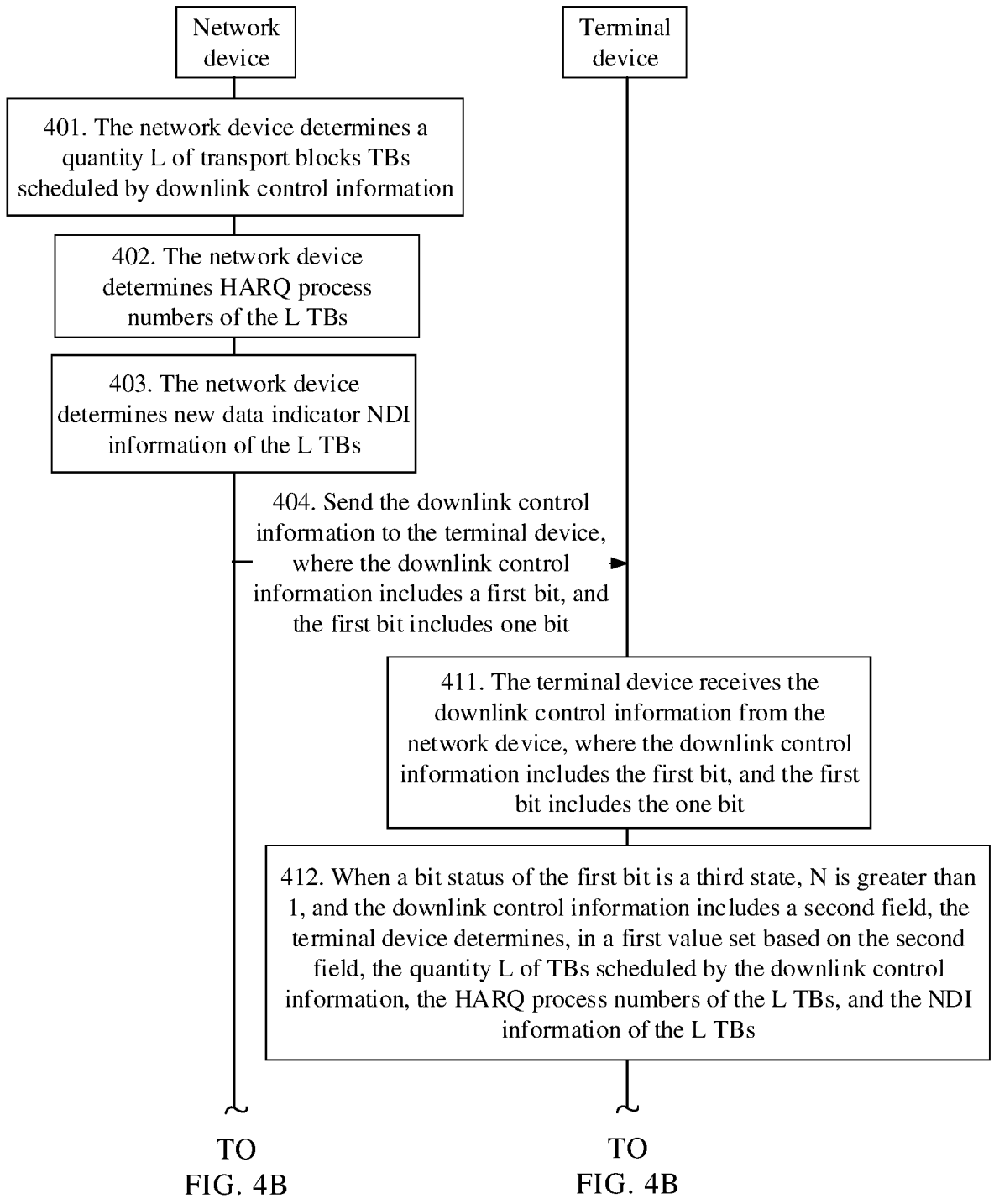

FIG. 4A and FIG. 4B are a schematic diagram of an interaction procedure of an information processing method according to an embodiment of this application. The following step 401 to step 406 are described from a network device side, and the following step 411 to step 416 are described from a terminal device side. The method mainly includes the following steps.

401. A network device determines a quantity L of transport blocks TBs scheduled by downlink control information, where the downlink control information can schedule a maximum of N TBs, N and L are positive integers, and is 1≤L≤N.

402. The network device determines hybrid automatic repeat request HARQ process numbers of the L TBs.

403. The network device determines new data indicator NDI information of the L TBs.

An execution manner of step 401 to step 403 is similar to an execution manner of step 201 to step 203 in the foregoing embodiment, and details are not described herein again.

404. The network device sends the downlink control information to a terminal device, where the downlink control information includes a first bit, and the first bit includes one bit.

Figure 5A:
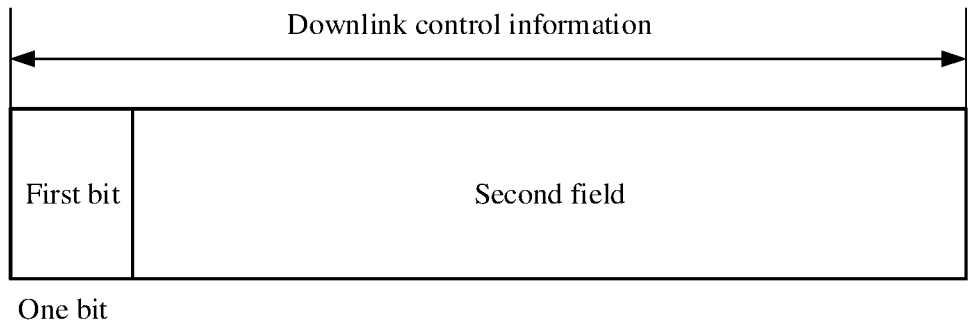
FIG. 5a is a schematic diagram of a composition structure of downlink control information according to an embodiment of this application.

As shown in FIG. 5a, a bit status of the first bit is a third state, N is greater than 1, the downlink control information includes a second field, and the second field indicates, in a first value set, the quantity L of TBs scheduled by the downlink control information, the HARQ process numbers of the L TBs, and the NDI information of the L TBs.

Figure 5B:
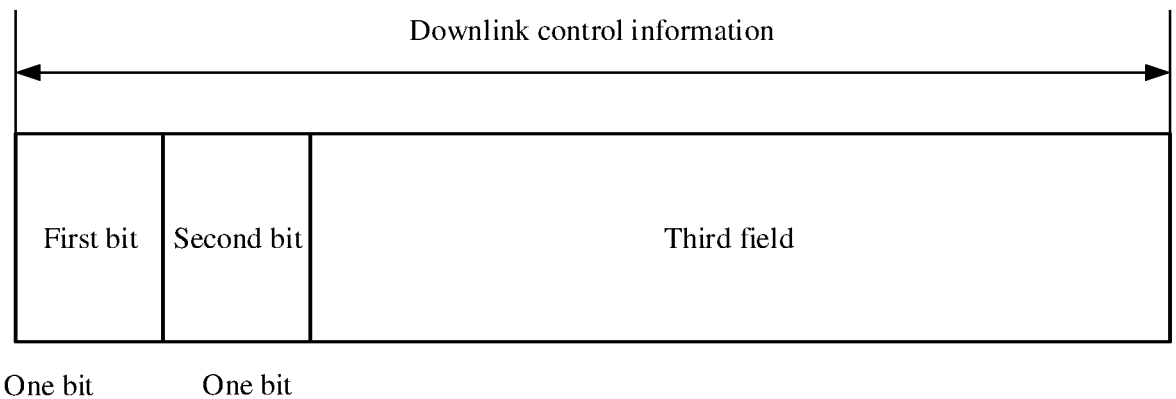
FIG. 5b is a schematic diagram of a composition structure of downlink control information according to an embodiment of this application.

As shown in FIG. 5b, a bit status of the first bit is a fourth state, the downlink control information further includes a second bit, the second bit includes one bit, a bit status of the second bit is a fifth state, N is greater than 1, the downlink control information includes a third field, and the third field indicates, in a second value set, the quantity L of TBs scheduled by the downlink control information, the HARQ process numbers of the L TBs, and the NDI information of the L TBs. The second value set and the first value set are different sets, and a quantity of bits included in the third field is one less than a quantity of bits included in the second field.

Figure 5C:
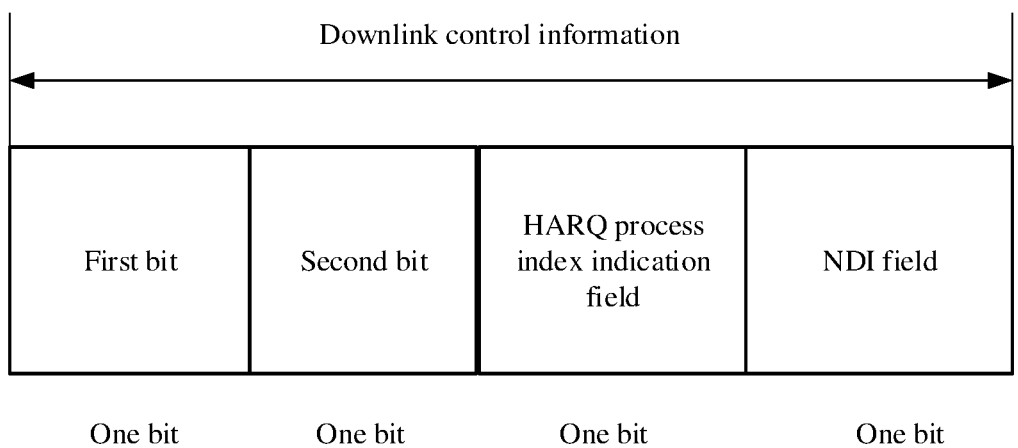
FIG. 5c is a schematic diagram of a composition structure of downlink control information according to an embodiment of this application.

As shown in FIG. 5c, a bit status of the first bit is a fourth state, the downlink control information further includes a second bit, the second bit includes one bit, a bit status of the second bit is a sixth state, N=1, a HARQ process index indication field included in the downlink control information is used to indicate a HARQ process number of the one TB, and an NDI field included in the downlink control information is used to indicate NDI information of the one TB.

For example, the third state may be 1. When the bit status of the first bit is the third state, and N is greater than 1, it indicates that the downlink control information schedules a plurality of TBs. In this case, in addition to the first bit, the downlink control information may further include the second field. The second field indicates, in the first value set, the quantity L of TBs scheduled by the downlink control information, the HARQ process numbers of the L TBs, and the NDI information of the L TBs. For example, an index corresponding to a bit status of the second field belongs to the first value set. Alternatively, a value indicated by the second field belongs to the first value set. For example, if a size of the downlink control information is seven bits, and the first bit includes one bit, the second field includes six bits, and a bit status of the six bits of the second field is used to indicate L, the HARQ process numbers of the L TBs, and the NDI information of the L TBs. For example, the six bits can represent $2^6$ types of bit states, that is, 64 types of states may be used to indicate a HARQ process number corresponding to each TB and whether each TB is a newly transmitted TB or a retransmitted TB.

For example, the fourth state may be 0. When the bit status of the first bit is the fourth state, the downlink control information further includes the second bit, the second bit includes one bit, the bit status of the second bit is the fifth state, for example, the fifth state is 1, and N is greater than 1, it indicates that the downlink control information schedules a plurality of TBs. In addition to the first bit and the second bit, the downlink control information further includes the third field. The third field indicates, in the second value set, the quantity L of TBs scheduled by the downlink control information, the HARQ process numbers of the L TBs, and the NDI information of the L TBs. That the third field performs indication in the second value set may be that an index corresponding to a bit status of the third field belongs to the second value set. Alternatively, that the third field performs indication in the second value set may be that a value indicated by the third field belongs to the second value set. For example, if a size of the downlink control information is seven bits, the first bit includes one bit, and the second bit includes one bit, the third field includes five bits, and a bit status of the five bits of the third field is used to indicate L, the HARQ process numbers of the L TBs, and the NDI information of the L TBs. For example, the five bits can represent $2^5$ types of bit states, that is, 32 types of states may be used to indicate a HARQ process number corresponding to each TB and whether each TB is a newly transmitted TB or a retransmitted TB.

The second value set and the first value set are different sets, and the quantity of bits included in the third field is one less than the quantity of bits included in the second field. For example, the third field includes five bits, and the second field includes six bits. For different values of the bit status of the first bit, the downlink control information includes different fields. The terminal device needs to determine, based on an indication of the first bit, a specific manner to be used to parse the downlink control information.

For example, the fourth state may be 0. When the bit status of the first bit is the fourth state, the downlink control information further includes the second bit, the second bit includes one bit, the bit status of the second bit is the sixth state, for example, the sixth state is 0, and N=1, it indicates that the downlink control information schedules a single TB. The downlink control information may include the HARQ process index indication field and the NDI field. The HARQ process index indication field occupies one bit, the NDI field occupies one bit, the HARQ process index indication field is used to indicate the HARQ process number of the one TB, and the NDI field is used to indicate the NDI information of the one TB. In this embodiment of this application, scheduling by one piece of downlink control information for any quantity of TBs in the N TBs can be supported, and any HARQ process number used for each scheduled TB can be indicated, without separately using one bit in the downlink control information to indicate single-TB scheduling or multi-TB scheduling. This improves scheduling flexibility and reduces bit overheads of the downlink control information.

411. The terminal device receives the downlink control information from the network device, where the downlink control information can schedule a maximum of N transport blocks TBs, N is a positive integer, the downlink control information includes the first bit, and the first bit includes the one bit.

The network device sends the downlink control information to the terminal device. The downlink control information includes the first bit, and the first bit includes the one bit. Based on different values of the bit status of the first bit, the terminal device parses the downlink control information in different manners. For example, when the bit status of the first bit is the third state, the terminal device performs step 412. For another example, when the bit status of the first bit is the fourth state, and the second bit is in the fifth state, the terminal device performs step 413. For another example, when the bit status of the first bit is the fourth state, and the second bit is in the sixth state, the terminal device performs step 414.

412. When the bit status of the first bit is the third state, N is greater than 1, and the downlink control information includes the second field, the terminal device determines, in the first value set based on the second field, the quantity L of TBs scheduled by the downlink control information, the HARQ process numbers of the L TBs, and the NDI information of the L TBs.

413. When the bit status of the first bit is the fourth state, the downlink control information further includes the second bit, the second bit includes the one bit, the bit status of the second bit is the fifth state, N is greater than 1, and the downlink control information includes the third field, the terminal device determines, in the second value set based on the third field, the quantity L of TBs scheduled by the downlink control information, the HARQ process numbers of the L TBs, and the NDI information of the L TBs, where the second value set and the first value set are different sets, and the quantity of bits included in the third field is one less than the quantity of bits included in the second field.

414. When the bit status of the first bit is the fourth state, the downlink control information further includes the second bit, the second bit includes the one bit, the bit status of the second bit is the sixth state, and N=1, the terminal device determines the HARQ process number of the one TB based on the HARQ process index indication field included in the downlink control information, and determines the NDI information of the one TB based on the NDI field included in the downlink control information.

As shown in FIG. 5a, a bit status of the first bit is a third state, N is greater than 1, the downlink control information includes a second field, and the second field indicates, in a first value set, the quantity L of TBs scheduled by the downlink control information, the HARQ process numbers of the L TBs, and the NDI information of the L TBs.

As shown in FIG. 5b, a bit status of the first bit is a fourth state, the downlink control information further includes a second bit, the second bit includes one bit, a bit status of the second bit is a fifth state, N is greater than 1, the downlink control information includes a third field, and the third field indicates, in a second value set, the quantity L of TBs scheduled by the downlink control information, the HARQ process numbers of the L TBs, and the NDI information of the L TBs. The second value set and the first value set are different sets, and a quantity of bits included in the third field is one less than a quantity of bits included in the second field.

As shown in FIG. 5c, a bit status of the first bit is a fourth state, the downlink control information further includes a second bit, the second bit includes one bit, a bit status of the second bit is a sixth state, N=1, a HARQ process index indication field included in the downlink control information is used to indicate a HARQ process number of the one TB, and an NDI field included in the downlink control information is used to indicate NDI information of the one TB.

For example, the third state may be 1. When the bit status of the first bit is the third state, and N is greater than 1, it indicates that the downlink control information schedules a plurality of TBs. In this case, in addition to the first bit, the downlink control information may further include the second field. The second field indicates, in the first value set, the quantity L of TBs scheduled by the downlink control information, the HARQ process numbers of the L TBs, and the NDI information of the L TBs. That the second field performs indication in the first value set may be that an index corresponding to a bit status of the second field belongs to the first value set. Alternatively, that the second field performs indication in the first value set may be that a value indicated by the second field belongs to the first value set. For example, if a size of the downlink control information is seven bits, and the first bit includes one bit, the second field includes six bits, and a bit status of the six bits of the second field is used to indicate L, the HARQ process numbers of the L TBs, and the NDI information of the L TBs. For example, the six bits can represent $2^6$ types of bit states, that is, 64 types of states may be used to indicate a HARQ process number corresponding to each TB and whether each TB is a newly transmitted TB or a retransmitted TB.

For example, the fourth state may be 0. When the bit status of the first bit is the fourth state, the downlink control information further includes the second bit, the second bit includes one bit, the bit status of the second bit is the fifth state, for example, the fifth state is 1, and N is greater than 1, it indicates that the downlink control information schedules a plurality of TBs. In addition to the first bit and the second bit, the downlink control information further includes the third field. The third field indicates, in the second value set, the quantity L of TBs scheduled by the downlink control information, the HARQ process numbers of the L TBs, and the NDI information of the L TBs. That the third field performs indication in the second value set may be that an index corresponding to a bit status of the third field belongs to the second value set. Alternatively, that the third field performs indication in the second value set may be that a value indicated by the third field belongs to the second value set. For example, if a size of the downlink control information is seven bits, the first bit includes one bit, and the second bit includes one bit, the third field includes five bits, and a bit status of the five bits of the third field is used to indicate L, the HARQ process numbers of the L TBs, and the NDI information of the L TBs. For example, the five bits can represent $2^5$ types of bit states, that is, 32 types of states may be used to indicate a HARQ process number corresponding to each TB and whether each TB is a newly transmitted TB or a retransmitted TB.

The second value set and the first value set are different sets, and the quantity of bits included in the third field is one less than the quantity of bits included in the second field. For example, the third field includes five bits, and the second field includes six bits. For different values of the bit status of the first bit, the downlink control information includes different fields. The terminal device needs to determine, based on an indication of the first bit, a specific manner to be used to parse the downlink control information.

For example, the fourth state may be 0. When the bit status of the first bit is the fourth state, the downlink control information further includes the second bit, the second bit includes one bit, the bit status of the second bit is the sixth state, for example, the sixth state is 0, and N=1, it indicates that the downlink control information schedules a single TB. The downlink control information may include the HARQ process index indication field and the NDI field. The HARQ process index indication field occupies one bit, the NDI field occupies one bit, the HARQ process index indication field is used to indicate the HARQ process number of the one TB, and the NDI field is used to indicate the NDI information of the one TB. In this embodiment of this application, scheduling by one piece of downlink control information for any quantity of TBs in the N TBs can be supported, and any HARQ process number used for each scheduled TB can be indicated, without separately using one bit in the downlink control information to indicate single-TB scheduling or multi-TB scheduling. This improves scheduling flexibility and reduces bit overheads of the downlink control information.

This embodiment of this application is applicable to an uplink transmission scenario, or is applicable to a downlink transmission scenario. For example, during downlink transmission, the network device sends the L TBs, and the terminal device receives the L TBs. During uplink transmission, the terminal device sends the L TBs, and the network device receives the L TBs. In a scenario in which the L TBs are downlink-transmitted, the following step 405 and step 415 are performed.

405. The network device sends the L TBs based on the determined HARQ process numbers of the L TBs and the determined NDI information of the L TBs.

415. The terminal device receives the L TBs based on a determined HARQ process number of each TB in the L TBs and determined NDI information of each TB in the L TBs.

This embodiment of this application is applicable to an uplink transmission scenario, or is applicable to a downlink transmission scenario. For example, during downlink transmission, the network device sends the L TBs, and the terminal device receives the L TBs. During uplink transmission, the terminal device sends the L TBs, and the network device receives the L TBs. In a scenario in which the L TBs are uplink-transmitted, the following step 416 and step 406 are performed.

416. The terminal device sends the L TBs based on a determined HARQ process number of each TB in the L TBs and determined NDI information of each TB in the L TBs.

406. The network device receives the L TBs based on the determined HARQ process numbers of the L TBs and determined NDI information of the L TBs.

In some embodiments of this application, the first bit includes one bit, N=4, the bit status of the first bit is 1, the second field includes six bits, and the six bits of the second field indicate, in the first value set, the quantity L of TBs scheduled by the downlink control information, the HARQ process numbers of the L TBs, and the NDI information of the L TBs.

The first bit includes one bit, N=4, the bit status of the first bit is 0, the bit status of the second bit is 1, the third field includes five bits, and the five bits of the third field indicate, in the second value set, the quantity L of TBs scheduled by the downlink control information, the HARQ process numbers of the L TBs, and the NDI information of the L TBs.

The bit status of the first bit is 0, the bit status of the second bit is 0, the HARQ process index indication field is used to indicate the HARQ process number of the one TB, and the NDI field is used to indicate the NDI information of the one TB.

When the first bit includes one bit, and N=4, it indicates that the downlink control information schedules a maximum of four TBs. The downlink control information includes seven bits. As shown in FIG. 5a, the first bit includes one bit, the second field includes six bits, and a bit status of the six bits of the second field is used to indicate L, the HARQ process numbers of the L TBs, and the NDI information of the L TBs. For example, the six bits can represent $2^6$ types of bit states, that is, 64 types of states may be used to indicate a HARQ process number corresponding to each TB and whether each TB is a newly transmitted TB or a retransmitted TB.

The third field includes five bits, and a bit status of the five bits of the third field is used to indicate L, the HARQ process numbers of the L TBs, and the NDI information of the L TBs. For example, the five bits can represent $2^5$ types of bit states, that is, 32 types of states may be used to indicate a HARQ process number corresponding to each TB and whether each TB is a newly transmitted TB or a retransmitted TB.

The first bit includes one bit, the bit status of the first bit is 0, the bit status of the second bit is 0, the HARQ process index indication field occupies one bit, the NDI field occupies one bit, the HARQ process index indication field is used to indicate the HARQ process number of the one TB, and the NDI field is used to indicate the NDI information of the one TB.

In some embodiments of this application, the first bit includes one bit, and a value set of N is {1, 2, 4, 8}; or
a value set of N is {2, 4}; or
a value set of N is {1, 4}; or
a value set of N is {1, 4, 8}.

The network device may determine that the DCI can schedule a maximum of N TBs. N may be a fixed value specified in a standard, or the network device configures N for the terminal device. For example, the network device configures N for the terminal device by using radio resource control signaling, or the network device configures N for the terminal device by using media access control signaling, or the network device configures N for the terminal device by using physical layer signaling. For example, the value set of N is {1, 2, 4, 8}. Alternatively, the value set of N is {2, 4, 8}. Alternatively, the value set of N is {1, 4, 8}. Alternatively, the value set of N is {1, 2, 8}. Alternatively, the value set of N is {2, 8}. Non-restrictively, in an actual application scenario, a value of N may be flexibly configured according to a specific scenario.

It can be learned from the example in the foregoing embodiment that the network device sends the downlink control information to the terminal device, the downlink control information can schedule a maximum of N TBs, and the downlink control information includes the first bit. When the first bit includes one bit, the bit status of the first bit is the third state, N is greater than 1, and the downlink control information includes the second field, the terminal device determines, in the first value set based on the second field, the quantity L of TBs scheduled by the downlink control information, the HARQ process numbers of the L TBs, and the NDI information of the L TBs. Alternatively, when the first bit includes one bit, the bit status of the first bit is the fourth state, the downlink control information further includes the second bit, the second bit includes one bit, the bit status of the second bit is the fifth state, N is greater than 1, and the downlink control information includes the third field, the terminal device determines, in the second value set based on the third field, the quantity L of TBs scheduled by the downlink control information, the HARQ process numbers of the L TBs, and the NDI information of the L TBs, where the second value set and the first value set are different sets, and the quantity of bits included in the third field is one less than the quantity of bits included in the second field. Alternatively, when the first bit includes one bit, the bit status of the first bit is the fourth state, the downlink control information further includes the second bit, the second bit includes one bit, the bit status of the second bit is the sixth state, and N=1, the terminal device determines the HARQ process number of the one TB based on the HARQ process index indication field included in the downlink control information, and determines the NDI information of the one TB based on the NDI field included in the downlink control information. In this embodiment of this application, when the first bit includes one bit, the bit status of the first bit may be the third state, or the first bit uses the fourth state and the second bit uses the fifth state, and the terminal device may perform multi-TB scheduling; or the first bit uses the fourth state and the second bit uses the sixth state, and the terminal device may perform single-TB scheduling, so that the downlink control information supports scheduling for any quantity of TBs in the N TBs, and may indicate any HARQ process number and any NDI information used for each scheduled TB. This improves scheduling flexibility.

Figure 6A:
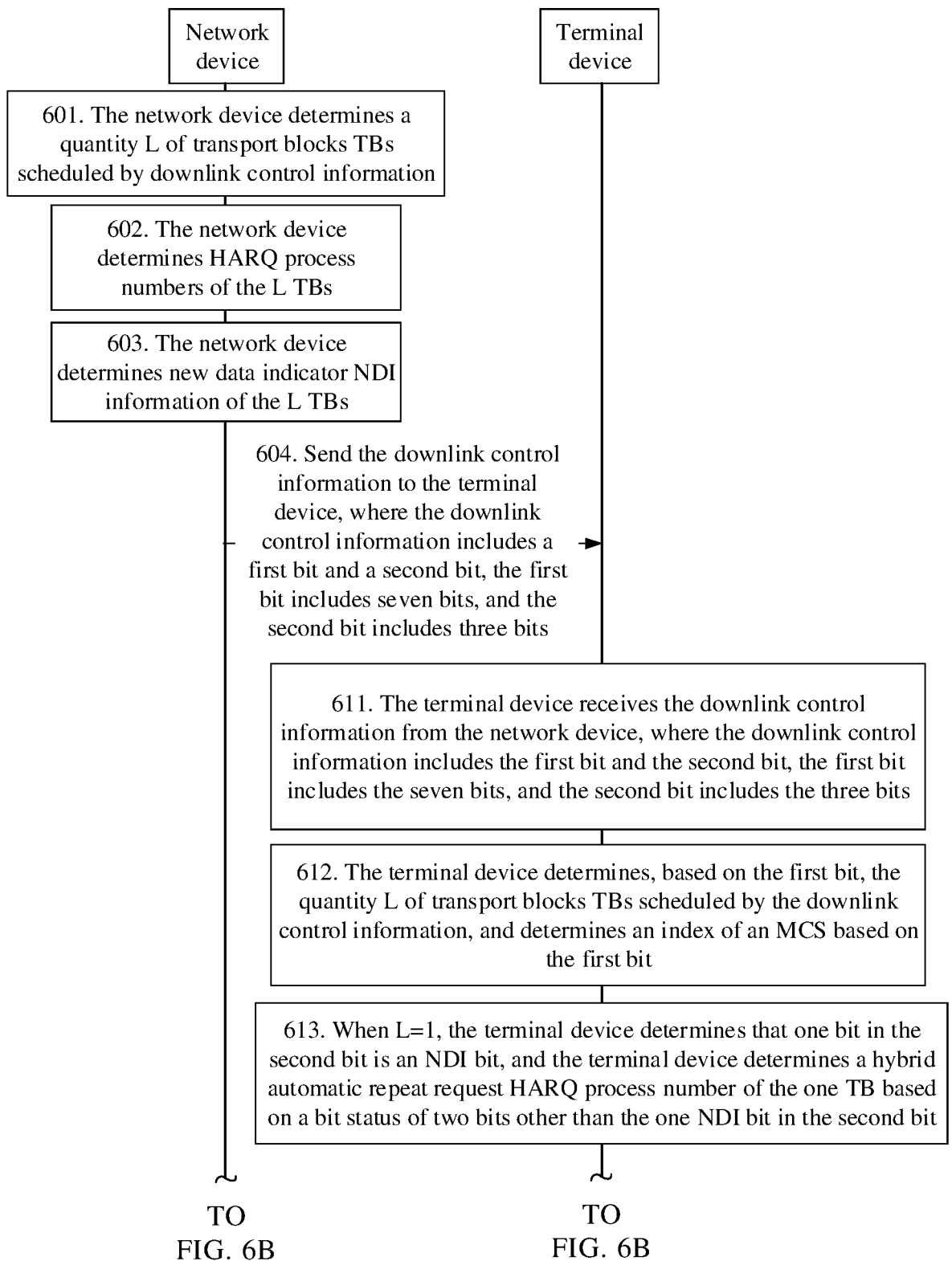
FIG. 6A and FIG. 6B are a schematic diagram of an interaction procedure of an information processing method according to an embodiment of this application.
Figure 6B:
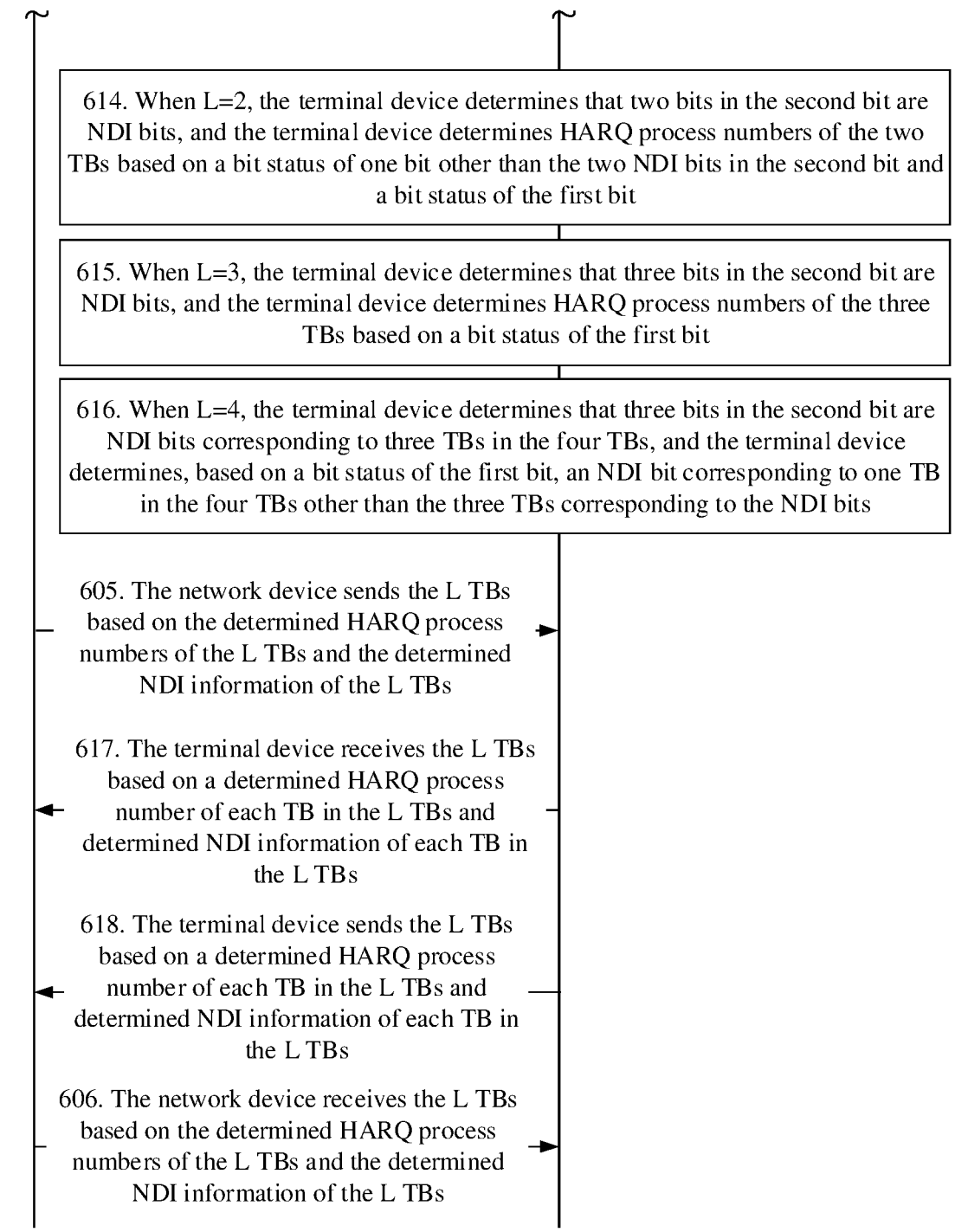

FIG. 6A and FIG. 6B are a schematic diagram of an interaction procedure of an information processing method according to an embodiment of this application. The following step 601 to step 606 are described from a network device side, and the following step 611 to step 616 are described from a terminal device side. The method mainly includes the following steps.

601. A network device determines a quantity L of transport blocks TBs scheduled by downlink control information, where the downlink control information can schedule a maximum of N TBs, N and L are positive integers, and 1≤L≤N.

602. The network device determines hybrid automatic repeat request HARQ process numbers of the L TBs.

603. The network device determines new data indicator NDI information of the L TBs.

An execution manner of step 601 to step 603 is similar to an execution manner of step 201 to step 203 in the foregoing embodiment, and details are not described herein again.

604. The network device sends the downlink control information to a terminal device, where the downlink control information includes a first bit and a second bit, the first bit includes seven bits, and the second bit includes three bits.

The first bit is used to indicate the quantity L of transport blocks TBs scheduled by the downlink control information, and is further used to indicate an index of a modulation and coding scheme (modulation and coding scheme, MCS).

When L=1, one bit in the second bit is a new data indicator NDI bit, and a bit status of two bits other than the one NDI bit in the second bit is used to indicate a hybrid automatic repeat request HARQ process number of the one TB.

Alternatively, when L=2, two bits in the second bit are NDI bits, and a bit status of one bit other than the two NDI bits in the second bit and a bit status of the first bit are used to indicate HARQ process numbers of the two TBs.

Alternatively, when L=3, the three bits in the second bit are NDI bits, and a bit status of the first bit is used to indicate HARQ process numbers of the three TBs.

Alternatively, when L=4, the three bits in the second bit are NDI bits corresponding to three TBs in the four TBs, and a bit status of the first bit is used to indicate an NDI bit corresponding to one TB in the four TBs other than the three TBs corresponding to the NDI bits.

Figure 7:
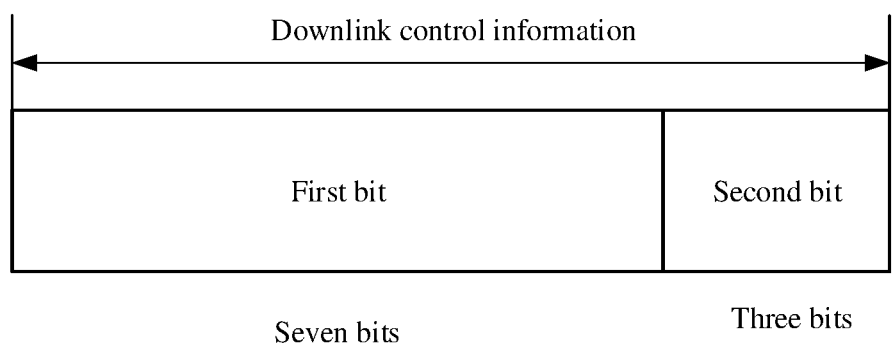
FIG. 7 is a schematic diagram of a composition structure of downlink control information according to an embodiment of this application.

As shown in FIG. 7, a size of the downlink control information is 10 bits, the downlink control information includes the first bit and the second bit, the first bit includes seven bits, and the second bit includes three bits.

Specifically, the first bit includes seven bits, and three bits in the first bit and four bits for indicating the index of the MCS in the downlink control information are jointly coded, to indicate the quantity of TBs scheduled by the downlink control information and the index of the MCS. Therefore, the quantity L of TBs and the index of the MCS can be determined based on the first bit. A total of 10 or 11 types of bit states are required to indicate the index of the MCS. If the downlink control information can schedule a maximum of N TBs, and N=4, the quantity L of TBs scheduled by the downlink control information may be 1, 2, 3, or 4. L may be specifically determined as 1, 2, 3, or 4 based on different bit states of the first bit.

In some embodiments of this application, the network device may determine that L=1, the second bit includes three bits in total, and one bit in the second bit is a new data indicator NDI bit. Therefore, NDI information of one TB may be determined based on the NDI bit. A bit status of two bits other than the one NDI bit in the second bit is used to indicate a hybrid automatic repeat request HARQ process number of the one TB. Therefore, any HARQ process number may be indicated as the HARQ process number of the one TB. This implements flexible downlink control information scheduling.

In some embodiments of this application, the network device may determine that L=2, the second bit includes three bits in total, and two bits in the second bit are NDI bits. Therefore, NDI information of two TBs may be determined based on the two NDI bits. A bit status of one bit other than the two NDI bits in the second bit and the bit status of the first bit are used to indicate HARQ process numbers of the two TBs. Therefore, any HARQ process numbers may be indicated as the HARQ process numbers of the three TBs. This implements flexible downlink control information scheduling.

In some embodiments of this application, the network device may determine that L=3, the second bit includes three bits in total, and the three bits in the second bit are NDI bits. Therefore, NDI information of three TBs may be determined based on the three NDI bits. The bit status of the first bit is used to indicate HARQ process numbers of the three TBs. Therefore, any HARQ process numbers may be indicated as the HARQ process numbers of the three TBs. This implements flexible downlink control information scheduling.

In some embodiments of this application, the network device may determine that L=4, the downlink control information schedules four TBs, and the four TBs may use four HARQ process numbers, that is, all HARQ process numbers need to be used. In this case, the downlink control information does not need to indicate HARQ process numbers of the four TBs. The second bit includes three bits in total, and the three bits in the second bit are NDI bits corresponding to three TBs in the four TBs. Therefore, NDI information of the three TBs may be determined based on the three NDI bits. The bit status of the first bit is used to indicate an NDI bit corresponding to one TB in the four TBs other than the three TBs corresponding to the NDI bits. The bit status of the first bit may further indicate NDI information of the fourth TB in the four TBs. Therefore, NDI information of the four TBs may be indicated. This implements flexible downlink control information scheduling.

611. The terminal device receives the downlink control information from the network device, where the downlink control information can schedule a maximum of four transport blocks TBs, the downlink control information includes the first bit and the second bit, the first bit includes the seven bits, and the second bit includes the three bits.

The network device sends the downlink control information to the terminal device, and the downlink control information includes the first bit and the second bit.

612. The terminal device determines, based on the first bit, the quantity L of transport blocks TBs scheduled by the downlink control information, and determines the index of the modulation and coding scheme MCS based on the first bit.

Based on different values of L indicated by the first bit, the terminal device parses the downlink control information in different manners. For example, when L=1, the terminal device performs step 613. For another example, when L=2, the terminal device performs step 614. For another example, when L=3, the terminal device performs step 615. For another example, when L=4, the terminal device performs step 616.

613. When L=1, the terminal device determines that the one bit in the second bit is the new data indicator NDI bit, and the terminal device determines the hybrid automatic repeat request HARQ process number of the one TB based on the bit status of the two bits other than the one NDI bit in the second bit.

614. When L=2, the terminal device determines that the two bits in the second bit are the NDI bits, and the terminal device determines the HARQ process numbers of the two TBs based on the bit status of the one bit other than the two NDI bits in the second bit and the bit status of the first bit.

615. When L=3, the terminal device determines that the three bits in the second bit are the NDI bits, and the terminal device determines the HARQ process numbers of the three TBs based on the bit status of the first bit.

616. When L=4, the terminal device determines that the three bits in the second bit are the NDI bits corresponding to the three TBs in the four TBs, and the terminal device determines, based on the bit status of the first bit, the NDI bit corresponding to the one TB in the four TBs other than the three TBs corresponding to the NDI bits.

As shown in FIG. 7, a size of the downlink control information is 10 bits, the downlink control information includes the first bit and the second bit, the first bit includes seven bits, and the second bit includes three bits.

Specifically, the first bit includes seven bits, and three bits in the first bit and four bits for indicating the index of the MCS in the downlink control information are jointly coded, to indicate the quantity of TBs scheduled by the downlink control information and the index of the MCS. Therefore, the quantity L of TBs and the index of the MCS can be determined based on the first bit. A total of 10 or 11 types of bit states are required to indicate the index of the MCS. If the downlink control information can schedule a maximum of N TBs, and N=4, the quantity L of TBs scheduled by the downlink control information may be 1, 2, 3, or 4. L may be specifically determined as 1, 2, 3, or 4 based on different bit states of the first bit.

In some embodiments of this application, the network device may determine that L=1, the second bit includes three bits in total, and one bit in the second bit is a new data indicator NDI bit. Therefore, NDI information of one TB may be determined based on the NDI bit. A bit status of two bits other than the one NDI bit in the second bit is used to indicate a hybrid automatic repeat request HARQ process number of the one TB. Therefore, any HARQ process number may be indicated as the HARQ process number of the one TB. This implements flexible downlink control information scheduling.

In some embodiments of this application, the network device may determine that L=2, the second bit includes three bits in total, and two bits in the second bit are NDI bits. Therefore, NDI information of two TBs may be determined based on the two NDI bits. A bit status of one bit other than the two NDI bits in the second bit and the bit status of the first bit are used to indicate HARQ process numbers of the two TBs. Therefore, any HARQ process numbers may be indicated as the HARQ process numbers of the three TBs. This implements flexible downlink control information scheduling.

In some embodiments of this application, the network device may determine that L=3, the second bit includes three bits in total, and the three bits in the second bit are NDI bits. Therefore, NDI information of three TBs may be determined based on the three NDI bits. The bit status of the first bit is used to indicate HARQ process numbers of the three TBs. Therefore, any HARQ process numbers may be indicated as the HARQ process numbers of the three TBs. This implements flexible downlink control information scheduling.

In some embodiments of this application, the network device may determine that L=4, the downlink control information schedules four TBs, and the four TBs may use four HARQ process numbers, that is, all HARQ process numbers need to be used. In this case, the downlink control information does not need to indicate HARQ process numbers of the four TBs. The second bit includes three bits in total, and the three bits in the second bit are NDI bits corresponding to three TBs in the four TBs. Therefore, NDI information of the three TBs may be determined based on the three NDI bits. The bit status of the first bit is used to indicate an NDI bit corresponding to one TB in the four TBs other than the three TBs corresponding to the NDI bits. The bit status of the first bit may further indicate NDI information of the fourth TB in the four TBs. Therefore, NDI information of the four TBs may be indicated. This implements flexible downlink control information scheduling.

This embodiment of this application is applicable to an uplink transmission scenario, or is applicable to a downlink transmission scenario. For example, during downlink transmission, the network device sends the L TBs, and the terminal device receives the L TBs. During uplink transmission, the terminal device sends the L TBs, and the network device receives the L TBs. In a scenario in which the L TBs are downlink-transmitted, the following step 605 and step 617 are performed.

605. The network device sends the L TBs based on a determined HARQ process number of each TB in the L TBs, determined NDI information of each TB in the L TBs, and the index of the MCS.

617. The terminal device receives the L TBs based on the determined HARQ process number of each TB in the L TBs, the determined NDI information of each TB in the L TBs, and the index of the MCS.

This embodiment of this application is applicable to an uplink transmission scenario, or is applicable to a downlink transmission scenario. For example, during downlink transmission, the network device sends the L TBs, and the terminal device receives the L TBs. During uplink transmission, the terminal device sends the L TBs, and the network device receives the L TBs. In a scenario in which the L TBs are uplink-transmitted, the following step 618 and step 606 are performed.

618. The terminal device sends the L TBs based on a determined HARQ process number of each TB in the L TBs, determined NDI information of each TB in the L TBs, and the index of the MCS.

606. The network device receives the L TBs based on the determined HARQ process number of each TB in the L TBs, the determined NDI information of each TB in the L TBs, and the index of the MCS.

In some embodiments of this application, a value obtained by performing an REM operation on a first value M by using an index indicated by the first bit is 0, L=1, and M is a positive integer.

Alternatively, a value obtained by performing an REM operation on a first value M by using an index indicated by the first bit is 1, L=2, the HARQ process numbers of the two TBs are $\{H_0=b_2, H_1=1+b_2\}$, $H_0$ and $H_1$ represent the HARQ process numbers of the two TBs, and $b_2$ represents the bit status of the one bit other than the two NDI bits in the second bit.

Alternatively, a value obtained by performing an REM operation on a first value M by using an index indicated by the first bit is 2, L=2, the HARQ process numbers of the two TBs are $\{H_0=0, H_1=2+b_2\}$, $H_0$ and $H_1$ represent the HARQ process numbers of the two TBs, and $b_2$ represents the bit status of the one bit other than the two NDI bits in the second bit.

Alternatively, a value obtained by performing an REM operation on a first value M by using an index indicated by the first bit is 3, L=2, the HARQ process numbers of the two TBs are $\{H_0=b_2, H_1=3\}$, $H_0$ and $H_1$ represent the HARQ process numbers of the two TBs, and $b_2$ represents the bit status of the one bit other than the two NDI bits in the second bit.

Alternatively, a value obtained by performing an REM operation on a first value M by using an index indicated by the first bit is 4, L=3, the HARQ process numbers of the three TBs are $\{H_0=0, H_1=1, H_2=2\}$, and $H_0$, $H_1$, and $H_2$ represent the HARQ process numbers of the three TBs.

Alternatively, a value obtained by performing an REM operation on a first value M by using an index indicated by the first bit is 5, L=3, the HARQ process numbers of the three TBs are $\{H_0=0, H_1=1, H_2=3\}$, and $H_0$, $H_1$, and $H_2$ represent the HARQ process numbers of the three TBs.

Alternatively, a value obtained by performing an REM operation on a first value M by using an index indicated by the first bit is 6, L=3, the HARQ process numbers of the three TBs are $\{H_0=0, H_1=2, H_2=3\}$, and $H_0$, $H_1$, and $H_2$ represent the HARQ process numbers of the three TBs.

Alternatively, a value obtained by performing an REM operation on a first value M by using an index indicated by the first bit is 7, L=3, the HARQ process numbers of the three TBs are $\{H_0=1, H_1=2, H_2=3\}$, and $H_0$, $H_1$, and $H_2$ represent the HARQ process numbers of the three TBs.

Alternatively, a value obtained by performing an REM operation on a first value M by using an index indicated by the first bit is 8, L=4, and NDI information corresponding to the one TB in the four TBs other than the three TBs corresponding to the NDI bits is 0.

Alternatively, a value obtained by performing an REM operation on a first value M by using an index indicated by the first bit is 9, L=4, and NDI information corresponding to the one TB in the four TBs other than the three TBs corresponding to the NDI bits is 1.

In some embodiments of this application, the index of the MCS is floor(index indicated by the first bit/M).

Herein, floor represents a floor function, and / represents a division operation.

Non-restrictively, in the foregoing process of calculating the index of the MCS, the floor function may be used, or another calculation function may be used, provided that a value can be calculated based on M and the index indicated by the first bit and the value can be mapped to the index of the MCS.

In addition, when the value obtained by performing the REM operation on the first value M by using the index indicated by the first bit is 0, L=1. When the value obtained by performing the REM operation on the first value M by using the index indicated by the first bit is 1, 2, or 3, L=2. When the value obtained by performing the REM operation on the first value M by using the index indicated by the first bit is 4, 5, 6, or 7, L=3. When the value obtained by performing the REM operation on the first value M by using the index indicated by the first bit is 8 or 9, L=4. The foregoing correspondence between L and the value obtained by performing the REM operation on the first value M by using the index indicated by the first bit is merely an example. Non-restrictively, L and the value obtained by performing the REM operation on the first value M by using the index indicated by the first bit may alternatively have another correspondence. For example, when the value obtained by performing the REM operation on the first value M by using the index indicated by the first bit is 0 or 1, L=4. When the value obtained by performing the REM operation on the first value M by using the index indicated by the first bit is 2, 3, 4, or 5, L=3. When the value obtained by performing the REM operation on the first value M by using the index indicated by the first bit is 6, 7, or 8, L=2. When the value obtained by performing the REM operation on the first value M by using the index indicated by the first bit is 9, L=1.

In some embodiments of this application, a value of M may be a positive integer. For example, M=10. Non-restrictively, the REM operation is performed on the first value M by using the index indicated by the first bit, and the first value M is not limited to the foregoing example 10. For example, the value of M is 16.

It can be learned from the example description of the foregoing embodiment that the network device sends the downlink control information to the terminal device, the downlink control information can schedule a maximum of four TBs, the downlink control information includes the first bit and the second bit, the first bit includes seven bits, the second bit includes three bits, and the first bit may be used to determine the quantity L of transport blocks TBs scheduled by the downlink control information, and determine the index of the modulation and coding scheme MCS. When L=1, the terminal device determines that the one bit in the second bit is the new data indicator NDI bit, and the terminal device determines the hybrid automatic repeat request HARQ process number of the one TB based on the bit status of the two bits other than the one NDI bit in the second bit. Alternatively, when L=2, the terminal device determines that the two bits in the second bit are the NDI bits, and the terminal device determines the HARQ process numbers of the two TBs based on the bit status of the one bit other than the two NDI bits in the second bit and the bit status of the first bit. Alternatively, when L=3, the terminal device determines that the three bits in the second bit are the NDI bits, and the terminal device determines the HARQ process numbers of the three TBs based on the bit status of the first bit. Alternatively, when L=4, the terminal device determines that the three bits in the second bit are the NDI bits corresponding to the three TBs in the four TBs, and the terminal device determines, based on the bit status of the first bit, the NDI bit corresponding to the one TB in the four TBs other than the three TBs corresponding to the NDI bits. In this embodiment of this application, 10 bits are used in the downlink control information to separately indicate multi-TB scheduling and the index of the MCS, any HARQ process number used for a plurality of scheduled TBs may be indicated, and a single-TB scheduling manner may be supported. This ensures downlink control information scheduling flexibility and reduces bit overheads.

To better understand and implement the foregoing solutions in the embodiments of this application, the following uses corresponding application scenarios as examples for specific description.

In an embodiment of this application, a first node sends first information to a second node. The first node may be a base station or a device that has a sending capability. The second node may be user equipment, a device that has a receiving capability, or a base station. For example, the first node sends the first information to the second node by using downlink control information. In other words, the downlink control information includes the first information. Alternatively, the first node sends the first information to the second node by using radio resource control signaling or media access control signaling. In other words, the radio resource control signaling or the media access control signaling includes the first information.

It should be noted that transmission in the embodiments of this application is sending or receiving. If one end of communication implements transmission as sending, a peer end of the communication implements transmission as receiving.

Step S01: A first node determines first information.

Step S02: The first node sends the first information to a second node.

The first node may be a base station or a device that has a sending capability. The second node may be user equipment, a device that has a receiving capability, or a base station. For example, the first node sends the first information to the second node by using downlink control information (downlink control information, DCI). In other words, the downlink control information includes the first information. Alternatively, the first node sends the first information to the second node by using radio resource control signaling or media access control signaling. In other words, the radio resource control signaling or the media access control signaling includes the first information.

It should be noted that transmission in the embodiments of this application is sending or receiving. If one end of communication implements transmission as sending, a peer end of the communication implements transmission as receiving.

One piece of DCI can schedule a maximum of N TBs. Values of HARQ process numbers of all the TBs are 0, 1, 2, . . . , and N−1.

N may be a fixed value specified in a standard, or the first node configures N for the second node. For example, the first node configures N for the second node by using radio resource control signaling, or the first node configures N for the second node by using media access control signaling, or the first node configures N for the second node by using physical layer signaling. For example, a value set of N is {1, 2, 4, 8}. Alternatively, a value set of N is {2, 4}. Alternatively, a value set of N is {1, 4}. Alternatively, a value set of N is {1, 4, 8}.

When N is greater than 1, the DCI supports a case in which a plurality of scheduled TBs may include a newly transmitted TB and a retransmitted TB, and each TB in the plurality of scheduled TBs may correspond to any HARQ process number.

In the following Table 1, seven bits are used to indicate a quantity L of scheduled TBs, a HARQ process number of each TB, and an NDI of each TB.

TABLE 1

| First bit | Quantity L of TBs, HARQ process number, and NDI |
|---|---|
| 00 | L = 1, one bit is used to indicate a HARQ process number, and one bit is used to indicate an NDI |
| 01 | L = 2, and five bits are used to indicate HARQ process numbers and NDIs of two TBs |
| 10 | L = 3, and five bits are used to indicate HARQ process numbers and NDIs of three TBs |
| 11 | L = 4, and five bits are used to indicate HARQ process numbers and NDIs of four TBs |

As shown in Table 1, the downlink control information includes the first bit, and the first bit includes two bits. When a bit status of the first bit belongs to a first state set {01, 10, 11}, N=4, and the first bit is used to indicate the quantity L of TBs scheduled by the DCI. Further, the downlink control information includes a first field, and the first field includes five bits, used to indicate the quantity L of TBs scheduled by the DCI, a HARQ process number corresponding to each scheduled TB, and NDI information of each TB. When a bit status of the first bit is a second state {00}, N=1, and the downlink control information includes a HARQ process index indication field and an NDI indication field, respectively used to indicate a HARQ process number and NDI information corresponding to one TB scheduled by the DCI.

As shown in the following Table 2, K bits indicate the quantity of TBs scheduled by the DCI, a HARQ process number corresponding to each TB, and a new transmission and retransmission indicator of each TB.

TABLE 2

| 1 | | Second field |
|---|---|---|
| 0 | 1 | Third field |
| 0 | 0 | HARQ process indication field and NDI field |

As shown in Table 2, the first bit includes one bit. When a bit status of the first bit is 1, N is greater than 1, and the downlink control information includes a second field. The second field indicates, in a first value set, the quantity L of TBs scheduled by the DCI, the HARQ process number of each TB, and the NDI information of each TB. When a bit status of the first bit is 0, the downlink control information includes a second bit. The second bit includes one bit. When a bit status of the second bit is 1, N is greater than 1, and the downlink control information includes a third field. The third field indicates, in a second value set, the quantity L of TBs scheduled by the DCI, the HARQ process number corresponding to each TB, and the NDI information of each TB. The second value set and the first value set are different sets, and the third field is one bit less than the second field. When a bit status of the second bit is 0, N=1, and the downlink control information includes a HARQ process index indication field and an NDI indication field, respectively used to indicate a HARQ process number and NDI information corresponding to one TB scheduled by the DCI.

The following describes an implementation scenario of an embodiment of this application from a first node side.

The first node indicates the quantity of scheduled TBs.

The first node determines a quantity of TBs scheduled by one piece of DCI, and indicates the first bit based on the quantity L of scheduled TBs. If L=1, the first bit is 00. If L=2, the first bit is 01. If L=3, the first bit is 10. If L=4, the first bit is 11.

The first node indicates a HARQ process number corresponding to each TB and NDI information of each TB.

The first node determines a HARQ process number corresponding to each scheduled TB and NDI information of each TB. If the status of the first bit belongs to the first state set, the first node indicates, by using five bits in the first field, the HARQ process number corresponding to each scheduled TB and the NDI information of each TB. If the status of the first bit is the second state, the first node indicates a HARQ process number of one TB by using one bit, and indicates NDI information of the one TB by using one bit.

The first node sends the DCI to the second node.

The following uses L=4 as an example to describe a specific implementation method in this embodiment of this application. A total of seven bits are required to indicate multi-TB scheduling, including the quantity of scheduled TBs, the HARQ process number of each TB, and the NDI information of each TB.

A base station determines to schedule four TBs. In other words, L=4. Therefore, the base station sets the status of the first bit to 11.

The base station determines that HARQ process numbers corresponding to the scheduled TBs are 0, 1, 2, and 3, and NDI information of the TBs are 0, 0, 0, and 0. The base station sets a bit status of the first field to 00000 based on a correspondence between a bit status of the first field and both a HARQ process number and NDI information in Table 3.

As shown in the following Table 3, the DCI schedules four TBs, and a HARQ process number and an NDI indicated by the bit status of the first field are as follows:

TABLE 3

| Bit status of a first field | HARQ process number and NDI |
|---|---|
| 00000 | $H_0 = 0, H_1 = 1, H_2 = 2, H_3 = 3,$ $N_0 = 0, N_1 = 0, N_2 = 0, N_3 = 0$ |
| 00001 | $H_0 = 0, H_1 = 1, H_2 = 2, H_3 = 3,$ $N_0 = 0, N_1 = 0, N_2 = 0, N_3 = 1$ |
| 00010 | $H_0 = 0, H_1 = 1, H_2 = 2, H_3 = 3,$ $N_0 = 0, N_1 = 0, N_2 = 1, N_3 = 0$ |
| 00011 | $H_0 = 0, H_1 = 1, H_2 = 2, H_3 = 3,$ $N_0 = 0, N_1 = 0, N_2 = 1, N_3 = 1$ |
| 00100 | $H_0 = 0, H_1 = 1, H_2 = 2, H_3 = 3,$ $N_0 = 0, N_1 = 1, N_2 = 0, N_3 = 0$ |
| 00101 | $H_0 = 0, H_1 = 1, H_2 = 2, H_3 = 3,$ $N_0 = 0, N_1 = 1, N_2 = 0, N_3 = 1$ |
| 00110 | $H_0 = 0, H_1 = 1, H_2 = 2, H_3 = 3,$ $N_0 = 0, N_1 = 1, N_2 = 1, N_3 = 0$ |
| 00111 | $H_0 = 0, H_1 = 1, H_2 = 2, H_3 = 3,$ $N_0 = 0, N_1 = 1, N_2 = 1, N_3 = 1$ |
| 01000 | $H_0 = 0, H_1 = 1, H_2 = 2, H_3 = 3,$ $N_0 = 1, N_1 = 0, N_2 = 0, N_3 = 0$ |
| 01001 | $H_0 = 0, H_1 = 1, H_2 = 2, H_3 = 3,$ $N_0 = 1, N_1 = 0, N_2 = 0, N_3 = 1$ |
| 01010 | $H_0 = 0, H_1 = 1, H_2 = 2, H_3 = 3,$ $N_0 = 1, N_1 = 0, N_2 = 1, N_3 = 0$ |
| 01011 | $H_0 = 0, H_1 = 1, H_2 = 2, H_3 = 3,$ $N_0 = 1, N_1 = 0, N_2 = 1, N_3 = 1$ |
| 01100 | $H_0 = 0, H_1 = 1, H_2 = 2, H_3 = 3,$ $N_0 = 1, N_1 = 1, N_2 = 0, N_3 = 0$ |
| 01101 | $H_0 = 0, H_1 = 1, H_2 = 2, H_3 = 3,$ $N_0 = 1, N_1 = 1, N_2 = 0, N_3 = 1$ |
| 01110 | $H_0 = 0, H_1 = 1, H_2 = 2, H_3 = 3,$ $N_0 = 1, N_1 = 1, N_2 = 1, N_3 = 0$ |
| 01111 | $H_0 = 0, H_1 = 1, H_2 = 2, H_3 = 3,$ $N_0 = 1, N_1 = 1, N_2 = 1, N_3 = 1$ |

Therefore, a bit status of bits in the DCI that are used to indicate the four scheduled TBs is 1100000. The base station sends the indication to user equipment by using signaling.

The following describes an implementation scenario of an embodiment of this application from a second node side.

The second node receives the DCI.

The second node determines the quantity L of TBs scheduled by the DCI.

The second node determines the bit status of the first bit, and accordingly determines the quantity of TBs scheduled by the DCI. If the first bit is 00, L=1. If the first bit is 01, L=2. If the first bit is 10, L=3. If the first bit is 11, L=4.

The second node determines the HARQ process number corresponding to each scheduled TB and the NDI information of each TB.

If the second node determines that the bit status of the first bit belongs to the first state set, the second node determines, based on the bit status of the first field, the HARQ process number corresponding to each TB in the L scheduled TBs and the NDI information of each TB. If the second node determines that the bit status of the first bit is the second state, the second node determines, based on the HARQ index indication field, a HARQ process number corresponding to one scheduled TB, and determines NDI information of the TB based on the NDI field.

The following describes an implementation of this embodiment of this application by using an example in which the second node receives a specific bit status. The bit status received by the second node is 1100000.

The status of the first bit is 11, and the second node determines, based on the status of the first bit, that the DCI schedules four TBs.

The second node determines that the status of the first bit belongs to the first state set, and further determines, based on the correspondence between a bit status of the first field and both a HARQ process number and NDI information in Table 3, that HARQ process numbers used for the four scheduled TBs are 0, 1, 2, and 3, and NDIs corresponding to the TBs are 0, 0, 0, and 0.

The following describes an implementation scenario of an embodiment of this application from a first node side.

The first node indicates the quantity of scheduled TBs, the HARQ process number corresponding to each TB, and the NDI information of each TB.

The first node determines a quantity of TBs scheduled by one piece of DCI, a HARQ process number corresponding to each TB, and NDI information of each TB.

The first node indicates that the bit status of the first bit is 1, and the second field indicates, in the first value set, the quantity L of TBs scheduled by the DCI, the HARQ process number corresponding to each TB, and the NDI information of each TB. The first node indicates that the bit status of the first bit is 0 and the bit status of the second bit is 1, and the third field indicates, in the second value set, the quantity L of TBs scheduled by the DCI, the HARQ process number corresponding to each TB, and the NDI information of each TB. The first node indicates that the bit status of the first bit is 0 and the bit status of the second bit is 0, and the second node indicates, by using the HARQ process index indication field, a HARQ process number used for one TB, and indicates NDI information of the one TB by using the NDI field.

The first node sends the DCI to the second node.

The following uses N=4 and L=4 as an example to describe an implementation scenario of this embodiment of this application. A total of K=7 bits are required to indicate multi-TB scheduling, including the quantity of scheduled TBs, the HARQ process number of each TB, and the NDI information of each TB. It is assumed that a quantity of TBs included in the first value set is {2, 3}, and a quantity of TBs included in the second value set is {4}.

The base station indicates that the DCI schedules four TBs, HARQ process numbers corresponding to the TBs are 0, 1, 2, and 3, and NDIs of the TBs are 0, 0, 0, and 0. Therefore, the base station sets the status of the first bit to 0 and sets the status of the second bit to 1. Based on a correspondence between a third field and all of L, a HARQ process number, and NDI information in Table 4, it indicates that a bit status of the third field is 00000.

As shown in the following Table 4, the DCI schedules four TBs, and L, a HARQ process number, and an NDI indicated by the bit status of the third field are as follows:

TABLE 4

| Bit status of a third field | L, HARQ process number, and NDI |
|---|---|
| 00000 | L = 4, H0 = 0, H1 = 1, H2 = 2, H3 = 3, N0 = 0, N1 = 0, N2 = 0, N3 = 0 |
| 00001 | L = 4, H0 = 0, H1 = 1, H2 = 2, H3 = 3, N0 = 0, N1 = 0, N2 = 0, N3 = 1 |
| 00010 | L = 4, H0 = 0, H1 = 1, H2 = 2, H3 = 3, N0 = 0, N1 = 0, N2 = 1, N3 = 0 |
| 00011 | L = 4, H0 = 0, H1 = 1, H2 = 2, H3 = 3, N0 = 0, N1 = 0, N2 = 1, N3 = 1 |
| 00100 | L = 4, H0 = 0, H1 = 1, H2 = 2, H3 = 3, N0 = 0, N1 = 1, N2 = 0, N3 = 0 |
| 00101 | L = 4, H0 = 0, H1 = 1, H2 = 2, H3 = 3, N0 = 0, N1 = 1, N2 = 0, N3 = 1 |
| 00110 | L = 4, H0 = 0, H1 = 1, H2 = 2, H3 = 3, N0 = 0, N1 = 1, N2 = 1, N3 = 0 |
| 00111 | L = 4, H0 = 0, H1 = 1, H2 = 2, H3 = 3, N0 = 0, N1 = 1, N2 = 1, N3 = 1 |
| 01000 | L = 4, H0 = 0, H1 = 1, H2 = 2, H3 = 3, N0 = 1, N1 = 0, N2 = 0, N3 = 0 |
| 01001 | L = 4, H0 = 0, H1 = 1, H2 = 2, H3 = 3, N0 = 1, N1 = 0, N2 = 0, N3 = 1 |
| 01010 | L = 4, H0 = 0, H1 = 1, H2 = 2, H3 = 3, N0 = 1, N1 = 0, N2 = 1, N3 = 0 |
| 01011 | L = 4, H0 = 0, H1 = 1, H2 = 2, H3 = 3, N0 = 1, N1 = 0, N2 = 1, N3 = 1 |
| 01100 | L = 4, H0 = 0, H1 = 1, H2 = 2, H3 = 3, N0 = 1, N1 = 1, N2 = 0, N3 = 0 |
| 01101 | L = 4, H0 = 0, H1 = 1, H2 = 2, H3 = 3, N0 = 1, N1 = 1, N2 = 0, N3 = 1 |
| 01110 | L = 4, H0 = 0, H1 = 1, H2 = 2, H3 = 3, N0 = 1, N1 = 1, N2 = 1, N3 = 0 |
| 01111 | L = 4, H0 = 0, H1 = 1, H2 = 2, H3 = 3, N0 = 1, N1 = 1, N2 = 1, N3 = 1 |

Therefore, a bit status of bits in the DCI that are used to indicate the four scheduled TBs is 0100000. The base station sends the indication to user equipment by using signaling.

The following describes an implementation scenario of an embodiment of this application from a second node side.

The second node determines that the DCI can schedule a maximum of N TBs.

N may be a fixed value specified in a standard, or the first node configures N for the second node. For example, the first node configures N for the second node by using radio resource control signaling, or the first node configures N for the second node by using media access control signaling, or the first node configures N for the second node by using physical layer signaling. For example, a value set of N is {1, 2, 4, 8}. Alternatively, a value set of N is {2, 4}. Alternatively, a value set of N is {1, 4}. Alternatively, a value set of N is {1, 4, 8}.

The second node receives the DCI, and determines the quantity of TBs scheduled by the DCI, the HARQ process number corresponding to each TB, and the NDI information of each TB.

If the second node determines that the bit status of the first bit is 1, the second node determines, in the first value set based on the second field, the quantity of TBs scheduled by the DCI, the HARQ process number corresponding to each TB, and the NDI information of each TB. If the second node determines that the bit status of the first bit is 0 and the bit status of the second bit is 1, the second node determines, in the second value set based on the third field, the quantity of TBs scheduled by the DCI, the HARQ process number corresponding to each TB, and the NDI information of each TB. If the second node determines that the bit status of the first bit is 0 and the bit status of the second bit is 0, the second node determines, based on the HARQ process index indication field, a HARQ process number used for one TB, and determines the NDI information of the one TB based on the NDI field.

The following describes an implementation of this embodiment of this application by using an example in which the second node receives a specific bit status. It is assumed that N=4, a quantity of TBs included in the first value set is {2, 3}, a quantity of TBs included in the second value set is {4}, and a bit status of seven bits that is received by the second node is 0100000.

The second node determines that the bit status of the first bit is 0 and the bit status of the second bit is 1. The second node determines, based on the correspondence between a third field and all of L, a HARQ process number, and NDI information in Table 4, that the DCI schedules four TBs, HARQ process numbers corresponding to the TBs are 0, 1, 2, and 3, and NDIs of the TBs are 0, 0, 0, and 0.

It can be learned from the foregoing example that only $K=[\log_2(C_N^1 \times 2 + C_N^2 \times 2^2 + C_N^N \times 2^N)]$ bits are required to support scheduling by one piece of DCI for any quantity of TBs in the N TBs, and any HARQ process number used for each scheduled TB may be indicated. This improves scheduling flexibility and reduces bit overheads of the DCI.

When a maximum of N TBs are scheduled, $K=[\log_2(C_N^1 \times 2 + C_N^2 \times 2^2 + C_N^N \times 2^N)]$ bits are required to indicate multi-TB scheduling in this embodiment of this application. Therefore, in this embodiment of this application, a HARQ process number of each TB during multi-TB scheduling may be flexibly indicated by using fewer bit overheads, and multi-TB scheduling and single-TB scheduling can be distinguished.

The following describes another embodiment of this application.

A first node determines first information.

The first node sends the first information to a second node.

The first node may be a base station or a device that has a sending capability. The second node may be user equipment, a device that has a receiving capability, or a base station. For example, the first node sends the first information to the second node by using downlink control information (downlink control information, DCI). In other words, the downlink control information includes the first information. Alternatively, the first node sends the first information to the second node by using radio resource control signaling or media access control signaling. In other words, the radio resource control signaling or the media access control signaling includes the first information. The first information includes 6+S bits, that is, 6+S bits in the DCI indicate the first information.

It should be noted that transmission in the embodiments of this application is sending or receiving. If one end of communication implements transmission as sending, a peer end of the communication implements transmission as receiving.

One piece of DCI can schedule a maximum of four TBs. Values of HARQ process numbers of the TBs are {0 to 3}.

The maximum quantity 4 of scheduled TBs may be a fixed value specified in a standard, or the first node configures N for the second node. For example, the first node configures N for the second node by using radio resource control signaling, or the first node configures N for the second node by using media access control signaling, or the first node configures N for the second node by using physical layer signaling.

The DCI supports a case in which a plurality of scheduled TBs may include a newly transmitted TB and a retransmitted TB, and each TB in the plurality of scheduled TBs may correspond to any HARQ process number.

The first information includes a first bit (which may also be referred to as a first field). When a bit status of the first bit is a first state (such as 1), the first node indicates that the DCI schedules a plurality of TBs, and a quantity of scheduled TBs belongs to a first set {2, 4}. Five remaining bits other than the S bits in the first information can represent $2^5=32$ types of bit states, and are used to indicate a quantity of scheduled TBs in the first set, a HARQ process number corresponding to each TB, and whether each TB is newly transmitted or retransmitted. The 32 types of states are used to indicate some combinations of scheduling two TBs and four TBs. For example, 24 combinations of scheduling four TBs and eight combinations of scheduling two TBs are indicated, or 16 combinations of scheduling two TBs and 16 combinations of scheduling four TBs are indicated.

When a bit status of the first bit is a second state (for example, 0), the first node indicates that the DCI schedules one or more TBs, and a quantity of scheduled TBs belongs to a second set. The second set includes one or more TB quantities.

Further, when the status of the first bit is the second state (for example, 0), a specific manner in which the DCI schedules the TB is determined based on a bit status of a second bit. When the bit status of the second bit is the first state (for example, 1), the first node indicates that the DCI can schedule a plurality of TBs, and a quantity of scheduled TBs belongs to a third set {3}. One bit saved by performing compression or joint coding on four remaining bits other than the S bits in the first information and a field indicated by the S bits can represent $2^5=32$ types of bit states. For example, S−1 bits can be used for indication in the DCI through joint coding by using an MCS field and a repetition number RN field. The 32 types of bit states are used to indicate all combinations of scheduling three TBs.

Further, when the bit status of the second bit is the second state (for example, 0), a specific manner in which the DCI schedules the TB is determined based on a bit status of a third bit. When the bit status of the third bit is the first state (for example, 1), the first node indicates that the DCI can schedule a plurality of TBs, and a quantity of scheduled TBs belongs to a fourth set. The fourth set differs from the first set in terms of one element. Three remaining bits other than the S bits in the first information can represent eight types of states, and are used to indicate a quantity of scheduled TBs in the fourth set, a HARQ process number corresponding to each TB, and whether each TB is newly transmitted or retransmitted. The eight types of states and the 32 types of states indicating the first set indicate all combinations of scheduling four TBs and two TBs. When the bit status of the third bit is the second state (for example, 0), the first node indicates that the DCI schedules a single TB. Three remaining bits other than the S bits in the first information are used to indicate, in an existing single-TB scheduling manner, a HARQ process number corresponding to the scheduled TB and whether the TB is newly transmitted or retransmitted.

Table 5 indicates that six bits are introduced in the DCI to indicate that a maximum of four TBs are scheduled.

In Table 5, 13 bits indicate that a maximum of four TBs are scheduled.

TABLE 5

| 1 | | | First set (5 bits) | MCS and RN (7 bits) |
|---|---|---|---|---|
| 0 | 1 | | Third set (5 bits) | MCS + RN joint coding (6 bits) |
| 0 | 0 | 1 | Fourth set (3 bits) | MCS and RN (7 bits) |
| 0 | 0 | 0 | Single-TB scheduling | MCS and RN (7 bits) |

The first set, the second set, the third set, and the fourth set may be fixed values specified in a standard, or may be configured by the first node for the second node. For example, the first node configures the first set, the second set, the third set, and the fourth set for the second node by using radio resource control signaling, or the first node configures the first set, the second set, the third set, and the fourth set for the second node by using media access control signaling, or the first node configures the first set, the second set, the third set, and the fourth set for the second node by using physical layer signaling.

The following describes an implementation of this embodiment of this application from a first node side.

The first node indicates a quantity of scheduled HARQ processes, a HARQ process number corresponding to each scheduled TB, whether each scheduled TB is newly transmitted or retransmitted, an MCS, and an RN.

The first node determines a quantity of TBs scheduled by one piece of DCI, a HARQ process number used for each scheduled TB, and whether each scheduled TB is newly transmitted or retransmitted, and accordingly determines a TB quantity set to which the quantity of scheduled TBs belongs. If the quantity of scheduled TBs belongs to the first set, the first node sets the bit status of the first bit to 1, indicates the MCS and the RN in an existing manner by using seven bits, and indicates, by using five bits other than the seven bits and the first bit, the quantity of TBs scheduled by the DCI, the HARQ process number used for each scheduled TB, and whether each scheduled TB is newly transmitted or retransmitted. If the quantity of scheduled TBs belongs to the second set, the first node sets the bit status of the first bit to 0.

If the first node sets the first bit to 0, the TB quantity set to which the quantity of TBs scheduled by the DCI belongs is further determined. If the quantity of scheduled TBs belongs to the third set, the first node sets the bit status of the second bit to 1, performs joint coding on the MCS field and the RN field, indicates the information by using six bits, and indicates, by using five bits other than the six bits, the first bit, and the second bit, a HARQ process number used for each TB scheduled by the DCI and whether each scheduled TB is newly transmitted or retransmitted.

If the quantity of TBs scheduled by the DCI belongs to the fourth set, the first node sets the bit status of the second bit to 0, sets the bit status of the third bit to 1, indicates the MCS and the RN in an existing manner by using seven bits, and indicates, by using three bits other than the seven bits, the first bit, the second bit, and the third bit, a HARQ process number used for each TB scheduled by the DCI and whether each scheduled TB is newly transmitted or retransmitted.

If the DCI schedules a single TB, the second node sets the bit status of the second bit to 0, sets the bit status of the third bit to 0, indicates the MCS and the RN in an existing manner by using seven bits, and indicates, according to a conventional technology by using three bits other than the seven bits, the first bit, the second bit, and the third bit, a HARQ process number corresponding to the TB scheduled by the DCI and whether the TB is newly transmitted or retransmitted.

The first node sends the DCI to the second node.

The following describes an implementation of this embodiment of this application from a second node side.

The second node receives the DCI. The DCI includes 13 bits, and indicates the quantity of scheduled HARQ processes, the HARQ process number corresponding to each TB, whether each TB is newly transmitted or retransmitted, the MCS, and the RN.

The second node determines the bit status of the first bit in the 13 bits. If the bit status of the first bit is 1, the second node determines that the quantity of scheduled TBs belongs to the first set. Further, the MCS and the RN are determined based on the seven bits, and the quantity of TBs scheduled by the DCI, the HARQ process number corresponding to each scheduled TB, and whether each TB is newly transmitted or retransmitted are determined based on five bits other than the seven bits and the first bit.

If the bit status of the first bit is 0, the second node determines the bit status of the second bit. If the bit status of the second bit is 1, the second node determines that the quantity of scheduled TBs belongs to the third set. Further, the MCS and the RN are determined based on the six bits, and the HARQ process number corresponding to each TB scheduled by the DCI and whether each TB is newly transmitted or retransmitted are determined based on five bits other than the six bits, the first bit, and the second bit.

If the bit status of the second bit is 0, the second node determines the bit status of the third bit. If the bit status of the third bit is 1, the second node determines that the quantity of scheduled TBs belongs to the fourth set. Further, the second node determines the MCS and the RN based on the seven bits, and determines, based on three bits other than the seven bits, the first bit, the second bit, and the third bit, the HARQ process number corresponding to each TB scheduled by the DCI and whether each TB is newly transmitted or retransmitted.

If the bit status of the third bit is 0, the second node determines that the DCI schedules one TB. Further, the second node determines the MCS and the RN based on the seven bits, and determines, based on three bits other than the seven bits, the first bit, the second bit, and the three bits, the HARQ process number corresponding to the TB scheduled by the DCI and whether the TB is newly transmitted or retransmitted.

Multi-TB scheduling and another field in the DCI are separately indicated by using 6+S bits, any HARQ process numbers used for a plurality of scheduled TBs may be indicated, and multi-TB scheduling and single-TB scheduling may be distinguished. However, in essence, compared with an existing quantity of DCI bits, only six bits are added. This ensures scheduling flexibility, and reduces bit overheads.

In this embodiment of this application, six bits are essentially introduced to indicate multi-TB scheduling when the DCI schedules a maximum of four TBs. In the conventional technology, eight bits are required to indicate multi-TB scheduling. Therefore, in this embodiment of this application, bit overheads are reduced, a HARQ process number of each TB can be flexibly indicated, and multi-TB scheduling and single-TB scheduling can be further distinguished.

The following describes another embodiment of this application.

A first node determines first information.

The first node sends the first information to a second node.

The first node may be a base station or a device that has a sending capability. The second node may be user equipment, a device that has a receiving capability, or a base station. For example, the first node sends the first information to the second node by using downlink control information (downlink control information, DCI). In other words, the downlink control information includes the first information. Alternatively, the first node sends the first information to the second node by using radio resource control signaling or media access control signaling. In other words, the radio resource control signaling or the media access control signaling includes the first information. The first information includes 6+S bits, that is, 6+S bits in the DCI indicate the first information.

It should be noted that transmission in the embodiments of this application is sending or receiving. If an end of communication implements transmission as sending, a peer end of the communication implements transmission as receiving.

One piece of DCI can schedule a maximum of four TBs. Values of HARQ process numbers of the TBs are {0 to 3}.

The maximum quantity 4 of scheduled TBs may be a fixed value specified in a standard, or the first node configures N for the second node. For example, the first node configures the first set, the second set, the third set, and the fourth set for the second node by using radio resource control signaling, or the first node configures the first set, the second set, the third set, and the fourth set for the second node by using media access control signaling, or the first node configures the first set, the second set, the third set, and the fourth set for the second node by using physical layer signaling.

The DCI supports a case in which a plurality of scheduled TBs may include a newly transmitted TB and a retransmitted TB, and each TB in the plurality of scheduled TBs may correspond to any HARQ process number.

As shown in Table 6, scheduling of {1 to 4} TBs and an MCS index are indicated by using 10 bits. The downlink control information includes a first bit and a second bit, the first bit includes seven bits, and the second bit includes three bits. A bit status of the first bit is used to indicate a quantity L of TBs scheduled by the DCI and other information. If L=1, one bit in the second bit is used to indicate NDI information of one TB, and the two remaining bits in the second bit are used to indicate a HARQ process number corresponding to the one TB. If L=2, two bits in the second bit are used to indicate NDI information of two TBs, and one remaining bit in the second bit and the first bit are used to indicate HARQ process numbers corresponding to the two TBs. If L=3, three bits in the second bit are used to indicate NDI information of three TBs, and the first bit is used to indicate HARQ process numbers corresponding to the three TBs. If L=4, three bits in the second bit are used to indicate NDI information of three TBs in four scheduled TBs, and the first bit is used to indicate NDI information corresponding to one remaining TB.

As shown in Table 6, 10 bits indicate a quantity of TBs scheduled by the DCI, a HARQ process number corresponding to each TB, an NDI of each TB, and an MCS.

TABLE 6

| Quantity of TBs scheduled by DCI | Second bit | | | First bit (7 bits) | |
|---|---|---|---|---|---|
| | $b_0$ | $b_1$ | $b_2$ | HARQ & NDI (3 bits) | MCS (4 bits) |
| One TB | N0 | H | H | 1 | 0 to 9/ 0 to 10 |
| Two TBs | N0 | N1 | H | 3 | |
| Three TBs | N0 | N1 | N2 | 4 | |
| Four TBs | N0 | N1 | N2 | 2 | |

Table 7 shows a bit status of the first bit and a HARQ process number or an NDI corresponding to a scheduled TB.

TABLE 7

| Index indicated by the first bit mod M | L, HARQ process number, and NDI |
|---|---|
| 0 | L = 1 |
| 1 | L = 2, {$H_0 = b_2$, $H_1 = 1 + b_2$} |
| 2 | L = 2, {$H_0 = 0$, $H_1 = 2 + b_2$} |
| 3 | L = 2, {$H_0 = 1 + b_2$, $H_1 = 3$} |
| 4 | L = 3, {$H_0 = 0$, $H_1 = 1$, $H_2 = 2$} |
| 5 | L = 3, {$H_0 = 0$, $H_1 = 1$, $H_2 = 3$} |
| 6 | L = 3, {$H_0 = 0$, $H_1 = 2$, $H_2 = 3$} |
| 7 | L = 3, {$H_0 = 1$, $H_1 = 2$, $H_2 = 3$} |
| 8 | L = 4, $NDI_3 = 0$ |
| 9 | L = 4, $NDI_3 = 1$ |

The following describes an implementation of this embodiment of this application from a first node side.

The first node indicates a quantity of TBs scheduled by the DCI, a HARQ process corresponding to each scheduled TB, NDI information of each scheduled TB, and MCS information.

The first node determines a quantity of TBs scheduled by one piece of DCI, a HARQ process corresponding to each TB scheduled by the DCI, whether each scheduled TB is newly transmitted or retransmitted, and MCS information.

If the first node determines that the DCI schedules one TB, the first node indicates, by using one bit in the second bit, whether the scheduled TB is newly transmitted or retransmitted, the first node indicates, by using two remaining bits in the second bit, a HARQ process number corresponding to the scheduled TB, and the first node indicates the MCS information by using the first bit based on the correspondence in Table 7.

If the first node determines that the DCI schedules two TBs, the first node indicates NDI information of the scheduled TBs by using two bits in the second bit, and the first node indicates the MCS information by using the first bit, and indicates, based on the correspondence in Table 7 by using the bit $b_2$ in the second bit and the first bit, a HARQ process number corresponding to each scheduled TB.

If the first node determines that the DCI schedules three TBs, the first node indicates NDI information of the scheduled TBs by using three bits in the second bit, and the first node indicates the MCS information by using the first bit, and indicates, based on the correspondence in Table 7 by using the first bit, a HARQ process number corresponding to each scheduled TB.

If the first node determines that the DCI schedules four TBs, the first node indicates NDI information of three TBs in the four scheduled TBs by using three bits in the second bit, and the first node indicates the MCS information by using the first bit, and indicates, based on the correspondence in Table 7 by using the first bit, a HARQ process number and NDI information corresponding to one remaining scheduled TB.

The first node sends the DCI to the second node.

An embodiment of this application provides an information processing method, including the following steps.

A terminal device receives downlink control information from a network device, where the downlink control information can schedule a maximum of four transport blocks TBs, the downlink control information includes a first bit and a second bit, the first bit includes 6 bits, and the second bit includes 4 bits.

The terminal device determines, based on the first bit, at least a quantity L of transport blocks TBs scheduled by the downlink control information and an index of a modulation and coding scheme MCS.

The terminal device determines at least one of hybrid automatic repeat request HARQ process numbers of the L TBs and new data indicator NDI information of K TBs based on the second bit, where K is an integer less than or equal to L.

The terminal device sends the L TBs based on a determined HARQ process number of each TB in the L TBs, determined NDI information of each TB in the L TBs, and the index of the MCS.

Alternatively, the terminal device receives the L TBs based on a determined HARQ process number of each TB in the L TBs, determined NDI information of each TB in the L TBs, and the index of the MCS.

In some embodiments of this application, a value V indicated by the first bit is used to indicate the MCS index Imcs, and V=Imcs*5.

In some embodiments of this application, the value V indicated by the first bit is a multiple of 5, L=1 or L=2, and an NDI of the first TB is 0.

Two bits in the second bit are used to indicate a first HARQ process number H0, and two remaining bits other than the two bits in the second bit are used to indicate a second HARQ process number H1; and if H0=H1, L=1, and a HARQ process number of the one TB is H0; or if H0≠H1, L=2, and HARQ process numbers of the two TBs are respectively H0 and H1.

If H0<H1, an NDI of the second TB is 0; or if H0>H1, an NDI of the second TB is 1.

In some embodiments of this application, the value V indicated by the first bit is 5m+1, m is 0 or a positive integer, L=1 or L=2, and an NDI of the first TB is 1.

Two bits in the second bit are used to indicate a first HARQ process number H0, and two remaining bits other than the two bits in the second bit are used to indicate a second HARQ process number H1; and if H0=H1, L=1, and a HARQ process number of the one TB is H0; or if H0≠H1, L=2, and HARQ process numbers of the two TBs are respectively H0 and H1.

If H0<H1, an NDI of the second TB is 0; or if H0>H1, an NDI of the second TB is 1.

In some embodiments of this application, the value V indicated by the first bit is 5m+2, m is 0 or a positive integer, L=3, and an NDI of the first TB is 0.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, the value V indicated by the first bit is 5m+3, m is 0 or a positive integer, L=3, and an NDI of the first TB is 1.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, the value V indicated by the first bit is 5m+4, m is 0 or a positive integer, and L=4.

HARQ process numbers corresponding to the four TBs are four HARQ process numbers in a HARQ process set {0, 1, 2, 3}.

The four bits in the second bit separately indicate NDI information corresponding to each TB in the four TBs.

In some embodiments of this application, a value obtained by performing an REM operation on 5 by using the value indicated by the first bit is 0, the downlink control information schedules one TB or two TBs, and an NDI of the first TB is 0.

Two bits in the second bit are used to indicate a first HARQ process number H0, and two remaining bits other than the two bits in the second bit are used to indicate a second HARQ process number H1; and if H0=H1, L=1, and a HARQ process number of the one TB is H0; or if H0≠H1, L=2, and HARQ process numbers of the two TBs are respectively H0 and H1.

If H0<H1, an NDI of the second TB is 0; or if H0>H1, an NDI of the second TB is 1.

In some embodiments of this application, a value obtained by performing an REM operation on 5 by using the value indicated by the first bit is 1, the downlink control information schedules one TB or two TBs, and an NDI of the first TB is 1.

Two bits in the second bit are used to indicate a first HARQ process number H0, and two remaining bits other than the two bits in the second bit are used to indicate a second HARQ process number H1; and if H0=H1, L=1, and a HARQ process number of the one TB is H0; or if H0≠H1, L=2, and HARQ process numbers of the two TBs are respectively H0 and H1.

If H0<H1, an NDI of the second TB is 0; or if H0>H1, an NDI of the second TB is 1.

In some embodiments of this application, a value obtained by performing an REM operation on 5 by using the value indicated by the first bit is 2, the downlink control information schedules three TBs, and an NDI of the first TB is 0.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, a value obtained by performing an REM operation on 5 by using the value indicated by the first bit is 3, the downlink control information schedules three TBs, and an NDI of the first TB is 1.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, a value obtained by performing an REM operation on 5 by using the value indicated by the first bit is 4, and the downlink control information schedules four TBs.

HARQ process numbers corresponding to the four TBs are four HARQ process numbers in a HARQ process set {0, 1, 2, 3}.

The four bits in the second bit separately indicate NDI information corresponding to each TB in the four TBs.

An embodiment of this application provides an information processing method, including the following steps.

A network device determines a quantity L of transport blocks TBs scheduled by downlink control information, where the downlink control information can schedule a maximum of N TBs, N and L are positive integers, and is $1 \leq L \leq N$.

The network device determines hybrid automatic repeat request HARQ process numbers of the L TBs.

The network device determines new data indicator NDI information of the L TBs.

The network device sends the downlink control information to a terminal device, where the downlink control information includes a first bit and a second bit, the first bit includes six bits, and the second bit includes four bits.

The first bit is used to indicate the quantity L of transport blocks TBs scheduled by the downlink control information and an index of a modulation and coding scheme MCS.

The second bit is used to indicate at least one of hybrid automatic repeat request HARQ process numbers of the L TBs and new data indicator NDI information of K TBs, where K is an integer less than or equal to L.

The network device sends the L TBs based on a determined HARQ process number of each TB in the L TBs, determined NDI information of each TB in the L TBs, and the index of the MCS.

Alternatively, the network device receives the L TBs based on a determined HARQ process number of each TB in the L TBs, determined NDI information of each TB in the L TBs, and the index of the MCS.

In some embodiments of this application, a value V indicated by the first bit is used to indicate the MCS index Imcs, and V=Imcs*5.

In some embodiments of this application, the downlink control information schedules one TB or two TBs, an NDI of the first TB is 0, and the value V indicated by the first bit is a multiple of 5.

Two bits in the second bit are used to indicate a first HARQ process number H0, and two remaining bits other than the two bits in the second bit are used to indicate a second HARQ process number H1; and the downlink control information schedules one TB, H0=H1, and a HARQ process number of the one TB is H0; or the downlink control information schedules two TBs, H0≠H1, and HARQ process numbers of the two TBs are respectively H0 and H1.

An NDI of the second TB is 0, and H0<H1; or an NDI of the second TB is 1, and H0>H1.

In some embodiments of this application, the downlink control information schedules one TB or two TBs, an NDI of the first TB is 1, the value V indicated by the first bit is 5m+1, and m is 0 or a positive integer.

Two bits in the second bit are used to indicate a first HARQ process number H0, and two remaining bits other than the two bits in the second bit are used to indicate a second HARQ process number H1; and the downlink control information schedules one TB, H0=H1, and a HARQ process number of the one TB is H0; or the downlink control information schedules two TBs, H0≠H1, and HARQ process numbers of the two TBs are respectively H0 and H1.

An NDI of the second TB is 0, and H0<H1; or an NDI of the second TB is 1, and H0>H1.

In some embodiments of this application, the downlink control information schedules three TBs, an NDI of the first TB is 0, the value V indicated by the first bit is 5m+2, and m is 0 or a positive integer.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, the downlink control information schedules three TBs, an NDI of the first TB is 1, the value V indicated by the first bit is 5m+3, and m is 0 or a positive integer.

Two bits in the second bit are used to separately indicate NDI information of two other TBs than the first TB in the three TBs.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, the downlink control information schedules four TBs, the value V indicated by the first bit is 5m+4, and m is 0 or a positive integer.

HARQ process numbers corresponding to the four TBs are four HARQ process numbers in a HARQ process set {0, 1, 2, 3}.

The four bits in the second bit separately indicate NDI information corresponding to each TB in the four TBs.

The following describes an implementation of this embodiment of this application from a second node side.

When the value obtained by performing the REM operation on the first value M by using the index indicated by the first bit is 0, and L=1, the second node determines the MCS index based on a fact that the index of the MCS is floor (index indicated by the first bit/M), and the second node determines an NDI of the scheduled TB based on one bit in the second bit, and indicates, based on two remaining bits, a HARQ process number corresponding to the scheduled TB.

When the value obtained by performing the REM operation on the first value M by using the index indicated by the first bit is 1, and L=2, the second node determines the MCS index based on a fact that the index of the MCS is floor (index indicated by the first bit/M), and the second node determines NDIs of the scheduled TBs based on two bits in the second bit, and determines, based on the bit $b_2$ in the second bit, that HARQ process numbers of the two TBs are $\{H_0=b_2, H_1=1+b_2\}$.

When the value obtained by performing the REM operation on the first value M by using the index indicated by the first bit is 2, and L=2, the second node determines the MCS index based on a fact that the index of the MCS is floor (index indicated by the first bit/M), and the second node determines NDIs of the scheduled TBs based on two bits in the second bit, and determines, based on the bit $b_2$ in the second bit, that HARQ process numbers of the two TBs are $\{H_0=0, H_1=2+b_2\}$.

When the value obtained by performing the REM operation on the first value M by using the index indicated by the first bit is 3, and L=2, the second node determines the MCS index based on a fact that the index of the MCS is floor (index indicated by the first bit/M), and the second node determines NDIs of the scheduled TBs based on two bits in the second bit, and determines, based on the bit $b_2$ in the second bit, that HARQ process numbers of the two TBs are $\{H_0=b_2, H_1=3\}$.

When the value obtained by performing the REM operation on the first value M by using the index indicated by the first bit is 4, and L=3, the second node determines the MCS index based on a fact that the index of the MCS is floor (index indicated by the first bit/M), and the second node determines NDIs of the scheduled TBs based on three bits in the second bit, and determines that HARQ process numbers of the three TBs are $\{H_0=0, H_1=1, H_2=2\}$.

When the value obtained by performing the REM operation on the first value M by using the index indicated by the first bit is 5, and L=3, the second node determines the MCS index based on a fact that the index of the MCS is floor (index indicated by the first bit/M), and the second node determines NDIs of the scheduled TBs based on three bits in the second bit, and determines that HARQ process numbers of the three TBs are $\{H_0=0, H_1=1, H_2=3\}$.

When the value obtained by performing the REM operation on the first value M by using the index indicated by the first bit is 6, and L=3, the second node determines the MCS index based on a fact that the index of the MCS is floor (index indicated by the first bit/M), and the second node determines NDIs of the scheduled TBs based on three bits in the second bit, and determines that HARQ process numbers of the three TBs are $\{H_0=0, H_1=2, H_2=3\}$.

When the value obtained by performing the REM operation on the first value M by using the index indicated by the first bit is 7, and L=3, the second node determines the MCS index based on a fact that the index of the MCS is floor (index indicated by the first bit/M), and the second node determines NDIs of the scheduled TBs based on three bits in the second bit, and determines that HARQ process numbers of the three TBs are $\{H_0=1, H_1=2, H_2=3\}$.

When the value obtained by performing the REM operation on the first value M by using the index indicated by the first bit is 8, and L=4, the second node determines the MCS index based on a fact that the index of the MCS is floor (index indicated by the first bit/M), and the second node determines NDIs of three TBs in the four scheduled TBs based on three bits in the second bit, where NDI information corresponding to one TB in the four TBs other than the three TBs corresponding to NDI bits is 0.

When the value obtained by performing the REM operation on the first value M by using the index indicated by the first bit is 9, and L=4, the second node determines the MCS index based on a fact that the index of the MCS is floor (index indicated by the first bit/M), and the second node determines NDIs of three TBs in the four scheduled TBs based on three bits in the second bit, where NDI information corresponding to one TB in the four TBs other than the three TBs corresponding to NDI bits is 1.

The following describes another implementation of this embodiment of this application from a first node side.

The first node sends downlink control information to a second node. The first node indicates a quantity of TBs scheduled by the downlink control information, a HARQ process number corresponding to each TB, an NDI of each TB, and an MCS index. There are 11 types of MCS indices in total. The downlink control information includes a first bit and a second bit. The first bit includes six bits, and the second bit includes four bits. A value indicated by the first bit is used to indicate the MCS index and the quantity of scheduled TBs.

The value V indicated by the first bit is used to indicate the MCS index Imcs. Herein, V=Imcs*5. The value V indicated by the first bit is further used to determine the quantity of scheduled TBs.

For example, if the DCI schedules one TB or the DCI schedules two TBs, and an NDI of the first TB is 0, the value V indicated by the first bit is a multiple of 5. Two bits in the second bit are used to indicate a first HARQ process number (H0). Two other bits in the second bit are used to indicate a second HARQ process number (H1). For example, H0 is indicated in {0, 1, 2, 3}. For example, H1 is indicated in {0, 1, 2, 3}. If the DCI indicates that one TB is scheduled, H0=H1. A HARQ process number of the TB is H0. If the DCI schedules two TBs, H0≠H1, and HARQ process numbers of the two TBs are respectively H0 and H1. If an NDI of the second TB is 0, H0<H1. If an NDI of the second TB is 1, H0>H1. Alternatively, if an NDI of the second TB is 0, H0>H1. If an NDI of the second TB is 1, H0<H1.

For example, if the DCI schedules one TB or the DCI schedules two TBs, and an NDI of the first TB is 1, the value V indicated by the first bit is 5m+1, where m is 0 or a positive integer. Two bits in the second bit are used to indicate a first HARQ process number (H0), and two other bits in the second bit are used to indicate a second HARQ process number (H1). For example, H0 is indicated in {0, 1, 2, 3}. For example, H1 is indicated in {0, 1, 2, 3}. If the DCI indicates that one TB is scheduled, H0=H1. A HARQ process number of the TB is H0. If the DCI indicates that two TBs are scheduled, H0≠H1, and HARQ process numbers of the two TBs are respectively H0 and H1. If an NDI of the second TB is 0, H0<H1. If an NDI of the second TB is 1, H0>H1. If an NDI of the second TB is 0, H0>H1. If an NDI of the second TB is 1, H0<H1.

For example, if the DCI schedules three TBs, and an NDI of the first TB is 0, the value V indicated by the first bit is 5m+2, where m is 0 or a positive integer. Two bits in the second bit are used to separately indicate NDIs of two other TBs than the first TB in the three TBs. Two other bits in the second bit indicate three HARQ process numbers H2 corresponding to the three TBs. For example, H2 is indicated in {012, 013, 023, 123}. Alternatively, two bits in the second bit indicate NDIs of two other TBs than the first TB in the three TBs. Two other bits in the second bit indicate an unscheduled HARQ process number H2 (a value of H2 is 0, 1, 2, or 3). In this case, HARQ process numbers corresponding to the three TBs are three remaining process numbers other than H2 in {0, 1, 2, 3}.

For example, if the DCI schedules three TBs, and an NDI of the first TB is 1, the value V indicated by the first bit is 5m+3, where m is 0 or a positive integer. Two bits in the second bit are used to indicate NDIs of two other TBs than the first TB in the three TBs. Two other bits in the second bit indicate three HARQ process numbers H2 corresponding to the three TBs. For example, H2 is indicated in {012, 013, 023, 123}. Alternatively, two bits in the second bit indicate NDIs of two other TBs than the first TB in the three TBs. Two other bits in the second bit indicate an unscheduled HARQ process number H2 (a value of H2 is 0, 1, 2, or 3). In this case, HARQ process numbers corresponding to the three TBs are three remaining process numbers other than H2 in {0, 1, 2, 3}.

For example, if the DCI schedules four TBs, the value V indicated by the first bit is 5m+4, where m is 0 or a positive integer. HARQ process numbers corresponding to the four TBs are 0, 1, 2, and 3. Four bits in the second bit separately indicate an NDI corresponding to each TB in the four TBs.

For example, the following Table shows another indication method. In the following Table, Ni is an NDI of TBi or the $(i+1)^{th}$ TB. A value of 1 is in 0, 1, 2, and 3. For example, V in the following Table is the value indicated by the first bit. Herein, floor is a floor operation. The second bit includes four bits: b0, b1, b2, and b3.

| TB number | V mod 5= | b0 | b1 | b2 | b3 | $I_{MCS}$ |
|---|---|---|---|---|---|---|
| 1, 2 | 0 {N0 = 0} | H0 | | H1 | | floor(V/5) |
| | 1 {N0 = 1} | | | | | |
| 3 | 2 {N0 = 0} | H2 | | N1 | N2 | |
| | 3 {N0 = 1} | | | | | |
| | 4 | N0 | N1 | N2 | N3 | |

The following describes another implementation of this embodiment of this application from a second node side.

The second node receives downlink control information sent by a first node. The second node determines a quantity of scheduled TBs, a HARQ process number corresponding to each TB, an NDI of each TB, and an MCS index by using the received downlink control information. There are 11 types of MCS indices in total. The downlink control information includes a first bit and a second bit. The first bit includes six bits, and the second bit includes four bits. The second node further determines the quantity of scheduled TBs based on the value indicated by the first bit.

The second node determines the MCS index Imcs based on the value V indicated by the first bit. Herein, V=Imcs*5. The second node further determines the quantity of scheduled TBs based on the value V indicated by the first bit.

For example, if the value V indicated by the first bit is a multiple of 5, the DCI schedules one TB or the DCI schedules two TBs, and an NDI of the first TB is 0. Two bits in the second bit are used to indicate a first HARQ process number (H0). Two other bits in the second bit are used to indicate a second HARQ process number (H1). For example, H0 is indicated in {0, 1, 2, 3}. For example, H1 is indicated in {0, 1, 2, 3}. If H0=H1, the DCI indicates that one TB is scheduled, and a HARQ process number of the TB is H0. If H0≠H1, the DCI schedules two TBs, and HARQ process numbers of the two TBs are respectively H0 and H1. If H0<H1, an NDI of the second TB is 0. If H0>H1, an NDI of the second TB is 1. If H0>H1, an NDI of the second TB is 0. If H0<H1, an NDI of the second TB is 1.

For example, if the value V indicated by the first bit is 5m+1, where m is 0 or a positive integer, the DCI schedules one TB or the DCI schedules two TBs, and an NDI of the first TB is 1. Two bits in the second bit are used to indicate a first HARQ process number (H0), and two other bits in the second bit are used to indicate a second HARQ process number (H1). For example, H0 is indicated in {0, 1, 2, 3}. For example, H1 is indicated in {0, 1, 2, 3}. If H0=H1, the DCI indicates that one TB is scheduled, and a HARQ process number of the TB is H0. If H0≠H1, the DCI schedules two TBs, and HARQ process numbers of the two TBs are respectively H0 and H1. If H0<H1, an NDI of the second TB is 0. If H0>H1, an NDI of the second TB is 1. If H0>H1, an NDI of the second TB is 0. If H0<H1, an NDI of the second TB is 1.

For example, if the value V indicated by the first bit is 5m+2, where m is 0 or a positive integer, the DCI schedules three TBs, and an NDI of the first TB is 0. Two bits in the second bit are used to separately indicate NDIs of two other TBs than the first TB in the three TBs. Two other bits in the second bit indicate three HARQ process numbers H2 corresponding to the three TBs. For example, H2 is indicated in {012, 013, 023, 123}. Alternatively, two bits in the second bit indicate NDIs of two other TBs than the first TB in the three TBs. Two other bits in the second bit indicate an unscheduled HARQ process number H2 (a value of H2 is 0, 1, 2, or 3). In this case, HARQ process numbers corresponding to the three TBs are three remaining process numbers other than H2 in {0, 1, 2, 3}.

For example, if the value V indicated by the first bit is 5m+3, where m is 0 or a positive integer, the DCI schedules three TBs, and an NDI of the first TB is 1. Two bits in the second bit are used to indicate NDIs of two other TBs than the first TB in the three TBs. Two other bits in the second bit indicate three HARQ process numbers H2 corresponding to the three TBs. For example, H2 is indicated in {012, 013, 023, 123}. Alternatively, two bits in the second bit indicate NDIs of two other TBs than the first TB in the three TBs. Two other bits in the second bit indicate an unscheduled HARQ process number H2 (a value of H2 is 0, 1, 2, or 3). In this case, HARQ process numbers corresponding to the three TBs are three remaining process numbers other than H2 in {0, 1, 2, 3}.

For example, if the value V indicated by the first bit is 5m+4, where m is 0 or a positive integer, the DCI schedules four TBs. HARQ process numbers corresponding to the four TBs are 0, 1, 2, and 3. Four bits in the second bit separately indicate an NDI corresponding to each TB in the four TBs.

The following Table shows another indication method. In the following Table, Ni is an NDI of TBi or the $(i+1)^{th}$ TB. A value of 1 is in 0, 1, 2, and 3. For example, V in the following Table is the value indicated by the first bit. Herein, floor is a floor operation. The second bit includes four bits: b0, b1, b2, and b3.

The second node determines the MCS index based on a value obtained by performing a rounding operation on 5 by using the value indicated by the first bit. Imcs=floor(V/5). The second node determines the quantity of scheduled TBs based on a value obtained by performing an REM operation on 5 by using the value indicated by the first bit.

| TB number | V mod 5= | b0 | b1 | b2 | b3 | $I_{MCS}$ |
|---|---|---|---|---|---|---|
| 1, 2 | 0 {N0 = 0} | H0 | | H1 | | floor(V/5) |
| | 1 {N0 = 1} | | | | | |
| 3 | 2 {N0 = 0} | H2 | N1 | N2 | | |
| | 3 {N0 = 1} | | | | | |
| | 4 | N0 | N1 | N2 | N3 | |

If the value obtained by performing the REM operation on 5 by using the value indicated by the first bit is 0, the second node determines that the DCI schedules one TB or two TBs, and determines that an NDI of the first TB is 0. The second node determines the first HARQ process number (H0) based on two bits in the second bit, and the second node determines the second HARQ process number (H1) based on two other bits in the second bit. If H0=H1, the second node determines that the DCI schedules one TB, and a HARQ process number of the TB is H0. If H0≠H1, the second node determines that the DCI schedules two TBs, and HARQ process numbers of the two TBs are respectively H0 and H1. If H0<H1, an NDI of the second TB is 0. If H0>H1, an NDI of the second TB is 1. Alternatively, if H0>H1, an NDI of the second TB is 0. If H0<H1, an NDI of the second TB is 1.

If the value obtained by performing the REM operation on 5 by using the value indicated by the first bit is 1, the second node determines that the DCI schedules one TB or two TBs, and determines that an NDI of the first TB is 1. The second node determines the first HARQ process number (H0) based on two bits in the second bit, and the second node determines the second HARQ process number (H1) based on two other bits in the second bit. If H0=H1, the second node determines that the DCI schedules one TB, and a HARQ process number of the TB is H0. If H0≠H1, the second node determines that the DCI schedules two TBs, and HARQ process numbers of the two TBs are respectively H0 and H1. If H0<H1, an NDI of the second TB is 0. If H0>H1, an NDI of the second TB is 1. Alternatively, if H0>H1, an NDI of the second TB is 0. If H0<H1, an NDI of the second TB is 1.

If the value obtained by performing the REM operation on 5 by using the value indicated by the first bit is 2, the second node determines that the DCI schedules three TBs, and determines that an NDI of the first TB is 0. The second node determines NDIs of two other TBs than the first TB in the three TBs based on two bits in the second bit. The second node determines HARQ process numbers H2 corresponding to the three TBs based on two other bits in the second bit. For example, H2 is indicated in {012, 013, 023, 123}. Alternatively, the second node determines NDIs of two other TBs than the first TB in the three TBs based on two bits in the second bit. The second node determines an unscheduled HARQ process number H2 (a value of H2 is 0, 1, 2, or 3) based on two other bits in the second bit. In this case, HARQ process numbers corresponding to the three TBs are three remaining process numbers other than H2 in {0, 1, 2, 3}.

If the value obtained by performing the REM operation on 5 by using the value indicated by the first bit is 3, the second node determines that the DCI schedules three TBs, and determines that an NDI of the first TB is 1. The second node determines NDIs of two other TBs than the first TB in the three TBs based on two bits in the second bit. The second node determines HARQ process numbers H2 corresponding to the three TBs based on two other bits in the second bit. For example, H2 is indicated in {012, 013, 023, 123}. Alternatively, the second node determines NDIs of two other TBs than the first TB in the three TBs based on two bits in the second bit. The second node determines an unscheduled HARQ process number H2 (a value of H2 is 0, 1, 2, or 3) based on two other bits in the second bit. In this case, HARQ process numbers corresponding to the three TBs are three remaining process numbers other than H2 in {0, 1, 2, 3}.

If the value obtained by performing the REM operation on 5 by using the value indicated by the first bit is 4, the second node determines that the DCI schedules four TBs, and determines that HARQ process numbers corresponding to the four TBs are 0, 1, 2, and 3. The second node determines, based on four bits in the second bit, an NDI corresponding to each TB.

Multi-TB scheduling and another field in the DCI are separately indicated by using 10 bits, any HARQ process numbers used for a plurality of scheduled TBs may be indicated, and an existing single-TB scheduling manner can be supported. However, in essence, compared with an existing quantity of DCI bits, only four bits are added, and flexibility of indicating another field is not affected. This ensures scheduling flexibility, and reduces bit overheads.

In this embodiment of this application, four bits are essentially introduced to indicate multi-TB scheduling when a maximum of four TBs are scheduled. In the conventional technology, at least five bits need to be added to indicate multi-TB scheduling. Therefore, in this embodiment of this application, bit overheads are reduced, a HARQ process number of each TB can be flexibly indicated, and it can be ensured that flexibility of indicating another field is not affected when the DCI schedules any quantity of TBs. It should be noted that for ease of brief description, the foregoing method embodiments are represented as a series of actions. However, a person skilled in the art should appreciate that this application is not limited to the described order of the actions, because according to this application, some steps may be performed in other orders or simultaneously. In addition, it should be further appreciated by a person skilled in the art that the embodiments described in this specification are all embodiments, and the involved actions and modules are not necessarily required by this application.

To better implement the foregoing solutions in the embodiments of this application, the following further provides a related apparatus for implementing the foregoing solutions.

Figure 8:
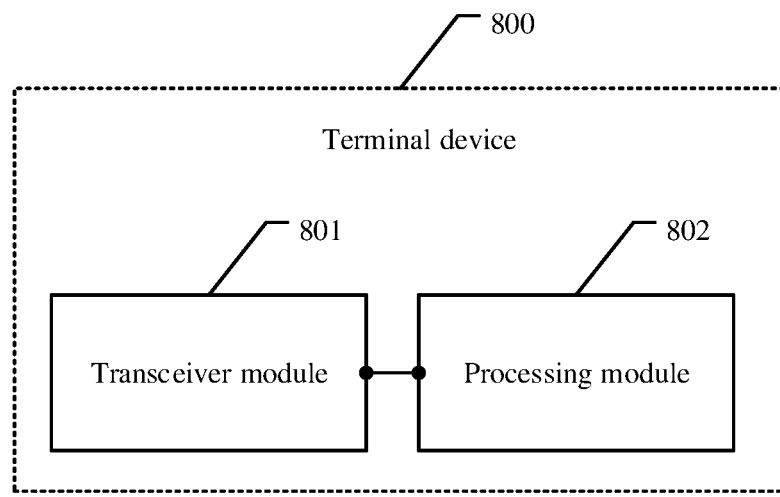
FIG. 8 is a schematic diagram of a composition structure of a terminal device according to an embodiment of this application.

FIG. 8 is a schematic diagram of a composition structure of a terminal device according to an embodiment of this application. The terminal device 800 includes a transceiver module 801 and a processing module 802.

The transceiver module is configured to receive downlink control information from a network device, where the downlink control information can schedule a maximum of N transport blocks TBs, N is a positive integer, and the downlink control information includes a first bit.

The processing module is configured to: when the first bit includes two bits, a bit status of the first bit belongs to a first state set, the first state set is {01, 10, 11}, N=4, the downlink control information includes a first field, and the first field includes five bits, determine, based on the bit status of the first bit, a quantity L of TBs scheduled by the downlink control information, and determine hybrid automatic repeat request HARQ process numbers of the L TBs and new data indicator NDI information of the L TBs based on a bit status of the five bits of the first field; or when the first bit includes two bits, a bit status of the first bit is a second state, the second state is 00, and N=1, determine a HARQ process number of the one TB based on a HARQ process index indication field included in the downlink control information, and determine NDI information of the one TB based on an NDI field included in the downlink control information.

Alternatively, the processing module is configured to: when the first bit includes one bit, a bit status of the first bit is a third state, N is greater than 1, and the downlink control information includes a second field, determine, in a first value set based on the second field, a quantity L of TBs scheduled by the downlink control information, HARQ process numbers of the L TBs, and NDI information of the L TBs; or when the first bit includes one bit, a bit status of the first bit is a fourth state, the downlink control information further includes a second bit, the second bit includes one bit, a bit status of the second bit is a fifth state, N is greater than 1, and the downlink control information includes a third field, determine, in a second value set based on the third field, a quantity L of TBs scheduled by the downlink control information, HARQ process numbers of the L TBs, and NDI information of the L TBs, where the second value set and the first value set are different sets, and a quantity of bits included in the third field is one less than a quantity of bits included in the second field; or when the first bit includes one bit, a bit status of the first bit is a fourth state, the downlink control information further includes a second bit, the second bit includes one bit, a bit status of the second bit is a sixth state, and N=1, determine a HARQ process number of the one TB based on a HARQ process index indication field included in the downlink control information, and determine NDI information of the one TB based on an NDI field included in the downlink control information.

The transceiver module is configured to: send the L TBs based on a determined HARQ process number of each TB in the L TBs and determined NDI information of each TB in the L TBs; or receive the L TBs based on a determined HARQ process number of each TB in the L TBs and determined NDI information of each TB in the L TBs.

Figure 9:
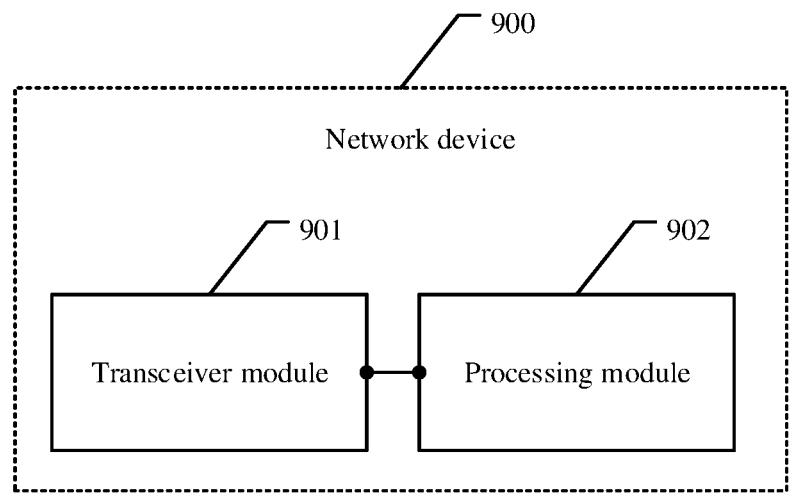
FIG. 9 is a schematic diagram of a composition structure of a network device according to an embodiment of this application.

FIG. 9 is a schematic diagram of a composition structure of a network device according to an embodiment of this application. The network device 900 includes a transceiver module 901 and a processing module 902.

The processing module is configured to determine a quantity L of transport blocks TBs scheduled by downlink control information, where the downlink control information can schedule a maximum of N TBs, N and L are positive integers, and is 1≤L≤N.

The processing module is configured to determine hybrid automatic repeat request HARQ process numbers of the L TBs.

The processing module is configured to determine new data indicator NDI information of the L TBs.

The transceiver module is configured to send the downlink control information to a terminal device, where the downlink control information includes a first bit.

The first bit includes two bits, a bit status of the first bit belongs to a first state set, the first state set is {01, 10, 11}, N=4, the downlink control information includes a first field, the bit status of the first bit is used to indicate the quantity L of TBs scheduled by the downlink control information, and a bit status of five bits of the first field is used to indicate the HARQ process numbers of the L TBs and the NDI information of the L TBs; or the first bit includes two bits, a bit status of the first bit is a second state, the second state is 00, N=1, a HARQ process index indication field included in the downlink control information is used to indicate a HARQ process number of the one TB, and an NDI field included in the downlink control information is used to indicate NDI information of the one TB.

Alternatively, the first bit includes one bit, a bit status of the first bit is a third state, N is greater than 1, the downlink control information includes a second field, and the second field indicates, in a first value set, the quantity L of TBs scheduled by the downlink control information, the HARQ process numbers of the L TBs, and the NDI information of the L TBs; or the first bit includes one bit, a bit status of the first bit is a fourth state, the downlink control information further includes a second bit, the second bit includes one bit, a bit status of the second bit is a fifth state, N is greater than 1, the downlink control information includes a third field, and the third field indicates, in a second value set, the quantity L of TBs scheduled by the downlink control information, the HARQ process numbers of the L TBs, and the NDI information of the L TBs, where the second value set and the first value set are different sets, and a quantity of bits included in the third field is one less than a quantity of bits included in the second field; or the first bit includes one bit, a bit status of the first bit is a fourth state, the downlink control information further includes a second bit, the second bit includes one bit, a bit status of the second bit is a sixth state, N=1, a HARQ process index indication field included in the downlink control information is used to indicate a HARQ process number of the one TB, and an NDI field included in the downlink control information is used to indicate NDI information of the one TB.

The transceiver module is configured to: send the L TBs based on the determined HARQ process numbers of the L TBs and the determined NDI information of the L TBs; or receive the L TBs based on the determined HARQ process numbers of the L TBs and the determined NDI information of the L TBs.

In some embodiments of this application, the first bit includes one bit, N=4, the bit status of the first bit is 1, the second field includes six bits, and the six bits of the second field indicate, in the first value set, the quantity L of TBs scheduled by the downlink control information, the HARQ process numbers of the L TBs, and the NDI information of the L TBs.

Alternatively, the first bit includes one bit, N=4, the bit status of the first bit is 0, the bit status of the second bit is 1, the third field includes five bits, and the five bits of the third field indicate, in the second value set, the quantity L of TBs scheduled by the downlink control information, the HARQ process numbers of the L TBs, and the NDI information of the L TBs.

Alternatively, the first bit includes one bit, the bit status of the first bit is 0, the bit status of the second bit is 0, the HARQ process index indication field is used to indicate the HARQ process number of the one TB, and the NDI field is used to indicate the NDI information of the one TB.

In some embodiments of this application, the first bit includes one bit, and a value set of N is {1, 2, 4, 8}; or a value set of N is {2, 4}; or a value set of N is {1, 4}; or a value set of N is {1, 4, 8}.

FIG. 8 is a schematic diagram of a composition structure of a terminal device according to an embodiment of this application. The terminal device 800 includes a transceiver module 801 and a processing module 802.

The processing module is configured to receive downlink control information from a network device, where the downlink control information can schedule a maximum of four transport blocks TBs, the downlink control information includes a first bit and a second bit, the first bit includes seven bits, and the second bit includes three bits.

The processing module is configured to: determine, based on the first bit, a quantity L of transport blocks TBs scheduled by the downlink control information, and determine an index of a modulation and coding scheme MCS based on the first bit.

The processing module is configured to: when L=1, determine that one bit in the second bit is a new data indicator NDI bit, and determine a hybrid automatic repeat request HARQ process number of the one TB based on a bit status of two bits other than the one NDI bit in the second bit; or when L=2, determine that two bits in the second bit are NDI bits, and determine HARQ process numbers of the two TBs based on a bit status of one bit other than the two NDI bits in the second bit and a bit status of the first bit; or when L=3, determine that the three bits in the second bit are NDI bits, and determine HARQ process numbers of the three TBs based on a bit status of the first bit; or when L=4, determine that the three bits in the second bit are NDI bits corresponding to three TBs in the four TBs, and determine, based on a bit status of the first bit, an NDI bit corresponding to one TB in the four TBs other than the three TBs corresponding to the NDI bits.

The transceiver module is configured to: send the L TBs based on a determined HARQ process number of each TB in the L TBs, determined NDI information of each TB in the L TBs, and the index of the MCS; or receive the L TBs based on a determined HARQ process number of each TB in the L TBs, determined NDI information of each TB in the L TBs, and the index of the MCS.

FIG. 9 is a schematic diagram of a composition structure of a network device according to an embodiment of this application. The network device 900 includes a transceiver module 901 and a processing module 902.

The processing module is configured to determine a quantity L of transport blocks TBs scheduled by downlink control information, where the downlink control information can schedule a maximum of N TBs, N and L are positive integers, and is 1≤L≤N.

The processing module is configured to determine hybrid automatic repeat request HARQ process numbers of the L TBs.

The processing module is configured to determine new data indicator NDI information of the L TBs.

The transceiver module is configured to send the downlink control information to a terminal device, where the downlink control information includes a first bit and a second bit, the first bit includes seven bits, and the second bit includes three bits.

The first bit is used to indicate the quantity L of transport blocks TBs scheduled by the downlink control information, and is further used to indicate an index of a modulation and coding scheme MCS.

When L=1, one bit in the second bit is a new data indicator NDI bit, and a bit status of two bits other than the one NDI bit in the second bit is used to indicate a hybrid automatic repeat request HARQ process number of the one TB; or when L=2, two bits in the second bit are NDI bits, and a bit status of one bit other than the two NDI bits in the second bit and a bit status of the first bit are used to indicate HARQ process numbers of the two TBs; or when L=3, the three bits in the second bit are NDI bits, and a bit status of the first bit is used to indicate HARQ process numbers of the three TBs; or when L=4, the three bits in the second bit are NDI bits corresponding to three TBs in the four TBs, and a bit status of the first bit is used to indicate an NDI bit corresponding to one TB in the four TBs other than the three TBs corresponding to the NDI bits.

The transceiver module is configured to: send the L TBs based on a determined HARQ process number of each TB in the L TBs, determined NDI information of each TB in the L TBs, and the index of the MCS; or receive the L TBs based on a determined HARQ process number of each TB in the L TBs, determined NDI information of each TB in the L TBs, and the index of the MCS.

In some embodiments of this application, a value obtained by performing an REM operation on a first value M by using an index indicated by the first bit is 0, L=1, and M is a positive integer.

Alternatively, a value obtained by performing an REM operation on a first value M by using an index indicated by the first bit is 1, L=2, the HARQ process numbers of the two TBs are $\{H_0=b_2, H_1=1+b_2\}$, $H_0$ and $H_1$ represent the HARQ process numbers of the two TBs, and $b_2$ represents the bit status of the one bit other than the two NDI bits in the second bit.

Alternatively, a value obtained by performing an REM operation on a first value M by using an index indicated by the first bit is 2, L=2, the HARQ process numbers of the two TBs are $\{H_0=0, H_1=2+b_2\}$, $H_0$ and $H_1$ represent the HARQ process numbers of the two TBs, and $b_2$ represents the bit status of the one bit other than the two NDI bits in the second bit.

Alternatively, a value obtained by performing an REM operation on a first value M by using an index indicated by the first bit is 3, L=2, the HARQ process numbers of the two TBs are $\{H_0=b_2, H_1=3\}$, $H_0$ and $H_1$ represent the HARQ process numbers of the two TBs, and $b_2$ represents the bit status of the one bit other than the two NDI bits in the second bit.

Alternatively, a value obtained by performing an REM operation on a first value M by using an index indicated by the first bit is 4, L=3, the HARQ process numbers of the three TBs are $\{H_0=0, H_1=1, H_2=2\}$, and $H_0$, $H_1$, and $H_2$ represent the HARQ process numbers of the three TBs.

Alternatively, a value obtained by performing an REM operation on a first value M by using an index indicated by the first bit is 5, L=3, the HARQ process numbers of the three TBs are $\{H_0=0, H_1=1, H_2=3\}$, and $H_0$, $H_1$, and $H_2$ represent the HARQ process numbers of the three TBs.

Alternatively, a value obtained by performing an REM operation on a first value M by using an index indicated by the first bit is 6, L=3, the HARQ process numbers of the three TBs are $\{H_0=0, H_1=2, H_2=3\}$, and $H_0$, $H_1$, and $H_2$ represent the HARQ process numbers of the three TBs.

Alternatively, a value obtained by performing an REM operation on a first value M by using an index indicated by the first bit is 7, L=3, the HARQ process numbers of the three TBs are $\{H_0=1, H_1=2, H_2=3\}$, and $H_0$, $H_1$, and $H_2$ represent the HARQ process numbers of the three TBs.

Alternatively, a value obtained by performing an REM operation on a first value M by using an index indicated by the first bit is 8, L=4, and NDI information corresponding to the one TB in the four TBs other than the three TBs corresponding to the NDI bits is 0.

Alternatively, a value obtained by performing an REM operation on a first value M by using an index indicated by the first bit is 9, L=4, and NDI information corresponding to the one TB in the four TBs other than the three TBs corresponding to the NDI bits is 1.

In some embodiments of this application, the index of the MCS is floor (index indicated by the first bit/M).

Herein, floor represents a floor function, and / represents a division operation.

In some embodiments of this application, M=10.

An embodiment of this application provides a terminal device. The terminal device includes a processing module and a transceiver module.

The transceiver module is configured to receive downlink control information from a network device, where the downlink control information can schedule a maximum of four transport blocks TBs, the downlink control information includes a first bit and a second bit, the first bit includes six bits, and the second bit includes four bits.

The processing module is configured to determine, based on the first bit, at least a quantity L of transport blocks TBs scheduled by the downlink control information and an index of a modulation and coding scheme MCS.

The processing module is configured to determine at least one of hybrid automatic repeat request HARQ process numbers of the L TBs and new data indicator NDI information of K TBs based on the second bit, where K is an integer less than or equal to L.

The transceiver module is configured to send the L TBs based on a determined HARQ process number of each TB in the L TBs, determined NDI information of each TB in the L TBs, and the index of the MCS.

Alternatively, the transceiver module is configured to receive the L TBs based on a determined HARQ process number of each TB in the L TBs, determined NDI information of each TB in the L TBs, and the index of the MCS.

In some embodiments of this application, a value V indicated by the first bit is used to indicate the MCS index Imcs, and V=Imcs*5.

In some embodiments of this application, the value V indicated by the first bit is a multiple of 5, L=1 or L=2, and an NDI of the first TB is 0.

Two bits in the second bit are used to indicate a first HARQ process number H0, and two remaining bits other than the two bits in the second bit are used to indicate a second HARQ process number H1; and if H0=H1, L=1, and a HARQ process number of the one TB is H0; or if H0≠H1, L=2, and HARQ process numbers of the two TBs are respectively H0 and H1.

If H0<H1, an NDI of the second TB is 0; or if H0>H1, an NDI of the second TB is 1.

In some embodiments of this application, the value V indicated by the first bit is 5m+1, m is 0 or a positive integer, L=1 or L=2, and an NDI of the first TB is 1.

Two bits in the second bit are used to indicate a first HARQ process number H0, and two remaining bits other than the two bits in the second bit are used to indicate a second HARQ process number H1; and if H0=H1, L=1, and a HARQ process number of the one TB is H0; or if H0≠H1, L=2, and HARQ process numbers of the two TBs are respectively H0 and H1.

If H0<H1, an NDI of the second TB is 0; or if H0>H1, an NDI of the second TB is 1.

In some embodiments of this application, the value V indicated by the first bit is 5m+2, m is 0 or a positive integer, L=3, and an NDI of the first TB is 0.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, the value V indicated by the first bit is 5m+3, m is 0 or a positive integer, L=3, and an NDI of the first TB is 1.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, the value V indicated by the first bit is 5m+4, m is 0 or a positive integer, and L=4.

HARQ process numbers corresponding to the four TBs are four HARQ process numbers in a HARQ process set {0, 1, 2, 3}.

The four bits in the second bit separately indicate NDI information corresponding to each TB in the four TBs.

In some embodiments of this application, a value obtained by performing an REM operation on 5 by using the value indicated by the first bit is 0, the downlink control information schedules one TB or two TBs, and an NDI of the first TB is 0.

Two bits in the second bit are used to indicate a first HARQ process number H0, and two remaining bits other than the two bits in the second bit are used to indicate a second HARQ process number H1; and if H0=H1, L=1, and a HARQ process number of the one TB is H0; or if H0≠H1, L=2, and HARQ process numbers of the two TBs are respectively H0 and H1.

If H0<H1, an NDI of the second TB is 0; or if H0>H1, an NDI of the second TB is 1.

In some embodiments of this application, a value obtained by performing an REM operation on 5 by using the value indicated by the first bit is 1, the downlink control information schedules one TB or two TBs, and an NDI of the first TB is 1.

Two bits in the second bit are used to indicate a first HARQ process number H0, and two remaining bits other than the two bits in the second bit are used to indicate a second HARQ process number H1; and if H0=H1, L=1, and a HARQ process number of the one TB is H0; or if H0≠H1, L=2, and HARQ process numbers of the two TBs are respectively H0 and H1.

If H0<H1, an NDI of the second TB is 0; or if H0>H1, an NDI of the second TB is 1.

In some embodiments of this application, a value obtained by performing an REM operation on 5 by using the value indicated by the first bit is 2, the downlink control information schedules three TBs, and an NDI of the first TB is 0.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, a value obtained by performing an REM operation on 5 by using the value indicated by the first bit is 3, the downlink control information schedules three TBs, and an NDI of the first TB is 1.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, a value obtained by performing an REM operation on 5 by using the value indicated by the first bit is 4, and the downlink control information schedules four TBs.

HARQ process numbers corresponding to the four TBs are four HARQ process numbers in a HARQ process set {0, 1, 2, 3}.

The four bits in the second bit separately indicate NDI information corresponding to each TB in the four TBs.

An embodiment of this application provides a network device. The network device includes a processing module and a transceiver module.

The processing module is configured to determine a quantity L of transport blocks TBs scheduled by downlink control information, where the downlink control information can schedule a maximum of N TBs, N and L are positive integers, and is 1≤L≤N.

The processing module is configured to determine hybrid automatic repeat request HARQ process numbers of the L TBs.

The processing module is configured to determine new data indicator NDI information of the L TBs.

The transceiver module is configured to send the downlink control information to a terminal device, where the downlink control information includes a first bit and a second bit, the first bit includes six bits, and the second bit includes four bits.

The first bit is used to indicate the quantity L of transport blocks TBs scheduled by the downlink control information and an index of a modulation and coding scheme MCS.

The second bit is used to indicate at least one of hybrid automatic repeat request HARQ process numbers of the L TBs and new data indicator NDI information of K TBs, where K is an integer less than or equal to L.

The transceiver module is configured to send the L TBs based on a determined HARQ process number of each TB in the L TBs, determined NDI information of each TB in the L TBs, and the index of the MCS.

Alternatively, the transceiver module is configured to receive the L TBs based on a determined HARQ process number of each TB in the L TBs, determined NDI information of each TB in the L TBs, and the index of the MCS.

In some embodiments of this application, a value V indicated by the first bit is used to indicate the MCS index Imcs, and V=Imcs*5.

In some embodiments of this application, the downlink control information schedules one TB or two TBs, an NDI of the first TB is 0, and the value V indicated by the first bit is a multiple of 5.

Two bits in the second bit are used to indicate a first HARQ process number H0, and two remaining bits other than the two bits in the second bit are used to indicate a second HARQ process number H1; and the downlink control information schedules one TB, H0=H1, and a HARQ process number of the one TB is H0; or the downlink control information schedules two TBs, H0≠H1, and HARQ process numbers of the two TBs are respectively H0 and H1.

An NDI of the second TB is 0, and H0<H1; or an NDI of the second TB is 1, and H0>H1.

In some embodiments of this application, the downlink control information schedules one TB or two TBs, an NDI of the first TB is 1, the value V indicated by the first bit is 5m+1, and m is 0 or a positive integer.

Two bits in the second bit are used to indicate a first HARQ process number H0, and two remaining bits other than the two bits in the second bit are used to indicate a second HARQ process number H1; and the downlink control information schedules one TB, H0=H1, and a HARQ process number of the one TB is H0; or the downlink control information schedules two TBs, H0≠H1, and HARQ process numbers of the two TBs are respectively H0 and H1.

An NDI of the second TB is 0, and H0<H1; or an NDI of the second TB is 1, and H0>H1.

In some embodiments of this application, the downlink control information schedules three TBs, an NDI of the first TB is 0, the value V indicated by the first bit is 5m+2, and m is 0 or a positive integer.

Two bits in the second bit are used to separately indicate NDI information of K other TBs than the first TB in the three TBs, where K=2.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, the downlink control information schedules three TBs, an NDI of the first TB is 1, the value V indicated by the first bit is 5m+3, and m is 0 or a positive integer.

Two bits in the second bit are used to separately indicate NDI information of two other TBs than the first TB in the three TBs.

Two remaining bits other than the two bits in the second bit indicate three HARQ process numbers corresponding to the three TBs; or two remaining bits other than the two bits in the second bit indicate an unscheduled HARQ process number H2, H2 is a HARQ process number in a HARQ process set {0, 1, 2, 3}, and HARQ process numbers corresponding to the three TBs are three remaining HARQ process numbers other than H2 in {0, 1, 2, 3}.

In some embodiments of this application, the downlink control information schedules four TBs, the value V indicated by the first bit is 5m+4, and m is 0 or a positive integer.

HARQ process numbers corresponding to the four TBs are four HARQ process numbers in a HARQ process set {0, 1, 2, 3}.

The four bits in the second bit separately indicate NDI information corresponding to each TB in the four TBs.

An embodiment of this application further provides a computer storage medium. The computer storage medium stores a program. The program is executed to perform some or all of the steps recorded in the method embodiments.

Figure 10:
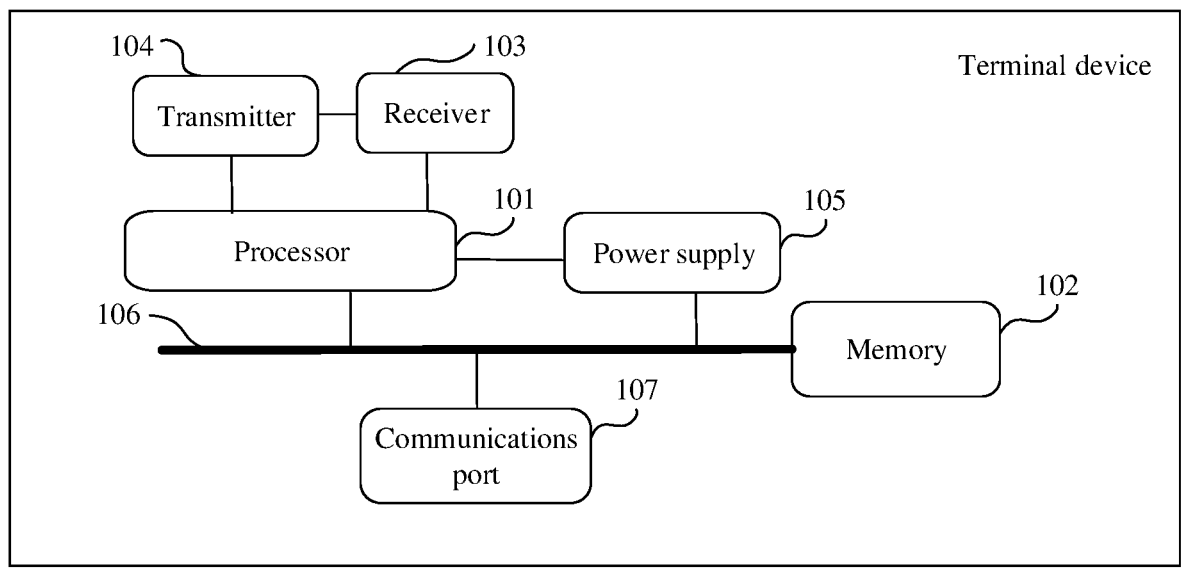
FIG. 10 is a schematic diagram of a composition structure of another terminal device according to an embodiment of this application.

FIG. 10 is a schematic diagram of a structure of another first communication device according to an embodiment of this application. The first communication device is a terminal device, and the terminal device may include a processor 101 (for example, a CPU), a memory 102, a transmitter 104, and a receiver 103. The transmitter 104 and the receiver 103 are coupled to the processor 101. The processor 101 controls a sending action of the transmitter 104 and a receiving action of the receiver 103. The memory 102 may include a high-speed RAM memory, or may further include a non-volatile memory NVM, for example, at least one magnetic disk memory. The memory 102 may store various instructions, to complete various processing functions and implement the method steps in the embodiments of this application. Optionally, the terminal device in this embodiment of this application may further include one or more of a power supply 105, a communication bus 106, and a communication port 107. The receiver 103 and the transmitter 104 may be integrated into a transceiver of the terminal device, or may be a receive antenna and a transmit antenna that are independent of each other on the terminal device. The communication bus 106 is configured to implement a communication connection between elements. The communication port 107 is configured to implement a connection and communication between the terminal device and another peripheral.

In this embodiment of this application, the memory 102 is configured to store computer-executable program code, where the program code includes instructions. When the processor 101 executes the instructions, the instructions enable the processor 101 to perform the processing action of the terminal device in the foregoing method embodiment shown in FIG. 2A and FIG. 2B, and enable the transmitter 104 to perform the sending action of the terminal device in the foregoing method embodiment. Implementation principles and technical effects are similar, and are not described herein again.

Figure 11:
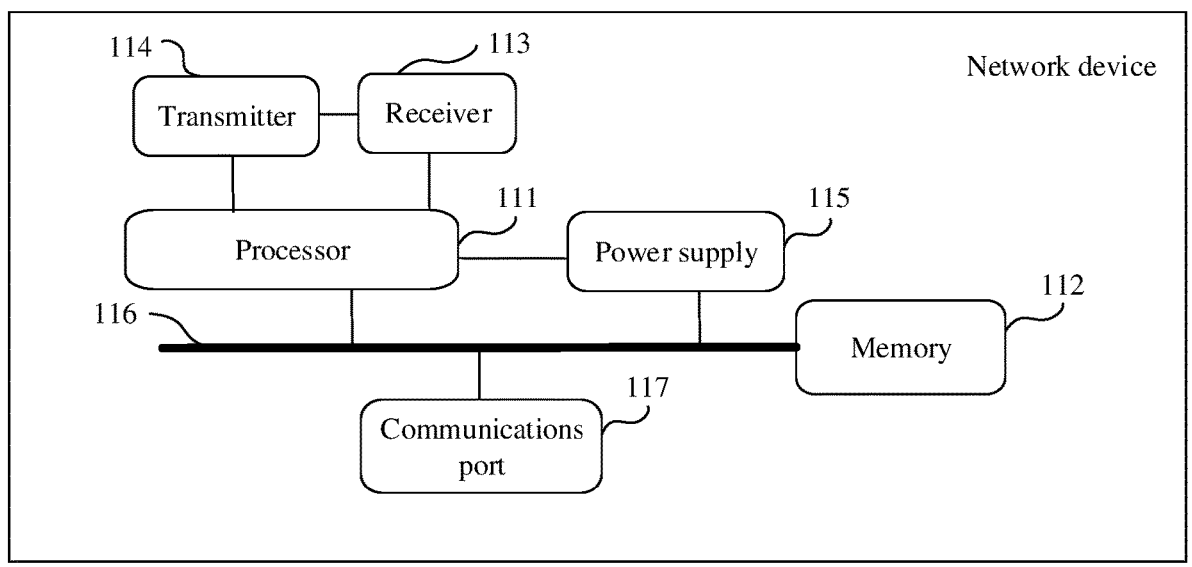
FIG. 11 is a schematic diagram of a composition structure of another network device according to an embodiment of this application.

FIG. 11 is a schematic diagram of a structure of another second communication device according to an embodiment of this application. The second communication device is a network device, and the network device may include a processor (such as a CPU) 11, a memory 112, a receiver 113, and a transmitter 114. The receiver 113 and the transmitter 114 are coupled to the processor 11. The processor 111 controls a receiving action of the receiver 113 and a sending action of the transmitter 114. The memory 112 may include a high-speed RAM memory, or may further include a non-volatile memory NVM, for example, at least one magnetic disk memory. The memory 112 may store various instructions, to complete various processing functions and implement the method steps in the embodiments of this application. Optional, the network device in this embodiment of this application may further include one or more of a power supply 115, a communication bus 116, and a communication port 117. The receiver 113 and the transmitter 114 may be integrated into a transceiver of the network device, or may be a receive antenna and a transmit antenna that are independent of each other on the network device. The communication bus 116 is configured to implement a communication connection between elements. The communication port 117 is configured to implement connectivity communication between the network device and another peripheral.

In this embodiment of this application, the memory 112 is configured to store computer-executable program code, where the program code includes instructions. When the processor 111 executes the instructions, the instructions enable the processor 111 to perform the processing action of the network device in the foregoing method embodiment shown in FIG. 2A and FIG. 2B, and enable the transmitter 114 to perform the sending action of the network device in the foregoing method embodiment. Implementation principles and technical effects are similar, and are not described herein again.

In another possible design, when a data transmission apparatus is a chip in a terminal device or a network device, the chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the terminal performs the wireless communication method according to any one of the implementations of the first aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that can store static information and instructions, for example, a random access memory (RAM).

The processor mentioned anywhere above may be a general-purpose central processing unit (CPU), a microprocessor, an application-specific integrated circuit (ASIC), or one or more integrated circuits for controlling program execution of the wireless communication method according to the first aspect.

In addition, it should be noted that the described apparatus embodiments are merely examples. The units described as separate parts may or may not be physically separate, and parts displayed as units may or may not be physical units, and may be located at one position, or may be distributed on a plurality of network units. Some or all the modules may be selected according to an actual need to achieve the objectives of the solutions of the embodiments. In addition, in the accompanying drawings of the apparatus embodiments provided in this application, connection relationships between the modules indicate that the modules have communication connections with each other, which may be specifically implemented as one or more communication buses or signal cables. A person of ordinary skill in the art may understand and implement the embodiments without creative efforts.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A method, applied to a terminal device or a chip in the terminal device, the method comprising:
    receiving downlink control information from a network device, wherein the downlink control information is capable of scheduling a maximum of four transport blocks (TBs), the downlink control information comprises 10 bits, the 10 bits comprise a first bit group and a second bit group, the first bit group comprises seven bits, and the second bit group comprises three bits;
    determining, based on the first bit group, a quantity L of TBs scheduled by the downlink control information, and determining an index of a modulation and coding scheme (MCS) based on the first bit group, wherein L is a positive integer;
    determining a hybrid automatic repeat request (HARQ) process number and new data indicator (NDI) information of each TB in the L TBs, wherein NDI information of at least one TB of the LTBs is determined according to the second bit group; and
    performing the following:
        sending the L TBs based on the determined HARQ process number and the NDI information of the each TB in the L TBs, and based on the index of the MCS; or
        receiving the L TBs based on the determined HARQ process number and NDI information of the each TB in the L TBs, and based on the index of the MCS.

2. The method according to claim 1, wherein determining the HARQ process number and the NDI information of the each TB in the L TBs comprises:
    when L=1, determining that one bit of the second bit group is an NDI bit, and determining, according to a bit status of two bits other than the one NDI bit in the second bit group, a HARQ process number of the one TB;
    when L=2, determining that two bits in the second bit group are NDI bits, and determining, according to a bit status of one bit other than the two NDI bits in the second bit group and a bit status of the first bit group, HARQ process numbers of the two TBs;
    when L=3, determining that three bits of the second bit group are NDI bits, and determining, according to a bit status of the first bit group, HARQ process numbers of the three TBs; or
    when L=4, determining a HARQ process number of each TB in the four TBs, determining that three bits of the second bit group are NDI bits corresponding to three TBs of the four TBs, and determining, according to a bit status of the first bit group, NDI information of one TB other than the three TBs in the four TBs.

3. The method according to claim 1, wherein:
    a value obtained by performing a remainder operation on a first value M using an index indicated by the first bit group is 0, L=1, and M is a positive integer; or
    a value obtained by performing a remainder operation on a first value M using an index indicated by the first bit group is 1, L=2, the HARQ process numbers of the two TBs are $\{H_0=b_2, H_1=1+b_2\}$, $H_0$ and $H_1$ represent the HARQ process numbers of the two TBs, and $b_2$ represents a bit status of the bit other than two NDI bits in the second bit group; or
    a value obtained by performing a remainder operation on a first value M using an index indicated by the first bit group is 2, L=2, the HARQ process numbers of the two TBs are $\{H_0=0, H_1=2+b_2\}$, $H_0$ and $H_1$ represent the HARQ process numbers of the two TBs, and $b_2$ represents a bit status of one bit other than two NDI bits in the second bit group; or
    a value obtained by performing a remainder operation on a first value M using an index indicated by the first bit group is 3, L=2, the HARQ process numbers of the two TBs are $\{H_0=b_2, H_1=3\}$, $H_0$ and $H_1$ represent the HARQ process numbers of the two TBs, and $b_2$ represents a bit status of one bit other than two NDI bits in the second bit group; or
    a value obtained by performing a remainder operation on a first value M using an index indicated by the first bit group is 4, L=3, the HARQ process numbers of the three TBs are $\{H_0=0, H_1=1, H_2=2\}$, and $H_0$, $H_1$, and $H_2$ represent the HARQ process numbers of the three TBs; or
    a value obtained by performing an REM operation on a first value M using an index indicated by the first bit group is 5, L=3, the HARQ process numbers of the three TBs are $\{H_0=0, H_1=1, H_2=3\}$, and $H_0$, $H_1$, and $H_2$ represent the HARQ process numbers of the three TBs; or
    a value obtained by performing a remainder operation on a first value M using an index indicated by the first bit group is 6, L=3, the HARQ process numbers of the three TBs are $\{H_0=0, H_1=2, H_2=3\}$, and $H_0$, $H_1$, and $H_2$ represent the HARQ process numbers of the three TBs; or
    a value obtained by performing a remainder operation on a first value M using an index indicated by the first bit group is 7, L=3, the HARQ process numbers of the three TBs are $\{H_0=1, H_1=2, H_2=3\}$, and $H_0$, $H_1$, and $H_2$ represent the HARQ process numbers of the three TBs; or
    a value obtained by performing a remainder operation on a first value M using an index indicated by the first bit group is 8, L=4, and NDI information corresponding to one TB in the four TBs other than three TBs corresponding to the NDI bits is 0; or
    a value obtained by performing a remainder operation on a first value M using an index indicated by the first bit group is 9, L=4, and NDI information corresponding to one TB in the four TBs other than three TBs corresponding to the NDI bits is 1.

4. The method according to claim 3, wherein the index of the MCS is:
floor (index indicated by the first bit group/M); and
wherein floor represents a floor function, and / represents a division operation.

5. The method according to claim 4, wherein M=10.

6. A method, applied to a network device or a chip in the network device, the method comprising:
determining a quantity L of transport blocks (TBs) to be scheduled by downlink control information, wherein the downlink control information is capable of scheduling a maximum of N TBs, N and L are positive integers, and 1≤L≤N;
determining hybrid automatic repeat request (HARQ) process numbers of the L TBs;
determining new data indicator (NDI) information of the L TBs;
sending the downlink control information to a terminal device, wherein the downlink control information comprises 10 bits, the 10 bits comprise a first bit group and a second bit group, the first bit group comprises seven bits, and the second bit group comprises three bits, and wherein:
the first bit group indicates the quantity L of TBs scheduled by the downlink control information, and further indicates an index of a modulation and coding scheme (MCS), and the second bit group indicates NDI information of at least one TB of the L TBs; and
performing the following:
sending the L TBs based on the determined HARQ process number and NDI information of each TB in the L TBs, and based on the index of the MCS; or
receiving the L TBs based on the determined HARQ process number and the NDI information of the each TB in the L TBs, and based on the index of the MCS.

7. The method according to claim 6, wherein:
when L=1, one bit of the second bit group is an NDI bit, and a bit status of two bits other than the one NDI bit in the second bit group indicates a HARQ process number of the one TB;
when L=2, two bits in the second bit group are NDI bits, and a bit status of one bit other than the two NDI bits in the second bit group and a bit status of the first bit group indicate HARQ process numbers of the two TBs;
when L=3, three bits of the second bit group are NDI bits, and a bit status of the first bit group indicates HARQ process numbers of the three TBs; or
when L=4, three bits of the second bit group are NDI bits corresponding to three TBs of the four TBs, and a bit status of the first bit group indicates NDI information of one TB other than the three TBs in the four TBs.

8. The method according to claim 6, wherein:
a value obtained by performing a remainder operation on a first value M using an index indicated by the first bit group is 0, L=1, and M is a positive integer; or
a value obtained by performing a remainder operation on a first value M using an index indicated by the first bit group is 1, L=2, the HARQ process numbers of the two TBs are $\{H_0=b_2, H_1=1+b_2\}$, $H_0$ and $H_1$ represent the HARQ process numbers of the two TBs, and $b_2$ represents a bit status of one bit group other than two NDI bits in the second bit group; or
a value obtained by performing a remainder operation on a first value M using an index indicated by the first bit group is 2, L=2, the HARQ process numbers of the two TBs are $\{H_0=0, H_1=2+b_2\}$, $H_0$ and $H_1$ represent the HARQ process numbers of the two TBs, and $b_2$ represents a bit status of the one bit other than two NDI bits in the second bit group; or
a value obtained by performing a remainder operation on a first value M using an index indicated by the first bit group is 3, L=2, the HARQ process numbers of the two TBs are $\{H_0=b_2, H_1=3\}$, $H_0$ and $H_1$ represent the HARQ process numbers of the two TBs, and $b_2$ represents a bit status of one bit other than the two NDI bits in the second bit group; or
a value obtained by performing a remainder operation on a first value M using an index indicated by the first bit group is 4, L=3, the HARQ process numbers of the three TBs are $\{H_0=0, H_1=1, H_2=2\}$, and $H_0$, $H_1$, and $H_2$ represent the HARQ process numbers of the three TBs; or
a value obtained by performing a remainder operation on a first value M using an index indicated by the first bit group is 5, L=3, the HARQ process numbers of the three TBs are $\{H_0=0, H_1=1, H_2=3\}$, and $H_0$, $H_1$, and $H_2$ represent the HARQ process numbers of the three TBs; or
a value obtained by performing a remainder operation on a first value M using an index indicated by the first bit group is 6, L=3, the HARQ process numbers of the three TBs are $\{H_0=0, H_1=2, H_2=3\}$, and $H_0$, $H_1$, and $H_2$ represent the HARQ process numbers of the three TBs; or
a value obtained by performing a remainder operation on a first value M using an index indicated by the first bit group is 7, L=3, the HARQ process numbers of the three TBs are $\{H_0=1, H_1=2, H_2=3\}$, and $H_0$, $H_1$, and $H_2$ represent the HARQ process numbers of the three TBs; or
a value obtained by performing a remainder operation on a first value M using an index indicated by the first bit group is 8, L=4, and NDI information corresponding to one TB in the four TBs other than three TBs corresponding to NDI bits is 0; or
a value obtained by performing a remainder operation on a first value M using an index indicated by the first bit group is 9, L=4, and NDI information corresponding to one TB in the four TBs other than three TBs corresponding to NDI bits is 1.

9. The method according to claim 8, wherein the index of the MCS is:
floor (index indicated by the first bit group/M); and
wherein floor represents a floor function, and / represents a division operation.

10. The method according to claim 9, wherein M=10.

11. A terminal device or a chip in the terminal device, comprising:
a transceiver,
at least one processor, and
a non-transitory computer-readable medium storing computer-executable instructions that, when executed by the at least one processor, cause the terminal device or the chip in the terminal device to:
receive downlink control information from a network device, wherein the downlink control information is capable of scheduling a maximum of four transport blocks (TBs), the downlink control information comprises 10 bits, the 10 bits comprise a first bit group and a second bit group, the first bit group comprises seven bits, and the second bit group comprises three bits;

determine, based on the first bit group, a quantity L of TBs scheduled by the downlink control information, and determine an index of a modulation and coding scheme (MCS) based on the first bit group, wherein L is a positive integer;

determine a hybrid automatic repeat request (HARQ) process number and new data indicator (NDI) information of each TB in the L TBs, wherein NDI information of at least one TB of the LTBs is determined according to the second bit group; and perform the following:
    send the L TBs based on the determined HARQ process number and NDI information of the each TB in the L TBs, and based on the index of the MCS; or
    receive the L TBs based on the determined HARQ process number and NDI information of the each TB in the L TBs, and based on the index of the MCS.

12. The device according to claim 11, wherein the instructions, when executed by the at least one processor, further cause the terminal device to:

when L=1, determine that one bit of the second bit group is an NDI bit, and determine, according to a bit status of two bits other than the one NDI bit in the second bit group, a HARQ process number of the one TB;

when L=2, determine that two bits in the second bit group are NDI bits, and determine, according to a bit status of one bit other than the two NDI bits in the second bit group and a bit status of the first bit group, HARQ process numbers of the two TBs;

when L=3, determine that three bits of the second bit group are NDI bits, and determine, according to a bit status of the first bit group, HARQ process numbers of the three TBs; or when L=4, determine a HARQ process number of the each TB in the four TBs, determine that three bits of the second bit group are NDI bits corresponding to three TBs of the four TBs, and determine, according to a bit status of the first bit group, NDI information of one TB other than the three TBs in the four TBs.

13. The device according to claim 11, wherein:

a value obtained by performing a remainder operation on a first value M using an index indicated by the first bit group is 0, L=1, and M is a positive integer; or a value obtained by performing a remainder operation on a first value M using an index indicated by the first bit group is 1, L=2, the HARQ process numbers of the two TBs are $\{H_0=b_2, H_1=1+b_2\}$, $H_0$ and $H_1$ represent the HARQ process numbers of the two TBs, and $b_2$ represents a bit status of one bit other than two NDI bits in the second bit group; or a value obtained by performing a remainder operation on a first value M using an index indicated by the first bit group is 2, L=2, the HARQ process numbers of the two TBs are $\{H_0=0, H_1=2+b_2\}$, $H_0$ and $H_1$ represent the HARQ process numbers of the two TBs, and $b_2$ represents a bit status of one bit other than two NDI bits in the second bit group; or a value obtained by performing a remainder operation on a first value M using an index indicated by the first bit group is 3, L=2, the HARQ process numbers of the two TBs are $\{H_0=b_2, H_1=3\}$, $H_0$ and $H_1$ represent the HARQ process numbers of the two TBs, and $b_2$ represents a bit status of the bit other than two NDI bits in the second bit group; or a value obtained by performing a remainder operation on a first value M using an index indicated by the first bit group is 4, L=3, the HARQ process numbers of the three TBs are $\{H_0=0, H_1=1, H_2=2\}$, and $H_0$, $H_1$, and $H_2$ represent the HARQ process numbers of the three TBs; or a value obtained by performing a remainder operation on a first value M using an index indicated by the first bit group is 5, L=3, the HARQ process numbers of the three TBs are $\{H_0=0, H_1=1, H_2=3\}$, and $H_0$, $H_1$, and $H_2$ represent the HARQ process numbers of the three TBs; or a value obtained by performing a remainder operation on a first value M using an index indicated by the first bit group is 6, L=3, the HARQ process numbers of the three TBs are $\{H_0=0, H_1=2, H_2=3\}$, and $H_0$, $H_1$, and $H_2$ represent the HARQ process numbers of the three TBs; or a value obtained by performing a remainder operation on a first value M using an index indicated by the first bit group is 7, L=3, the HARQ process numbers of the three TBs are $\{H_0=1, H_1=2, H_2=3\}$, and $H_0$, $H_1$, and $H_2$ represent the HARQ process numbers of the three TBs; or a value obtained by performing a remainder operation on a first value M using an index indicated by the first bit group is 8, L=4, and NDI information corresponding to one TB in the four TBs other than three TBs corresponding to NDI bits is 0; or a value obtained by performing a remainder operation on a first value M using an index indicated by the first bit group is 9, L=4, and NDI information corresponding to one TB in the four TBs other than three TBs corresponding to NDI bits is 1.

14. The device according to claim 13, wherein the index of the MCS is:

floor (index indicated by the first bit group/M); and wherein floor represents a floor function, and / represents a division operation.

15. The device according to claim 14, wherein M=10.

16. A network device or a chip in the network device, comprising:

a transceiver, at least one processor, and a non-transitory computer-readable medium storing computer-executable instructions that, when executed by the at least one processor, cause the network device or the chip in the network device to:

determine a quantity L of transport blocks (TBs) scheduled by downlink control information, wherein the downlink control information is capable of scheduling a maximum of N TBs, N and L are positive integers, and 1≤L≤N;

determine hybrid automatic repeat request (HARQ) process numbers of the L TBs;

determine new data indicator (NDI) information of the L TBs;

send the downlink control information to a terminal device, wherein the downlink control information comprises 10 bits, the 10 bits comprise a first bit group and a second bit group, the first bit group comprises seven bits, and the second bit group comprises three bits, and wherein the first bit group indicates the quantity L of TBs scheduled by the downlink control information, and further indicates an index of a modulation and coding scheme (MCS), and the second bit group indicates NDI information of at least one TB of the L TBs; and perform the following:
- send the L TBs based on the determined HARQ process number and NDI information of the each TB in the L TBs, and based on the index of the MCS; or
- receive the L TBs based on the determined HARQ process number and NDI information of the each TB in the L TBs, and based on the index of the MCS.

17. The device according to claim 16, wherein:
   - when L=1, one bit of the second bit group is an NDI bit, and a bit status of two bits other than the one NDI bit in the second bit group indicates a HARQ process number of the one TB;
   - when L=2, two bits in the second bit group are NDI bits, and a bit status of one bit other than the two NDI bits in the second bit group and a bit status of the first bit group indicate HARQ process numbers of the two TBs;
   - when L=3, three bits of the second bit group are NDI bits, and a bit status of the first bit group indicates HARQ process numbers of the three TBs; or
   - when L=4, three bits of the second bit group are NDI bits corresponding to three TBs of the four TBs, and a bit status of the first bit group indicates NDI information of one TB other than the three TBs in the four TBs.

18. The device according to claim 16, wherein:
   - a value obtained by performing a remainder operation on a first value M using an index indicated by the first bit group is 0, L=1, and M is a positive integer; or
   - a value obtained by performing a remainder operation on a first value M using an index indicated by the first bit group is 1, L=2, the HARQ process numbers of the two TBs are $\{H_0=b_2, H_1=1+b_2\}$, $H_0$ and $H_1$ represent the HARQ process numbers of the two TBs, and $b_2$ represents a bit status of one bit other than two NDI bits in the second bit group; or
   - a value obtained by performing a remainder operation on a first value M using an index indicated by the first bit group is 2, L=2, the HARQ process numbers of the two TBs are $\{H_0=0, H_1=2+b_2\}$, $H_0$ and $H_1$ represent the HARQ process numbers of the two TBs, and $b_2$ represents a bit status of one bit other than two NDI bits in the second bit group; or
   - a value obtained by performing a remainder operation on a first value M using an index indicated by the first bit group is 3, L=2, the HARQ process numbers of the two TBs are $\{H_0=b_2, H_1=3\}$, $H_0$ and $H_1$ represent the HARQ process numbers of the two TBs, and $b_2$ represents a bit status of one bit other than two NDI bits in the second bit group; or
   - a value obtained by performing a remainder operation on a first value M using an index indicated by the first bit group is 4, L=3, the HARQ process numbers of the three TBs are $\{H_0=0, H_1=1, H_2=2\}$, and $H_0$, $H_1$, and $H_2$ represent the HARQ process numbers of the three TBs; or
   - a value obtained by performing a remainder operation on a first value M using an index indicated by the first bit group is 5, L=3, the HARQ process numbers of the three TBs are $\{H_0=0, H_1=1, H_2=3\}$, and $H_0$, $H_1$, and $H_2$ represent the HARQ process numbers of the three TBs; or
   - a value obtained by performing a remainder operation on a first value M using an index indicated by the first bit group is 6, L=3, the HARQ process numbers of the three TBs are $\{H_0=0, H_1=2, H_2=3\}$, and $H_0$, $H_1$, and $H_2$ represent the HARQ process numbers of the three TBs; or
   - a value obtained by performing a remainder operation on a first value M using an index indicated by the first bit group is 7, L=3, the HARQ process numbers of the three TBs are $\{H_0=1, H_1=2, H_2=3\}$, and $H_0$, $H_1$, and $H_2$ represent the HARQ process numbers of the three TBs; or
   - a value obtained by performing a remainder operation on a first value M using an index indicated by the first bit group is 8, L=4, and NDI information corresponding to one TB in the four TBs other than three TBs corresponding to NDI bits is 0; or
   - a value obtained by performing a remainder operation on a first value M using an index indicated by the first bit group is 9, L=4, and NDI information corresponding to one TB in the four TBs other than three TBs corresponding to NDI bits is 1.

19. The device according to claim 18, wherein the index of the MCS is:
   - floor (index indicated by the first bit group/M); and
   - floor represents a floor function, and / represents a division operation.

20. The device according to claim 19, wherein M=10.

* * * * *

UNITED STATES PATENT AND TRADEMARK OFFICE
CERTIFICATE OF CORRECTION

| | | |
|---|---|---|
| PATENT NO. | : 12,316,456 B2 | Page 1 of 1 |
| APPLICATION NO. | : 17/659271 | |
| DATED | : May 27, 2025 | |
| INVENTOR(S) | : Zhang et al. | |

It is certified that error appears in the above-identified patent and that said Letters Patent is hereby corrected as shown below:

In the Claims

In Column 63, in Claim 1, Line 45, delete "LTBs" and insert -- L TBs --.

In Column 65, in Claim 6, Line 15, delete "$1 \leq LEN$;" and insert -- $1 \leq L \leq N$; --.

In Column 67, in Claim 11, Line 13, delete "LTBs" and insert -- L TBs --.

In Column 68, in Claim 16, Line 57, delete "$1 \leq LEN$;" and insert -- $1 \leq L \leq N$; --.

Signed and Sealed this
Eighth Day of July, 2025

Coke Morgan Stewart
*Acting Director of the United States Patent and Trademark Office*